United States Patent
Sasaki et al.

(10) Patent No.: US 6,987,645 B2
(45) Date of Patent: Jan. 17, 2006

(54) THIN-FILM MAGNETIC HEAD AND METHOD OF MANUFACTURING SAME, AND THIN-FILM MAGNETIC HEAD SUBSTRUCTURE

(75) Inventors: Yoshitaka Sasaki, Milpitas, CA (US); Takehiro Kamigama, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 200 days.

(21) Appl. No.: 10/403,033

(22) Filed: Apr. 1, 2003

(65) Prior Publication Data

US 2004/0196590 A1    Oct. 7, 2004

(51) Int. Cl.
G11B 5/147    (2006.01)

(52) U.S. Cl. .................................... 360/126
(58) Field of Classification Search ............... 360/126, 360/125, 123; 29/603.14, 603.15, 603.18
See application file for complete search history.

(56) References Cited

U.S. PATENT DOCUMENTS

| | | | | |
|---|---|---|---|---|
| 3,614,554 A | * | 10/1971 | Shield et al. | ............... 257/531 |
| 4,985,985 A | * | 1/1991 | Das | .......................... 29/603.14 |
| 5,296,992 A | * | 3/1994 | Abe | ............................ 360/126 |
| 5,969,911 A | * | 10/1999 | Hikami et al. | ............... 360/317 |
| 5,995,342 A | | 11/1999 | Cohen et al. | |
| 6,043,959 A | | 3/2000 | Crue et al. | |
| 6,163,435 A | * | 12/2000 | Gaud et al. | .................. 360/123 |
| 6,191,916 B1 | | 2/2001 | Sasaki | |
| 6,459,543 B1 | | 10/2002 | Sasaki | |
| 6,778,354 B2 | * | 8/2004 | Matono | ....................... 360/123 |
| 6,819,527 B1 | * | 11/2004 | Dill et al. | .................... 360/123 |

FOREIGN PATENT DOCUMENTS

| JP | A 11-283215 | 10/1999 |
|---|---|---|
| JP | A 2000-311311 | 11/2000 |
| JP | A 2001-76313 | 3/2001 |

OTHER PUBLICATIONS

U.S. Appl. No. 09/549,617, filed Apr. 14, 2000, Sasaki.

* cited by examiner

Primary Examiner—Angel Castro
(74) Attorney, Agent, or Firm—Oliff & Berridge, PLC

(57) ABSTRACT

A thin-film magnetic head comprises a bottom pole layer, a top pole layer, a recording gap layer, and a thin-film coil. The thin-film coil is wound in a helical manner around the top pole layer while the coil is insulated from the bottom pole layer and the top pole layer. The thin-film coil includes a plurality of inner conductor portions, a plurality of outer conductor portions, and a plurality of connecting portions that connect the inner conductor portions to the outer conductor portions. The inner conductor portions are disposed between the bottom pole layer and the top pole layer. The outer conductor portions are disposed on a side opposite to the inner conductor portions, the top pole layer being disposed in between. A thin insulating film is only provided between adjacent ones of the inner conductor portions.

44 Claims, 34 Drawing Sheets

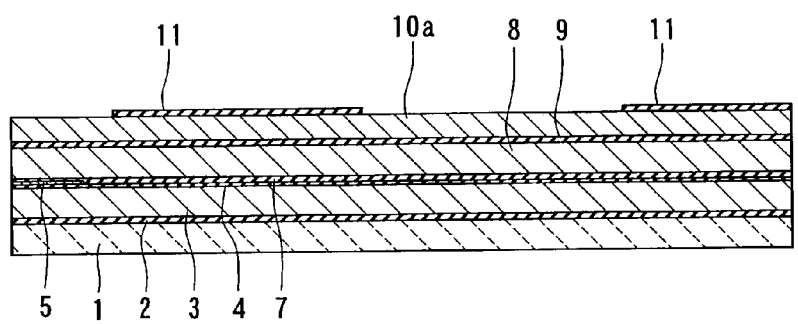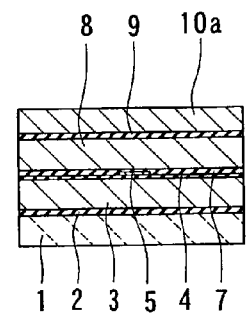
FIG. 2A  FIG. 2B
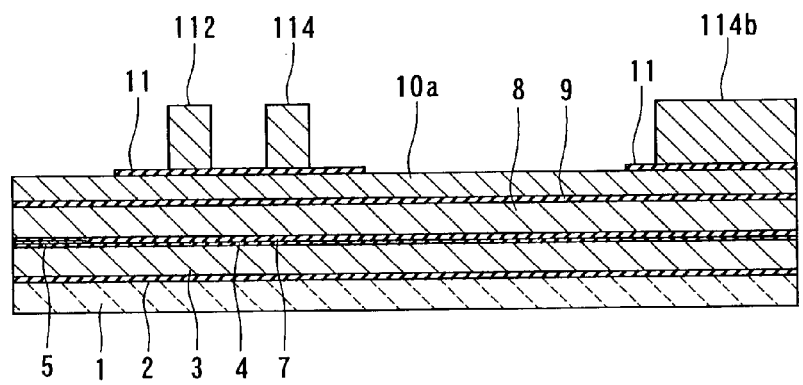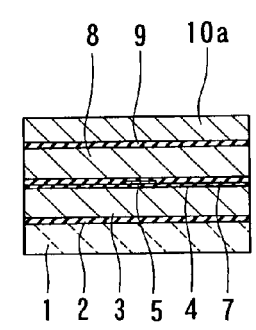
FIG. 3A  FIG. 3B

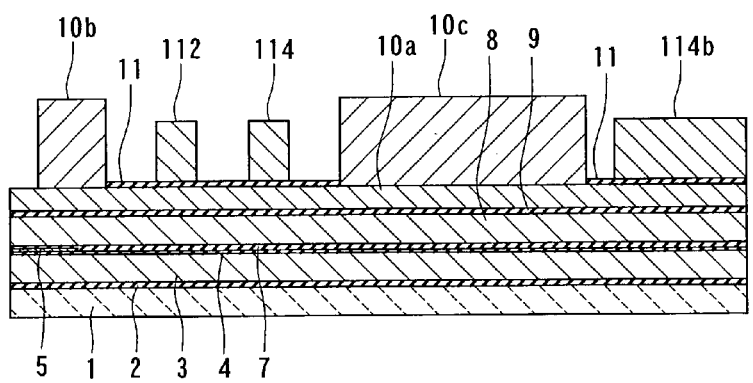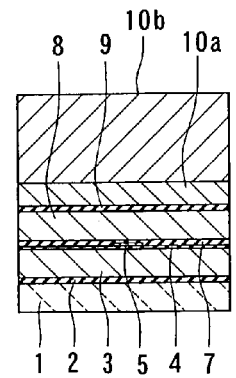
FIG. 4A  FIG. 4B
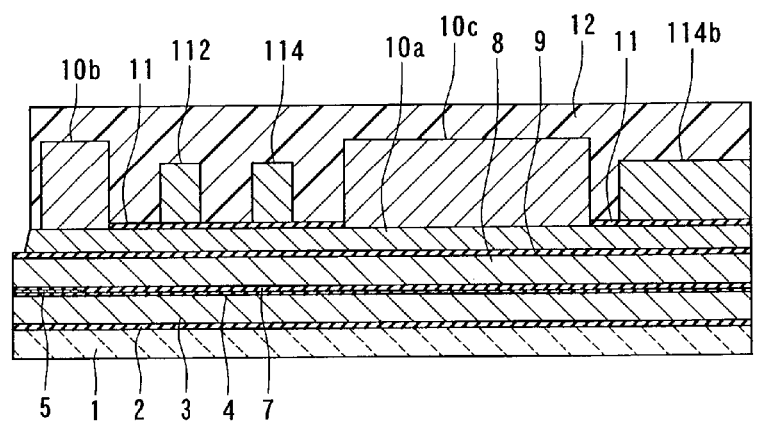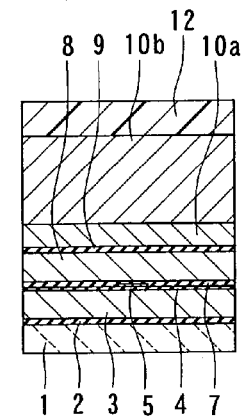
FIG. 5A  FIG. 5B

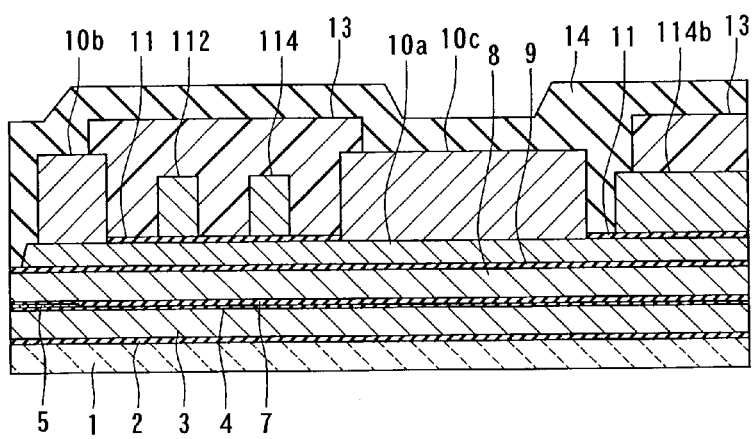
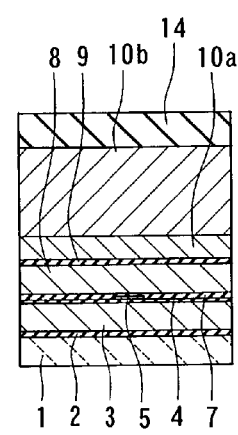
FIG. 6A  FIG. 6B
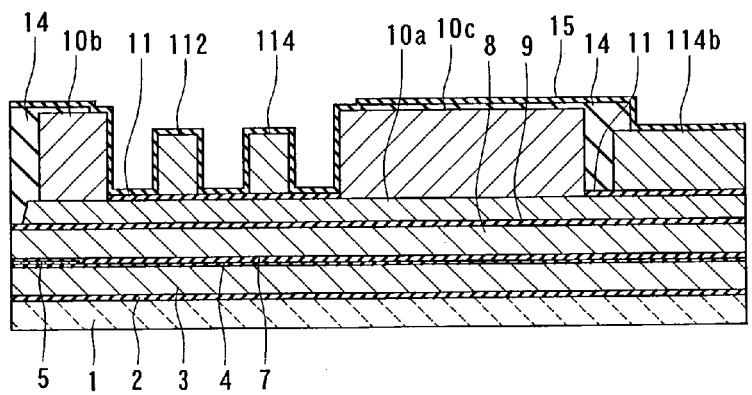
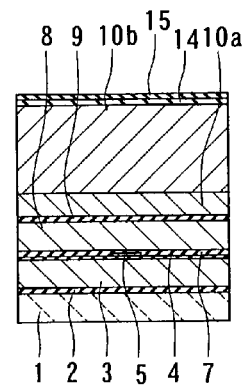
FIG. 7A  FIG. 7B

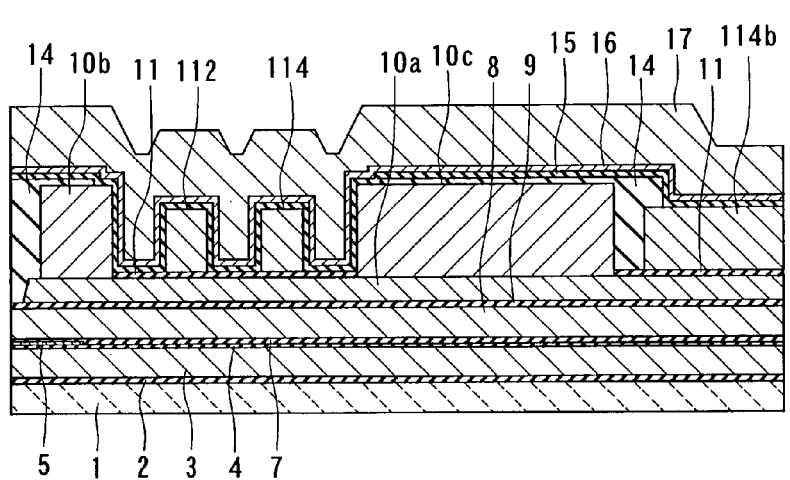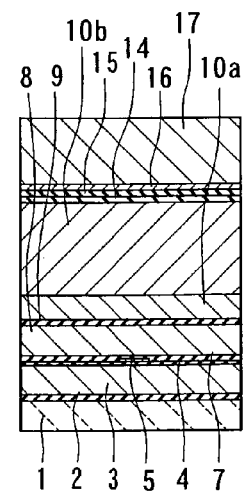
FIG. 8A  FIG. 8B
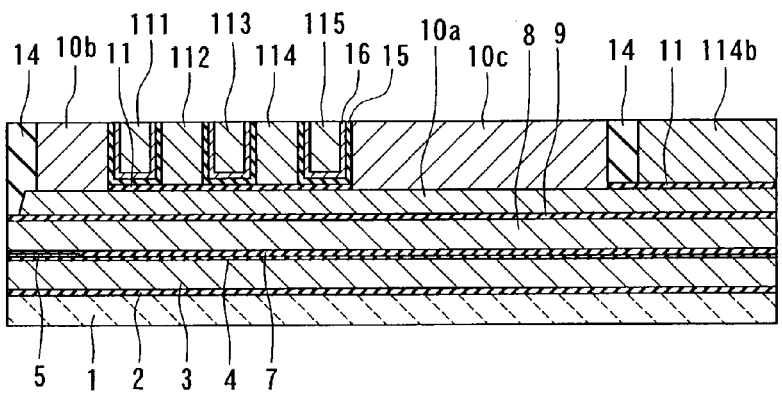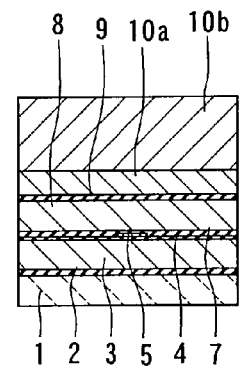
FIG. 9A  FIG. 9B

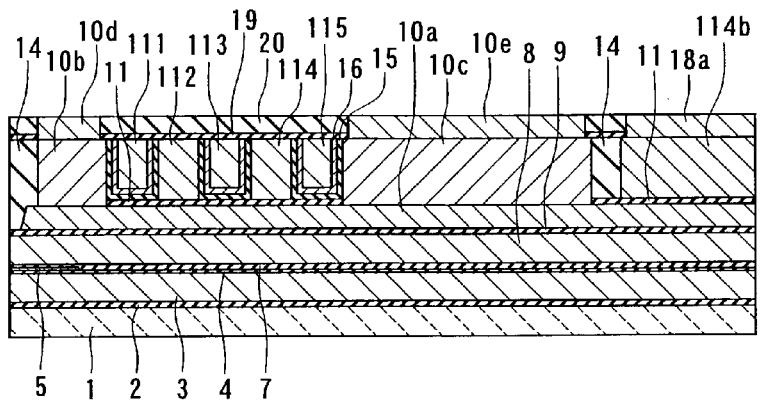
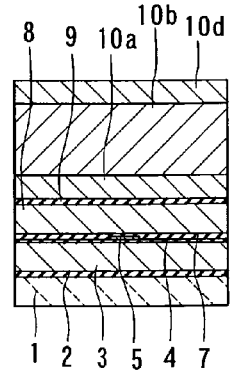
FIG. 10A
FIG. 10B
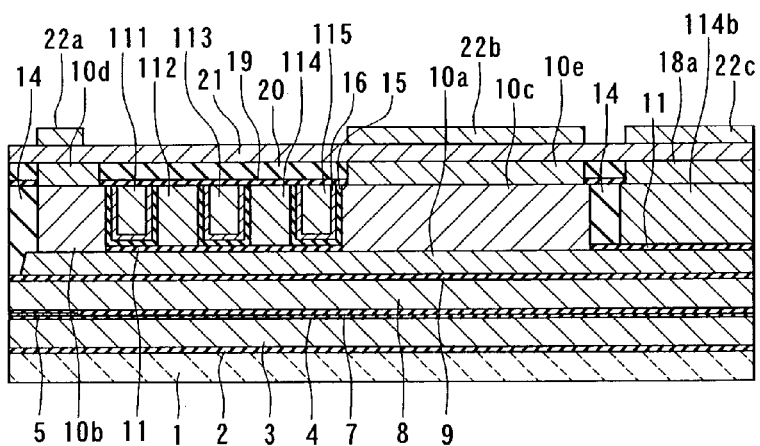
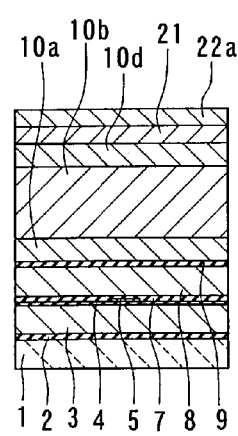
FIG. 11A
FIG. 11B

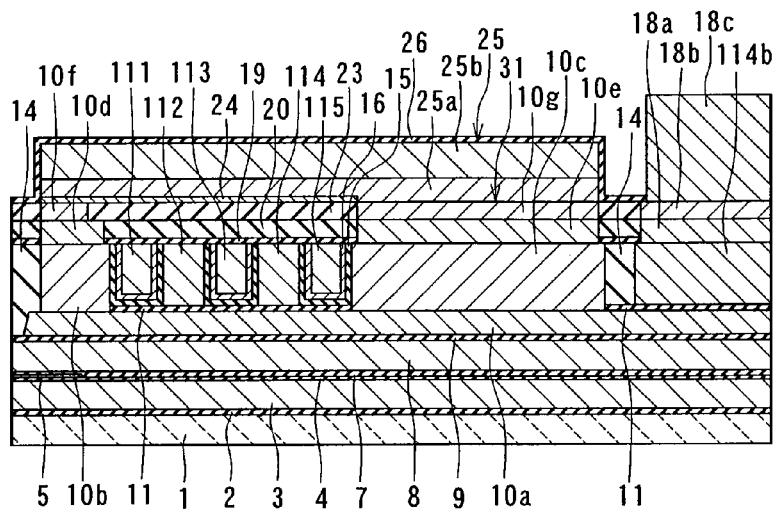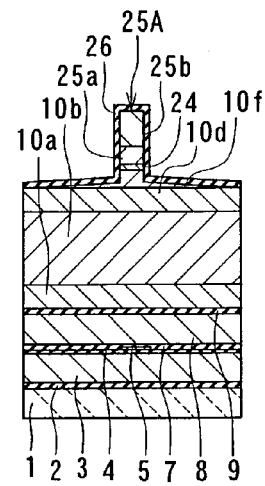
FIG. 14A    FIG. 14B
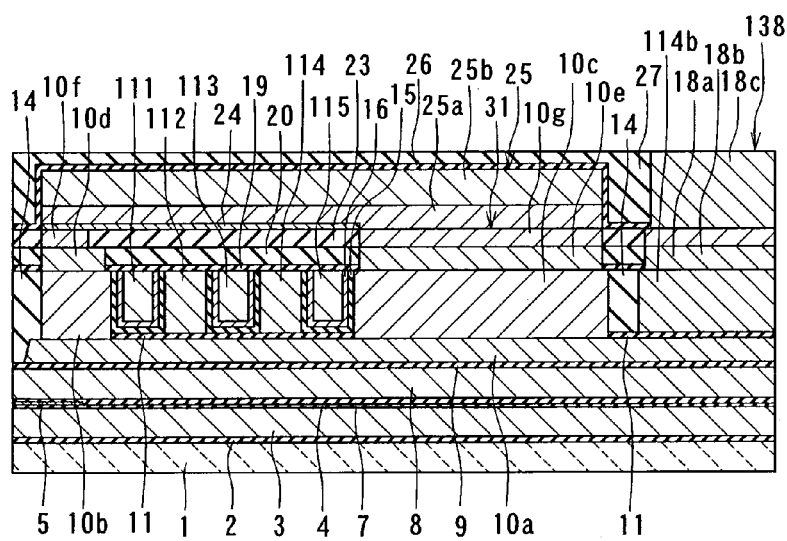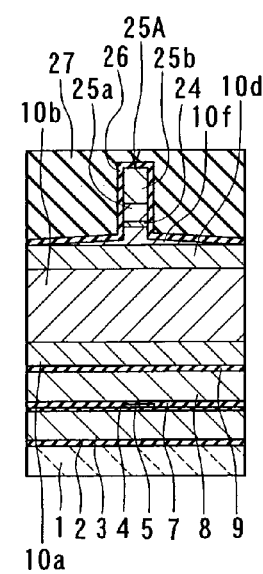
FIG. 15A    FIG. 15B

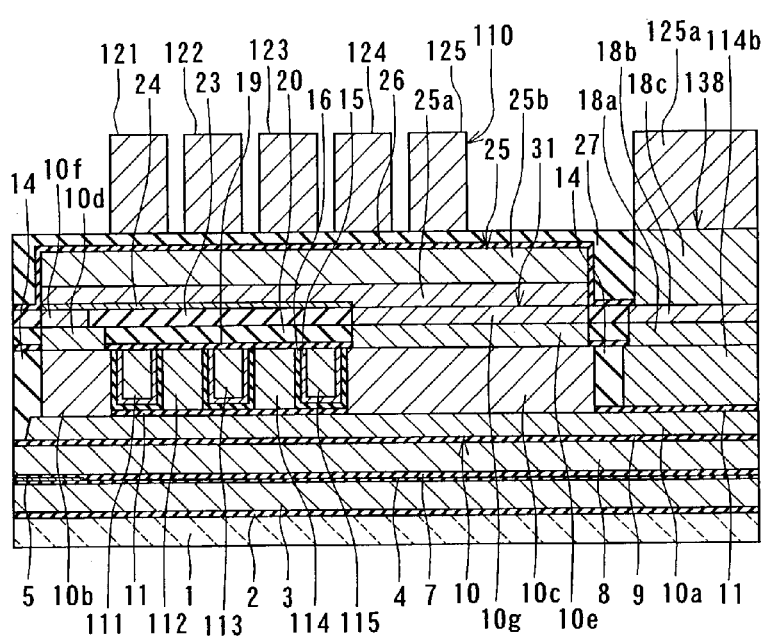
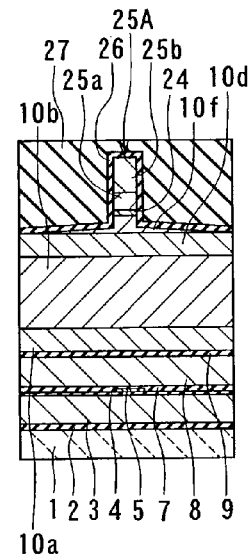
FIG. 16A
FIG. 16B

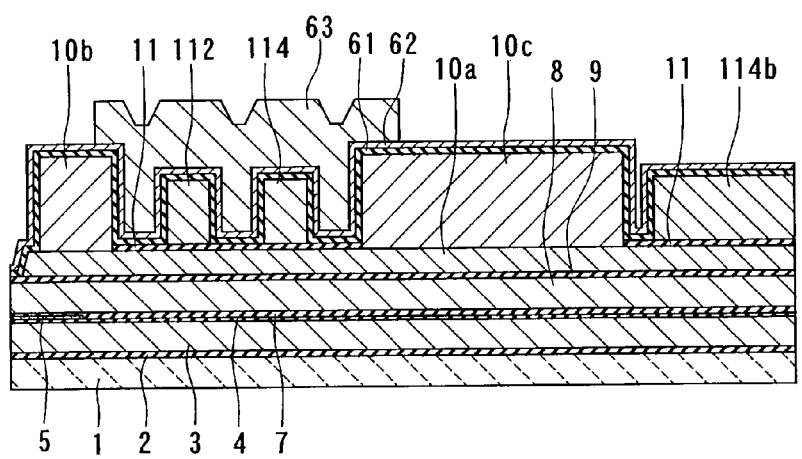 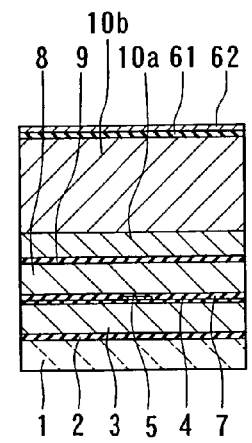
FIG. 29A  FIG. 29B
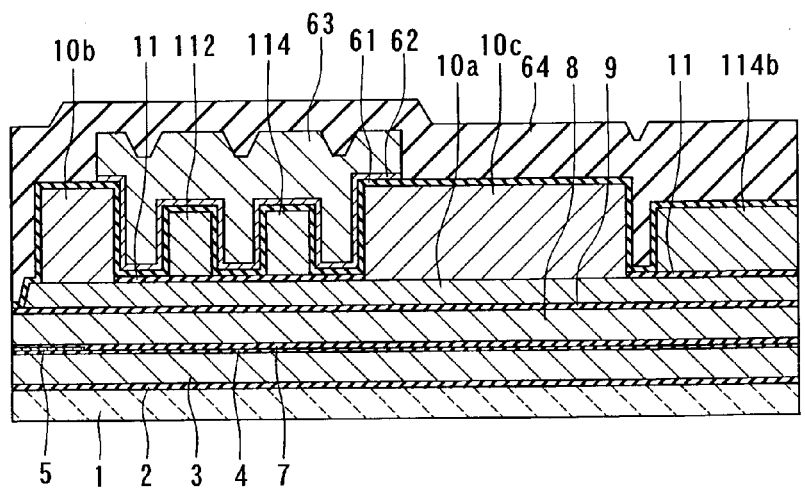 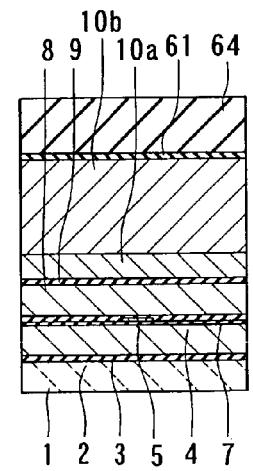
FIG. 30A  FIG. 30B

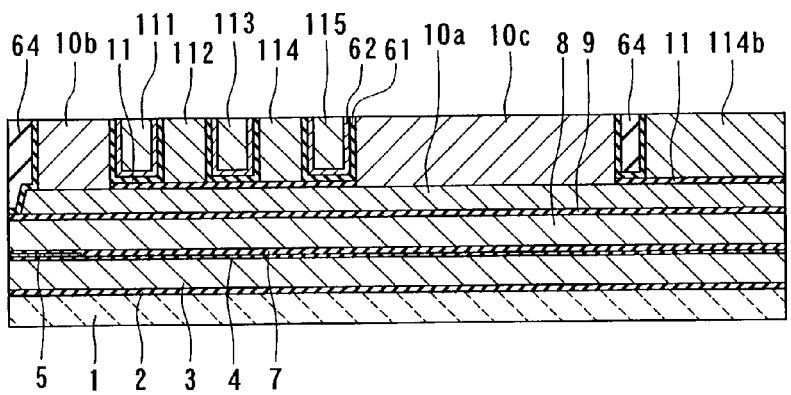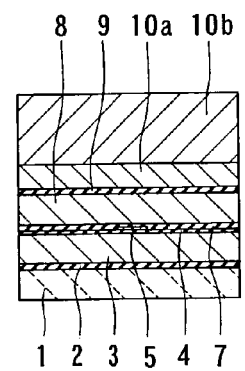
FIG. 31A FIG. 31B
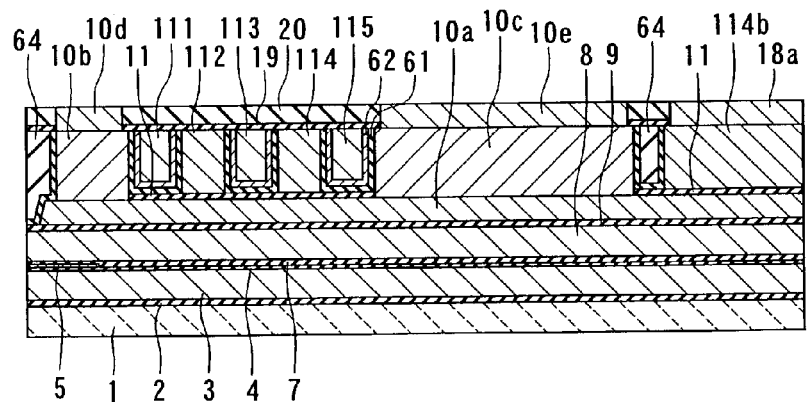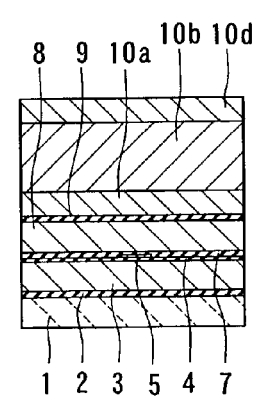
FIG. 32A FIG. 32B

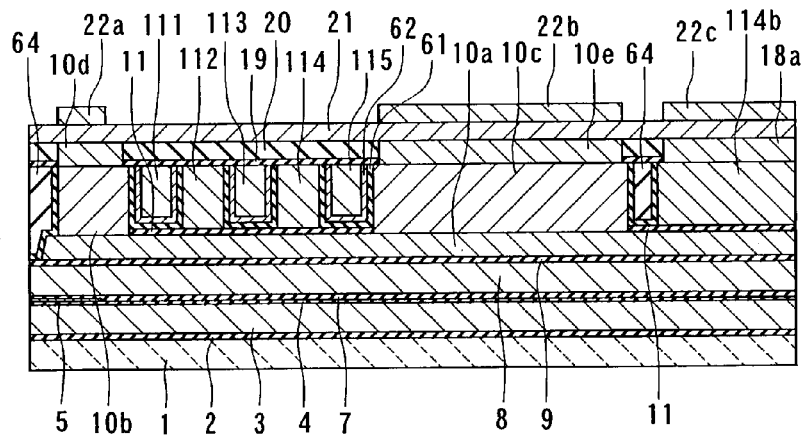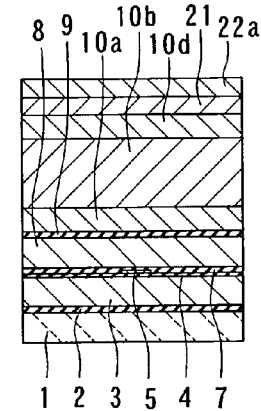
FIG. 33A  FIG. 33B
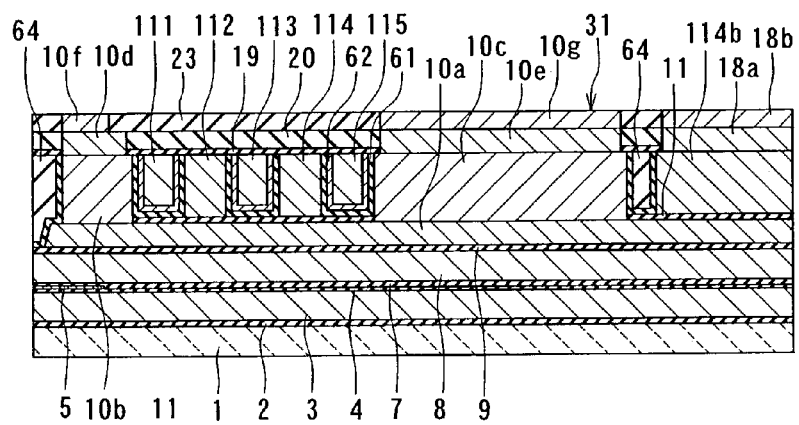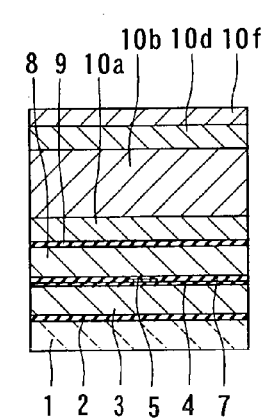
FIG. 34A  FIG. 34B

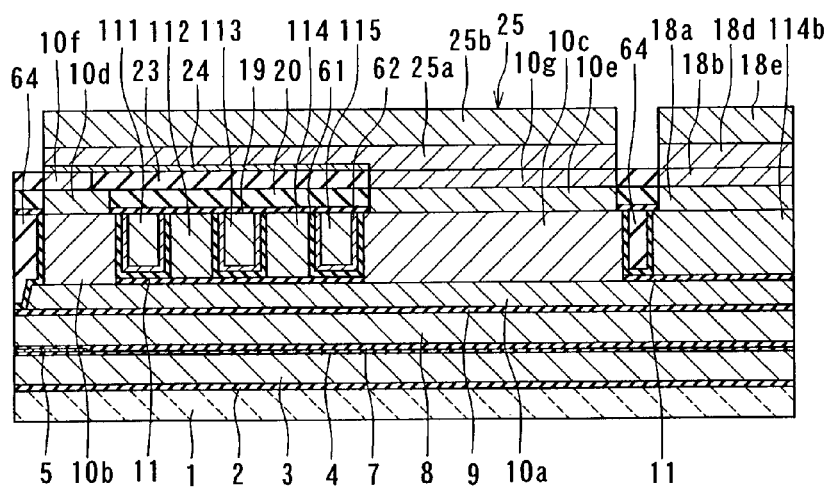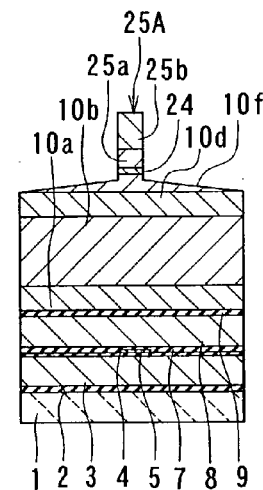
FIG. 35A
FIG. 35B
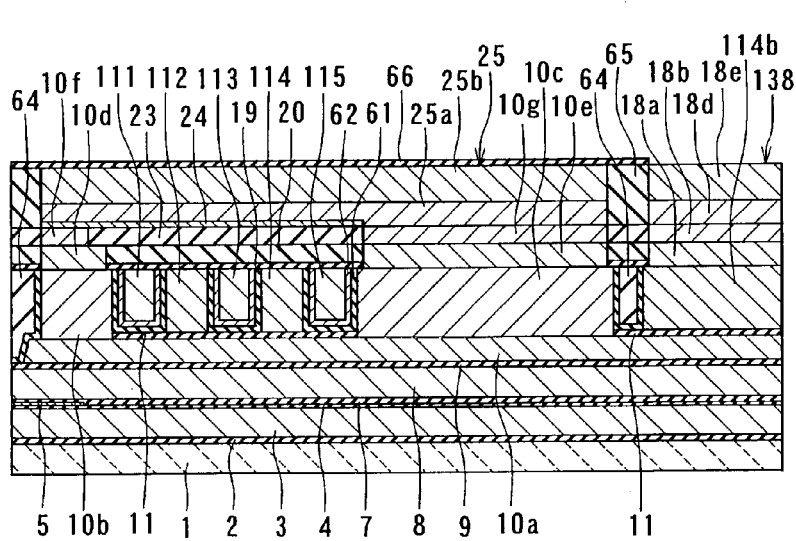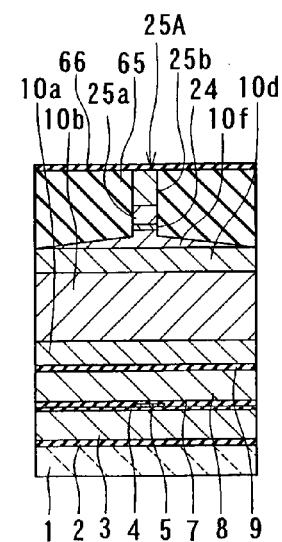
FIG. 36A
FIG. 36B

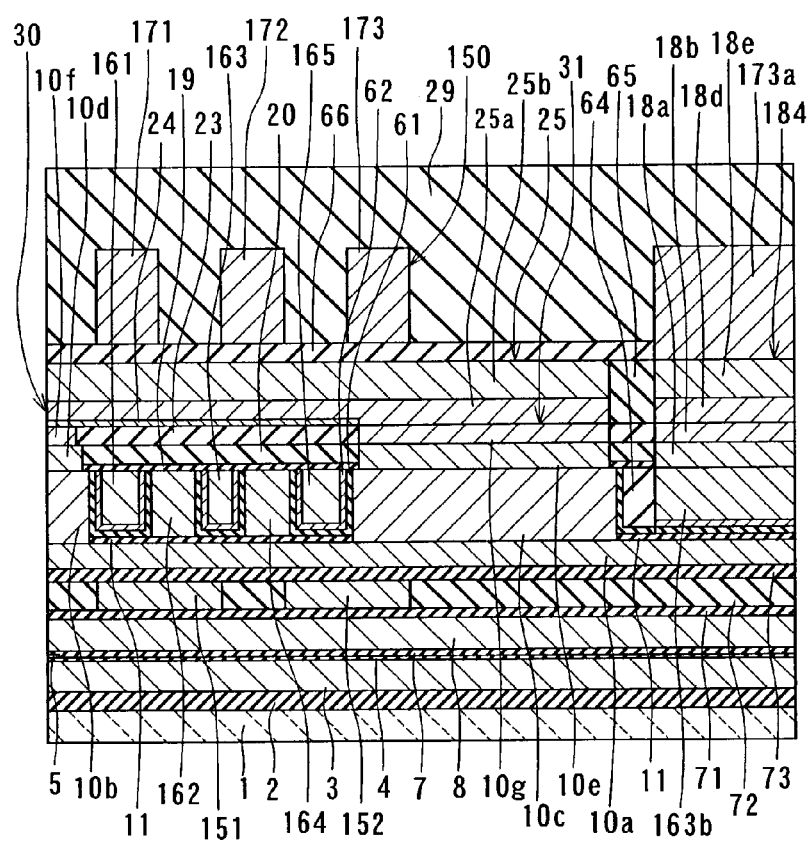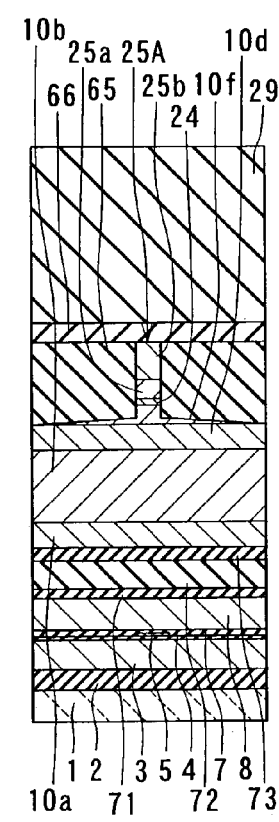
FIG. 42A
FIG. 42B

THIN-FILM MAGNETIC HEAD AND METHOD OF MANUFACTURING SAME, AND THIN-FILM MAGNETIC HEAD SUBSTRUCTURE

BACKGROUND OF THE INVENTION

1. Field of the Invention

The present invention relates to a thin-film magnetic head having at least an induction-type electromagnetic transducer, and a method of manufacturing the same, and to a thin-film magnetic head substructure used for manufacturing the thin-film magnetic head.

2. Description of the Related Art

Recent years have seen significant improvements in the areal recording density of hard disk drives. In particular, areal recording densities of latest hard disk drives have reached 80 to 100 GB/platter and are even exceeding that level. It is therefore required to improve the performance of thin-film magnetic heads.

Among the thin-film magnetic heads, widely used are composite thin-film magnetic heads made of a layered structure including a recording (write) head having an induction-type electromagnetic transducer for writing and a reproducing (read) head having a magnetoresistive element (that may be hereinafter called an MR element) for reading.

In general, the write head incorporates: a medium facing surface (air bearing surface) that faces toward a recording medium; a bottom pole layer and a top pole layer that are magnetically coupled to each other and include magnetic pole portions opposed to each other and located in regions of the pole layers on a side of the medium facing surface; a recording gap layer provided between the magnetic pole portions of the top and bottom pole layers; and a thin-film coil at least part of which is disposed between the top and bottom pole layers and insulated from the top and bottom pole layers. In the typical write head, the bottom pole layer and the top pole layer are magnetically coupled to each other via a coupling portion which is located away from the medium facing surface.

Higher track densities on a recording medium are essential to enhancing the recording density among the performances of the write head. To achieve this, it is required to implement the write head of a narrow track structure in which the track width, that is, the width of the two magnetic pole portions opposed to each other on a side of the medium facing surface, with the recording gap layer disposed in between, is reduced down to microns or the order of submicron. Semiconductor process techniques are utilized to achieve the write head having such a structure.

As the track width is decreased, it becomes harder to generate a high-density magnetic flux between the two magnetic pole portions that are opposed to each other with the recording gap layer in between. It is therefore desirable that the pole portions be made of a magnetic material having a higher saturation flux density.

When the frequency of the write signal is raised to increase the recording density, it is required for the write head that the speed of change of flux be improved, or in other words, the flux rise time be reduced. It is also required that degradation in the writing characteristics such as the overwrite property and the non-linear transition shift in a high frequency band be minimized. To improve recording characteristics in the high frequency band, it is preferable to reduce the magnetic path length. The magnetic path length is determined chiefly by the length of a portion of the bottom or top pole layer located between the coupling portion and the medium facing surface (referred to as a yoke length in the present application). A reduction in yoke length is effective in reducing the magnetic path length. To reduce the yoke length, it is effective to reduce the pitch of the turns of the thin-film coil, or the pitch of a portion of the turns which lies between the coupling portion and the medium facing surface, in particular.

As disclosed in the U.S. Pat. No. 6,043,959 and the U.S. Pat. No. 6,191,916B1, the thin-film coil of the thin-film magnetic heads is flat whorl-shaped and disposed around the coupling portion in many cases. In the thin-film magnetic head having such a structure, the thin-film coil generates many lines of flux in the neighborhood of the coupling portion. These lines of flux are introduced to the two pole portions by the top and bottom pole layers and used for writing.

In the thin-film magnetic head having the above-mentioned structure, however, it is impossible to effectively use the flux generated by the coil for writing. That is, it is known that only several percent of lines of flux generated by the coil is used for writing in such a thin-film magnetic head. In prior art the number of turns of the coil is increased to increase the lines of flux used for writing in this type of thin-film magnetic head.

A technique is disclosed in the U.S. Pat. No. 6,191,916B1 to dispose the turns of a second coil between the turns of a first coil for reducing the pitch of the turns of the thin-film coil.

In the U.S. Pat. No. 5,995,342, Published Unexamined Japanese Patent Application 2000-311311 and the U.S. Pat. No. 6,459,543B1, a thin-film magnetic head is disclosed, the head having a thin-film coil wound in a helical manner around at least one of the top and bottom pole layers. In this magnetic head a part of the thin-film coil is located between the coupling portion and the medium facing surface. The head having such a structure allows the lines of flux generated by the coil to be effectively utilized for writing. As a result, it is possible to make the number of turns of the coil smaller than that of a thin-film magnetic head having a flat whorl-shaped thin-film coil. A reduction in yoke length is thereby achieved.

As described above, it is desirable to reduce the yoke length of the thin-film magnetic head for improving the writing characteristics in the high frequency band. To achieve this, it is effective to reduce the pitch of a portion of the turns of the thin-film coil located between the coupling portion and the medium facing surface. On the other hand, it is desirable to increase the number of turns of the coil so as to improve the writing characteristics of the magnetic head.

In the case of either the thin-film magnetic head having the flat whorl-shaped coil or the thin-film magnetic head having the helical-shaped coil, to increase the number of turns of the coil and to reduce the yoke length at the same time, it is inevitable to reduce the width of the portion of the coil located between the coupling portion and the medium facing surface. However, a problem that the resistance of the coil increases thereby arises.

As the resistance of the thin-film coil increases, there arises a problem that the pole portions may protrude toward the recording medium due to the heat the thin-film coil generates so that the pole portions are likely to collide with the recording medium.

Therefore, in the conventional thin-film magnetic heads, to avoid the problem that may result from an increase in the resistance of the thin-film coil, it has been unfeasible to considerably reduce the yoke length.

The thin-film coil is typically formed through frame plating. The frame used for frame plating has walls each of which is disposed between adjacent turns of the coil. It is necessary that each of the walls be wide enough to maintain the shape of each of the walls. As a result, it is difficult to reduce the space between adjacent turns of the coil when the coil is formed through frame plating.

Through the use of the technique disclosed in the U.S. Pat. No. 6,191,916B1, it is possible to reduce the space between adjacent turns of the flat whorl-shaped thin-film coil. In the thin-film magnetic head disclosed in the U.S. Pat. No. 6,191,916B1, however, the flat whorl-shaped coil is used for generating lines of magnetic flux, and it is therefore impossible to effectively use the lines of flux generated by the coil for writing as described above.

OBJECT AND SUMMARY OF THE INVENTION

It is an object of the invention to provide a thin-film magnetic head that has a reduced magnetic path length and thus exhibits excellent writing characteristics in the high frequency band and that has a thin-film coil with a low resistance, and a method of manufacturing the same, and to provide a thin-film magnetic head substructure.

A first thin-film magnetic head of the invention comprises: a medium facing surface that faces toward a recording medium; a first pole layer and a second pole layer that include magnetic pole portions opposed to each other and located in regions of the pole layers on a side of the medium facing surface; a gap layer provided between the pole portion of the first pole layer and the pole portion of the second pole layer; a thin-film coil wound in a helical manner around at least one of the first and second pole layers and insulated from the first and second pole layers; and a substrate.

According to the first thin-film magnetic head of the invention, the first and second pole layers, the gap layer and the thin-film coil are stacked on the substrate, and the first pole layer is located closer to the substrate than the second pole layer. The thin-film coil includes: a plurality of inner conductor portions disposed side by side between the first and second pole layers and extending in a direction intersecting the direction orthogonal to the medium facing surface; a plurality of outer conductor portions disposed on a side opposite to the inner conductor portions, the first or second pole layer being disposed between the inner conductor portions and the outer conductor portions, and the outer conductor portions extending in the direction intersecting the direction orthogonal to the medium facing surface; and a plurality of connecting portion for connecting the inner conductor portions to the outer conductor portions. The thin-film magnetic head further comprises an insulating film disposed between adjacent ones of the inner conductor portions. The space between adjacent ones of the inner conductor portions is equal to the thickness of the insulating film, and smaller than or equal to the minimum distance between the first pole layer and the bottoms of the inner conductor portions.

According to the first thin-film magnetic head of the invention, the thin-film coil is wound in a helical manner around at least one of the first and second pole layers. The insulating film is provided between adjacent ones of the inner conductor portions. The space between adjacent ones of the inner conductor portions is equal to the thickness of the insulating film, and smaller than or equal to the minimum distance between the first pole layer and the bottoms of the inner conductor portions. As a result, the first thin-film magnetic head of the invention achieves a reduction in resistance of the thin-film coil and a reduction in magnetic path length at the same time.

According to the first thin-film magnetic head of the invention, the space between adjacent ones of the outer conductor portions may be greater than the space between adjacent ones of the inner conductor portions. The outer conductor portions may have a minimum width greater than a minimum width of the inner conductor portions.

In the first thin-film magnetic head of the invention, the first pole layer may include: a first portion disposed in a region facing the inner conductor portions; a second portion located near the medium facing surface and connected to the first portion in such a manner that the second portion protrudes toward the second pole layer, the second portion being closer to the second pole layer than the first portion; and a third portion located away from the medium facing surface and connected to the first portion in such a manner that the third portion protrudes toward the second pole layer, the third portion being closer to the second pole layer than the first portion. In addition, part of the inner conductor portions may be disposed between the second portion and the third portion.

At least one of the space between the second portion and one of the inner conductor portions closest to the second portion and the space between the third portion and one of the inner conductor portions closest to the third portion may be equal to the thickness of the insulating film. Part of the outer conductor portions may be disposed to face a top surface or a bottom surface of the third portion.

The third portion may include an end face that faces toward the medium facing surface, and the end face may include a curved surface that protrudes toward the medium facing surface. In this case, the inner conductor portions may have a minimum width on an imaginary line drawn between the end face of the third portion and the medium facing surface at a shortest distance, and the inner conductor portions may include a changing width portion in which a width thereof increases as a distance from the imaginary line increases.

In the first thin-film magnetic head of the invention, the connecting portions may be disposed such that adjacent ones of the connecting portions are shifted from each other both in the direction orthogonal to the medium facing surface and in the direction parallel to the medium facing surface.

The first thin-film magnetic head of the invention may further comprise an insulating layer made of an organic film and disposed between adjacent ones of the outer conductor portions.

A thin-film magnetic head fabricated through a first method of manufacturing a thin-film magnetic head of the invention comprises: a medium facing surface that faces toward a recording medium; a first pole layer and a second pole layer that include magnetic pole portions opposed to each other and located in regions of the pole layers on a side of the medium facing surface; a gap layer provided between the pole portion of the first pole layer and the pole portion of the second pole layer; and a thin-film coil wound in a helical manner around at least one of the first and second pole layers and insulated from the first and second pole layers.

The first method of manufacturing the thin-film magnetic head of the invention comprises the steps of forming the first pole layer; forming the gap layer on the pole portion of the first pole layer; forming the second pole layer on the gap layer; and forming the thin-film coil.

In the first method of the invention the step of forming the thin-film coil includes the steps of: forming a plurality of inner conductor portions disposed side by side between the first and second pole layers and extending in a direction intersecting the direction orthogonal to the medium facing surface; forming a plurality of outer conductor portions disposed on a side opposite to the inner conductor portions, the first or second pole layer being disposed between the inner conductor portions and the outer conductor portions, the outer conductor portions extending in the direction intersecting the direction orthogonal to the medium facing surface; and forming a plurality of connecting portions for connecting the inner conductor portions to the outer conductor portions. The inner conductor portions are formed to include a first conductor portion and a second conductor portion disposed adjacent to each other. The step of forming the inner conductor portions includes the steps of: forming the first conductor portion; forming an insulating film on a sidewall of the first conductor portion; and forming the second conductor portion such that the insulating film is only provided between the first and second conductor portions.

According to the first method of the invention, the thin-film coil is wound in a helical manner around at least one of the first and second pole layers. The inner conductor portions are made to include the first conductor portion and the second conductor portion disposed adjacent to each other. The insulating film is only provided between the first conductor portion and the second conductor portion. As a result, the invention achieves a reduction in resistance of the thin-film coil of the thin-film magnetic head and a reduction in magnetic path length at the same time.

In the first method of the invention the space between adjacent ones of the outer conductor portions may be made greater than the space between adjacent ones of the inner conductor portions in the step of forming the outer conductor portions. The outer conductor portions may be made to have a minimum width greater than a minimum width of the inner conductor portions in the step of forming the outer conductor portions.

According to the first method of the invention, in the step of forming the first pole layer, the first pole layer may be made to include: a first portion disposed in a region facing the inner conductor portions; a second portion located near the medium facing surface and connected to the first portion in such a manner that the second portion protrudes toward the second pole layer, the second portion being closer to the second pole layer than the first portion; and a third portion located away from the medium facing surface and connected to the first portion in such a manner that the third portion protrudes toward the second pole layer, the third portion being closer to the second pole layer than the first portion. In this case, in the step of forming the inner conductor portions, part of the inner conductor portions may be disposed between the second portion and the third portion.

In the step of forming the inner conductor portions, a groove covered with the insulating film may be formed in at least one of the space between the second portion and the first conductor portion and the space between the third portion and the first conductor portion, and the second conductor portion may be formed in the groove.

In the step of forming the outer conductor portions, part of the outer conductor portions may be disposed to face the top surface or the bottom surface of the third portion.

The third portion may be made to include an end face that faces toward the medium facing surface, and the end face may be made to include a curved surface that protrudes toward the medium facing surface. In this case, the inner conductor portions may be made to have a minimum width on an imaginary line drawn between the end face of the third portion and the medium facing surface at a shortest distance, and the inner conductor portions may be made to include a changing width portion in which a width thereof increases as a distance from the imaginary line increases.

According to the first method of the invention, the connecting portions may be disposed such that adjacent ones of the connecting portions are shifted from each other both in the direction orthogonal to the medium facing surface and in the direction parallel to the medium facing surface.

The first method of the invention may further comprise the step of forming an insulating layer made of an organic film and disposed between adjacent ones of the outer conductor portions.

According to the first method of the invention, the insulating film may be formed by stacking a plurality of alumina films made through chemical vapor deposition in the step of forming the insulating film.

According to the first method of the invention, the step of forming the second conductor portion may include the steps of forming a conductive film made of copper by chemical vapor deposition; and forming a conductive layer made of copper by plating on the conductive film.

According to the first method of the invention, the number of turns of the thin-film coil may be chosen by choosing the number of the outer conductor portions in the step of forming the thin-film coil.

According to the first method of the invention, the number of turns of the thin-film coil may be chosen by altering the shapes of the connecting portions in the step of forming the thin-film coil.

A thin-film magnetic head manufactured through the use of a thin-film magnetic head substructure of the invention comprises: a medium facing surface that faces toward a recording medium; a first pole layer and a second pole layer that include magnetic pole portions opposed to each other and located in regions of the pole layers on a side of the medium facing surface; a gap layer provided between the pole portion of the first pole layer and the pole portion of the second pole layer; a thin-film coil wound in a helical manner around at least one of the first and second pole layers and insulated from the first and second pole layers; and a substrate.

In the thin-film magnetic head the first and second pole layers, the gap layer and the thin-film coil are stacked on the substrate, and the first pole layer is located closer to the substrate than the second pole layer. The thin-film coil includes: a plurality of inner conductor portions disposed side by side between the first and second pole layers and extending in a direction intersecting the direction orthogonal to the medium facing surface; a plurality of outer conductor portions disposed on a side opposite to the inner conductor portions, the first or second pole layer being disposed between the inner conductor portions and the outer conductor portions, and the outer conductor portions extending in the direction intersecting the direction orthogonal to the medium facing surface; and a plurality of connecting portions for connecting the inner conductor portions to the outer conductor portions.

The thin-film magnetic head substructure of the invention comprises: the substrate; at least part of the first pole layer; the inner conductor portions of the thin-film coil; and an insulating film disposed between adjacent ones of the inner conductor portions. The space between adjacent ones of the inner conductor portions is equal to the thickness of the insulating film, and smaller than or equal to a minimum distance between the first pole layer and the bottoms of the inner conductor portions. The thin-film magnetic head substructure of the invention may further comprise the connecting portions.

A second thin-film magnetic head of the invention comprises: a medium facing surface that faces toward a recording medium; a first pole layer and a second pole layer that include magnetic pole portions opposed to each other and located in regions of the pole layers on a side of the medium facing surface; a coupling portion located away from the medium facing surface and including at least one of part of the first pole layer and part of the second pole layer, and magnetically coupling the first pole layer to the second pole layer; a gap layer provided between the pole portion of the first pole layer and the pole portion of the second pole layer; a thin-film coil wound in a helical manner around at least one of the first and second pole layers and insulated from the first and second pole layers; and a substrate.

In the second thin-film magnetic head of the invention the first and second pole layers, the gap layer and the thin-film coil are stacked on the substrate, and the first pole layer is located closer to the substrate than the second pole layer. The thin-film coil includes: a plurality of inner conductor portions disposed side by side between the first and second pole layers and extending in a direction intersecting the direction orthogonal to the medium facing surface; a plurality of outer conductor portions disposed on a side opposite to the inner conductor portions, the first or second pole layer being disposed between the inner conductor portions and the outer conductor portions, and the outer conductor portions extending in the direction intersecting the direction orthogonal to the medium facing surface; and a plurality of connecting portions for connecting the inner conductor portions to the outer conductor portions. Part of the outer conductor portions is disposed to face the top surface or the bottom surface of the coupling portion.

According to the second thin-film magnetic head of the invention, the thin-film coil is wound in a helical manner around at least one of the first and second pole layers. Part of the outer conductor portions is disposed to face the top surface or the bottom surface of the coupling portion. As a result, the second thin-film magnetic head of the invention achieves a reduction in resistance of the thin-film coil and a reduction in magnetic path length at the same time.

The second thin-film magnetic head of the invention may further comprise an insulating film disposed between adjacent ones of the inner conductor portions. In addition, the space between adjacent ones of the inner conductor portions may be equal to the thickness of the insulating film, and smaller than or equal to a minimum distance between the first pole layer and the bottoms of the inner conductor portions.

In the second thin-film magnetic head of the invention the space between adjacent ones of the outer conductor portions may be greater than the space between adjacent ones of the inner conductor portions. The outer conductor portions may have a minimum width greater than a minimum width of the inner conductor portions.

In the second thin-film magnetic head of the invention the first pole layer may include: a first portion disposed in a region facing the inner conductor portions; a second portion located near the medium facing surface and connected to the first portion in such a manner that the second portion protrudes toward the second pole layer, the second portion being closer to the second pole layer than the first portion; and a third portion located away from the medium facing surface and connected to the first portion in such a manner that the third portion protrudes toward the second pole layer, the third portion being closer to the second pole layer than the first portion. The third portion may make up at least part of the coupling portion. Part of the inner conductor portions may be disposed between the second portion and the third portion.

The third portion may include an end face that faces toward the medium facing surface, and the end face may include a curved surface that protrudes toward the medium facing surface. In this case, the inner conductor portions may have a minimum width on an imaginary line drawn between the end face of the third portion and the medium facing surface at a shortest distance, and the inner conductor portions may include a changing width portion in which a width thereof increases as a distance from the imaginary line increases.

In the second thin-film magnetic head of the invention the connecting portions may be disposed such that adjacent ones of the connecting portions are shifted from each other both in the direction orthogonal to the medium facing surface and in the direction parallel to the medium facing surface.

The second thin-film magnetic head of the invention may further comprise an insulating layer made of an organic film and disposed between adjacent ones of the outer conductor portions.

A thin-film magnetic head fabricated through a second method of manufacturing a thin-film magnetic head of the invention comprises: a medium facing surface that faces toward a recording medium; a first pole layer and a second pole layer that include magnetic pole portions opposed to each other and located in regions of the pole layers on a side of the medium facing surface; a coupling portion located away from the medium facing surface and including at least one of part of the first pole layer and part of the second pole layer, and magnetically coupling the first pole layer to the second pole layer; a gap layer provided between the pole portion of the first pole layer and the pole portion of the second pole layer; and a thin-film coil wound in a helical manner around at least one of the first and second pole layers and insulated from the first and second pole layers.

The second method of manufacturing the thin-film magnetic head of the invention comprises the steps of: forming the first pole layer; forming the gap layer on the pole portion of the first pole layer; forming the second pole layer on the gap layer; and forming the thin-film coil.

In the second method of the invention the step of forming the first pole layer or the step of forming the second pole layer includes the step of forming the coupling portion. The step of forming the thin-film coil includes the steps of: forming a plurality of inner conductor portions disposed side by side between the first and second pole layers and extending in a direction intersecting the direction orthogonal to the medium facing surface; forming a plurality of outer conductor portions disposed on a side opposite to the inner conductor portions, the first or second pole layer being disposed between the inner conductor portions and the outer conductor portions, and the outer conductor portions extending in the direction intersecting the direction orthogonal to the medium facing surface; and forming a plurality of connecting portions for connecting the inner conductor portions to the outer conductor portions. Part of the outer conductor portions is disposed to face the top surface or the bottom surface of the coupling portion in the step of forming the outer conductor portions.

According to the second method of the invention, the thin-film coil is wound in a helical manner around at least one of the first and second pole layers. Part of the outer conductor portions is disposed to face the top surface or the bottom surface of the coupling portion. As a result, the invention achieves a reduction in resistance of the thin-film coil of the thin-film magnetic head and a reduction in magnetic path length at the same time.

According to the second method of the invention, the inner conductor portions may be formed to include a first conductor portion and a second conductor portion disposed adjacent to each other. In this case, the step of forming the inner conductor portions may include the steps of: forming the first conductor portion; forming an insulating film on a sidewall of the first conductor portion; and forming the second conductor portion such that the insulating film is only provided between the first and second conductor portions.

According to the second method of the invention, the space between adjacent ones of the outer conductor portions may be made greater than the space between adjacent ones of the inner conductor portions in the step of forming the outer conductor portions. The outer conductor portions may be made to have a minimum width greater than a minimum width of the inner conductor portions in the step of forming the outer conductor portions.

According to the second method of the invention, in the step of forming the first pole layer, the first pole layer may be made to include: a first portion disposed in a region facing the inner conductor portions; a second portion located near the medium facing surface and connected to the first portion in such a manner that the second portion protrudes toward the second pole layer, the second portion being closer to the second pole layer than the first portion; and a third portion located away from the medium facing surface and connected to the first portion in such a manner that the third portion protrudes toward the second pole layer, the third portion being closer to the second pole layer than the first portion. In this case, the third portion may make up at least part of the coupling portion. In addition, in the step of forming the inner conductor portions, part of the inner conductor portions may be disposed between the second portion and the third portion.

The third portion may be made to include an end face that faces toward the medium facing surface, and the end face may be made to include a curved surface that protrudes toward the medium facing surface. In this case, the inner conductor portions may be made to have a minimum width on an imaginary line drawn between the end face of the third portion and the medium facing surface at a shortest distance, and the inner conductor portions may be made to include a changing width portion in which a width thereof increases as a distance from the imaginary line increases.

According to the second method of the invention, the connecting portions may be disposed such that adjacent ones of the connecting portions are shifted from each other both in the direction orthogonal to the medium facing surface and in the direction parallel to the medium facing surface.

The second method of the invention may further comprise the step of forming an insulating layer made of an organic film and disposed between adjacent ones of the outer conductor portions.

According to the second method of the invention, the insulating film may be formed by stacking a plurality of alumina films made through chemical vapor deposition in the step of forming the insulating film.

According to the second method of the invention, the step of forming the second conductor portion may include the steps of forming a conductive film made of copper by chemical vapor deposition; and forming a conductive layer made of copper by plating on the conductive film.

According to the second method of the invention, the number of turns of the thin-film coil may be chosen by choosing the number of the outer conductor portions in the step of forming the thin-film coil.

According to the second method of the invention, the number of turns of the thin-film coil may be chosen by altering the shapes of the connecting portions in the step of forming the thin-film coil.

Other and further objects, features and advantages of the invention will appear more fully from the following description.

BRIEF DESCRIPTION OF THE DRAWINGS

FIG. 2A and FIG. 2B are cross-sectional views for illustrating a step in a method of manufacturing the thin-film magnetic head of the first embodiment.

FIG. 3A and FIG. 3B are cross-sectional views for illustrating a step that follows FIG. 2A and FIG. 2B.

FIG. 4A and FIG. 4B are cross-sectional views for illustrating a step that follows FIG. 3A and FIG. 3B.

FIG. 5A and FIG. 5B are cross-sectional views for illustrating a step that follows FIG. 4A and FIG. 4B.

FIG. 6A and FIG. 6B are cross-sectional views for illustrating a step that follows FIG. 5A and FIG. 5B.

FIG. 7A and FIG. 7B are cross-sectional views for illustrating a step that follows FIG. 6A and FIG. 6B.

FIG. 8A and FIG. 8B are cross-sectional views for illustrating a step that follows FIG. 7A and FIG. 7B.

FIG. 9A and FIG. 9B are cross-sectional views for illustrating a step that follows FIG. 8A and FIG. 8B.

FIG. 10A and FIG. 10B are cross-sectional views for illustrating a step that follows FIG. 9A and FIG. 9B.

FIG. 11A and FIG. 11B are cross-sectional views for illustrating a step that follows FIG. 10A and FIG. 10B.

FIG. 14A and FIG. 14B are cross-sectional views for illustrating a step that follows FIG. 13A and FIG. 13B.

FIG. 15A and FIG. 15B are cross-sectional views for illustrating a step that follows FIG. 14A and FIG. 14B.

FIG. 16A and FIG. 16B are cross-sectional views for illustrating a step that follows FIG. 15A and FIG. 15B.

FIG. 29A and FIG. 29B are cross-sectional views for illustrating a step in a method of manufacturing a thin-film magnetic head of a second embodiment of the invention.

FIG. 30A and FIG. 30B are cross-sectional views for illustrating a step that follows FIG. 29A and FIG. 29B.

FIG. 31A and FIG. 31B are cross-sectional views for illustrating a step that follows FIG. 30A and FIG. 30B.

FIG. 32A and FIG. 32B are cross-sectional views for illustrating a step that follows FIG. 31A and FIG. 31B.

FIG. 33A and FIG. 33B are cross-sectional views for illustrating a step that follows FIG. 32A and FIG. 32B.

FIG. 34A and FIG. 34B are cross-sectional views for illustrating a step that follows FIG. 33A and FIG. 33B.

FIG. 35A and FIG. 35B are cross-sectional views for illustrating a step that follows FIG. 34A and FIG. 34B.

FIG. 36A and FIG. 36B are cross-sectional views for illustrating a step that follows FIG. 35A and FIG. 35B.

FIG. 42A and FIG. 42B are cross-sectional views of a thin-film magnetic head of a fourth embodiment of the invention.

DETAILED DESCRIPTION OF THE PREFERRED EMBODIMENTS

Embodiments of the invention will now be described in detail with reference to the accompanying drawings.

[First Embodiment]

Figure 1:
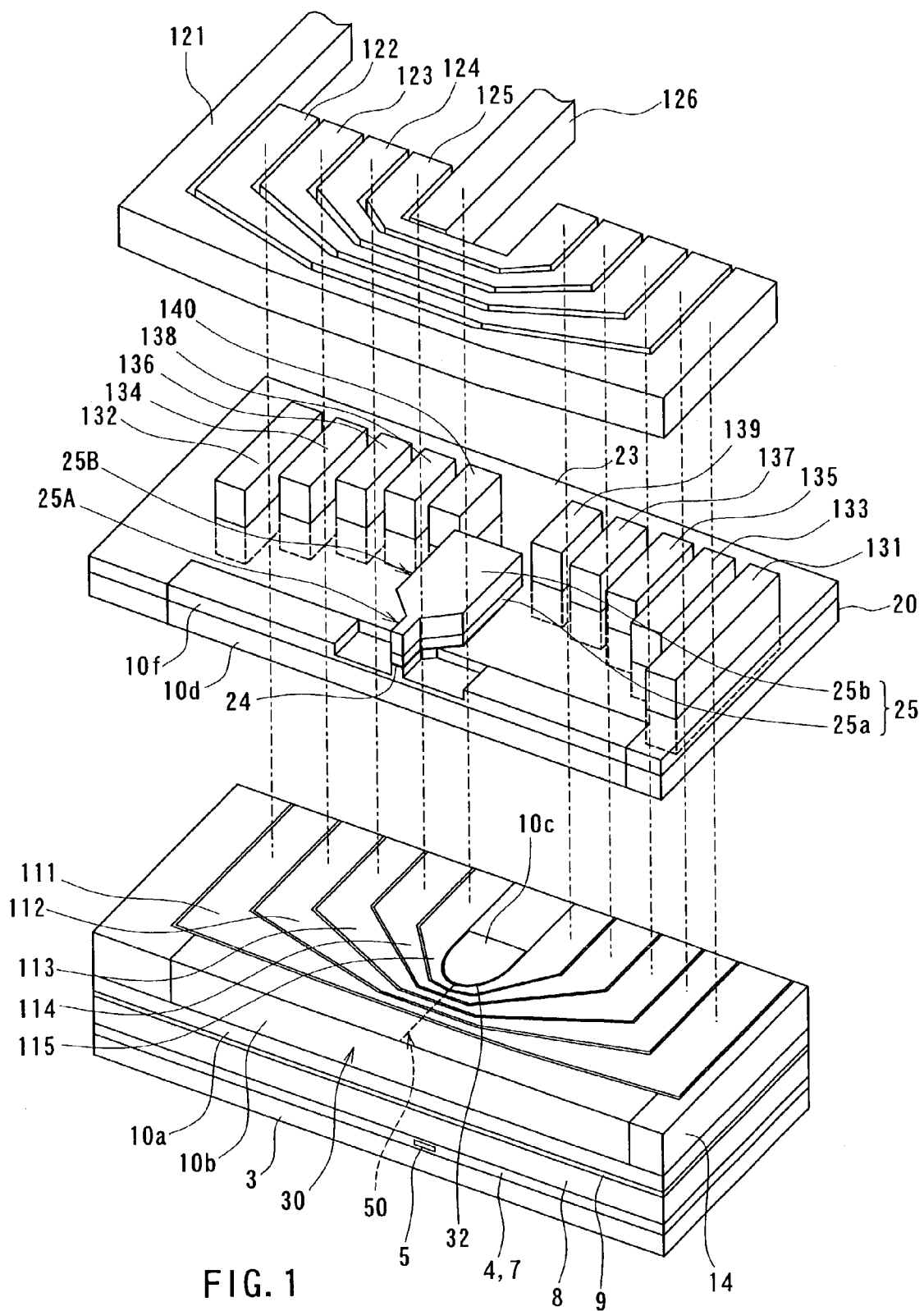
FIG. 1 is an exploded perspective view showing the main part of a thin-film magnetic head of a first embodiment of the invention.
Figure 18:
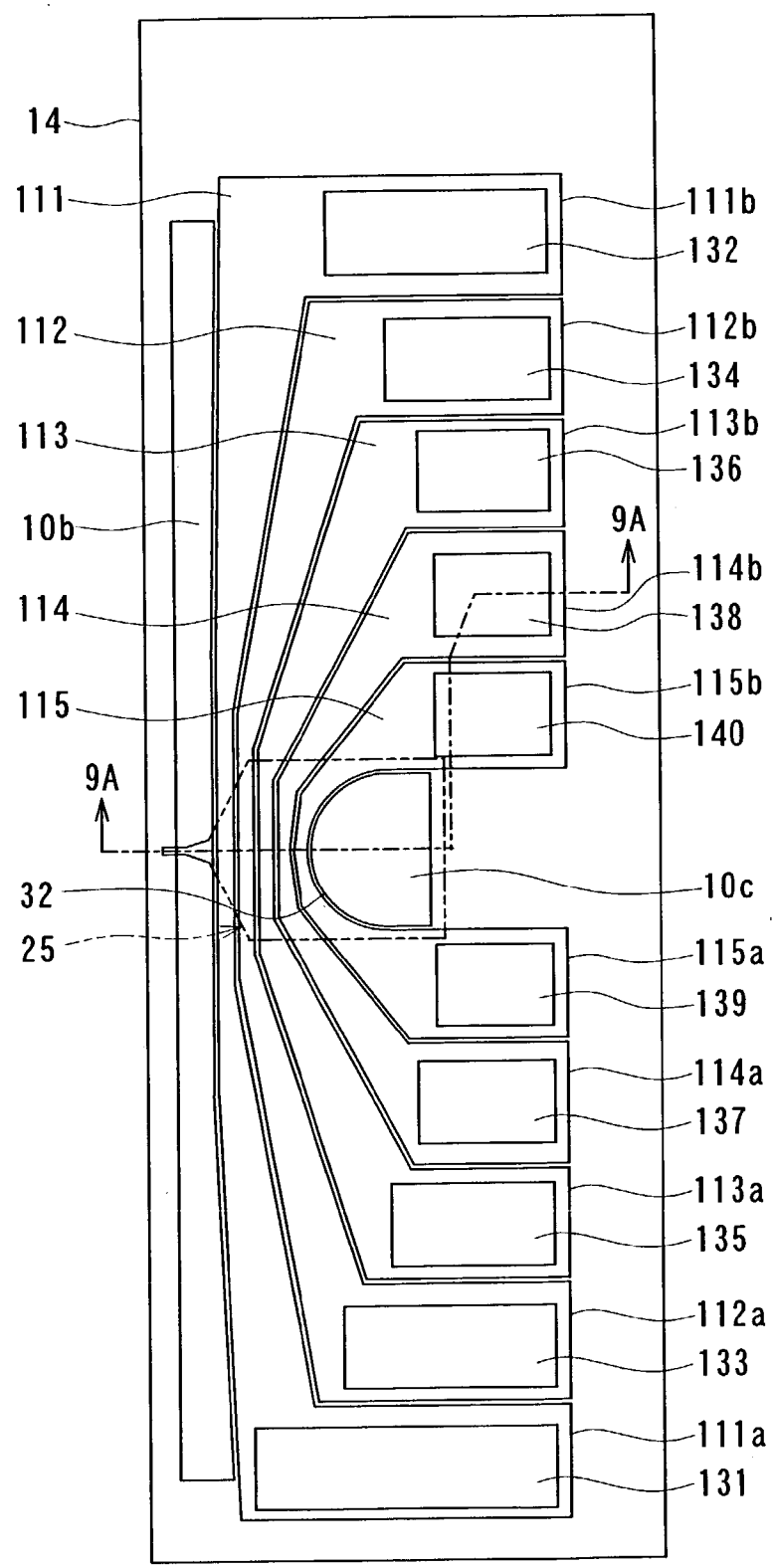
FIG. 18 is a plan view showing inner conductor portions and connecting portions of the thin-film coil of the first embodiment of the invention.
Figure 19:
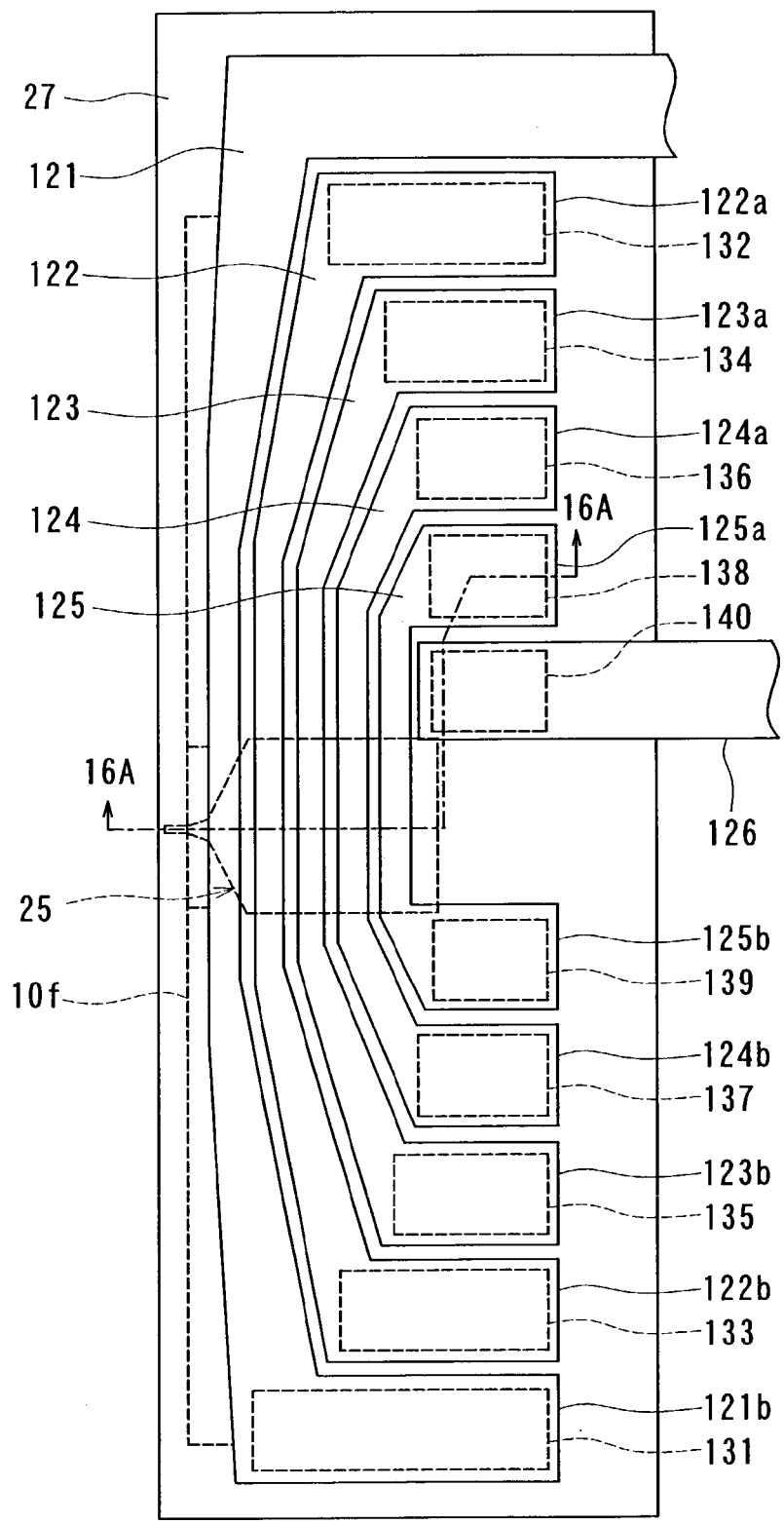
FIG. 19 is a plan view showing outer conductor portions of the thin-film coil of the first embodiment.

Reference is now made to FIG. 1, FIG. 2A to FIG. 17A, FIG. 2B to FIG. 17B, FIG. 18 and FIG. 19 to describe a method of manufacturing a thin-film magnetic head of a first embodiment of the invention. FIG. 1 is an exploded perspective view showing the main part of the thin-film magnetic head of the first embodiment. FIG. 2A to FIG. 17A are cross sections corresponding to cross sections taken along line 9A—9A of FIG. 18 and cross sections taken along line 16A—16A of FIG. 19. FIG. 2B to FIG. 17B are cross sections of magnetic pole portions each of which is parallel to the air bearing surface. FIG. 18 is a plan view showing inner conductor portions and connecting portions of a thin-film coil. FIG. 19 is a plan view showing outer conductor portions of the thin-film coil.

In the method of manufacturing the thin-film magnetic head of the embodiment, as shown in FIG. 2A and FIG. 2B, an insulating layer 2 made of alumina ($Al_2O_3$), for example, is deposited to a thickness of approximately 2 to 5 µm on a substrate 1 made of aluminum oxide and titanium carbide ($Al_2O_3$—TiC), for example. Next, a bottom shield layer 3 for a read head, made of a magnetic material such as Permalloy and having a thickness of approximately 2 to 3 µm, is formed on the insulating layer 2. The bottom shield layer 3 is selectively formed on the insulating layer 2 by plating through the use of a photoresist film as a mask, for example. Although not shown, an insulating layer that is made of alumina, for example, and has a thickness of 3 to 4 µm, for example, is formed over the entire surface. The insulating layer is then polished by chemical mechanical polishing (hereinafter referred to as CMP), for example, to expose the bottom shield layer 3 and to flatten the surface.

On the bottom shield layer 3, a bottom shield gap film 4 serving as an insulating film and having a thickness of approximately 20 to 40 nm, for example, is formed. On the bottom shield gap film 4, an MR element 5 for magnetic signal detection having a thickness of tens of nanometers is formed. For example, the MR element 5 may be formed by selectively etching an MR film formed by sputtering. The MR element 5 is located near a region in which an air bearing surface described later is to be formed. The MR element 5 may be an element made up of a magnetosensitive film that exhibits magnetoresistivity, such as an AMR element, a GMR element or a TMR (tunnel magnetoresistive) element. Next, although not shown, a pair of electrode layers, each having a thickness of tens of nanometers, to be electrically connected to the MR element 5 are formed on the bottom shield gap film 4. A top shield gap film 7 serving as an insulating film and having a thickness of approximately 20 to 40 nm, for example, is formed on the bottom shield gap film 4 and the MR element 5. The MR element 5 is embedded in the shield gap films 4 and 7. Examples of insulating materials used for the shield gap films 4 and 7 include alumina, aluminum nitride, and diamond-like carbon (DLC). The shield gap films 4 and 7 may be formed by sputtering or chemical vapor deposition (hereinafter referred to as CVD).

Next, a top shield layer 8 for a write head, made of a magnetic material and having a thickness of approximately 1.0 to 1.5 µm, is selectively formed on the top shield gap film 7. An insulating layer 9 made of alumina, for example, and having a thickness of approximately 0.3 µm, for example, is formed over the entire top surface of the layered structure obtained through the foregoing steps. On the insulating layer 9, a first layer 10a of a bottom pole layer 10, having a thickness of 0.6 µm, for example, is formed. The bottom pole layer 10 includes the first layer 10a, and second to seventh layers 10b, 10c, 10d, 10e, 10f and 10g described later.

The first layer 10a is formed by sputtering, using a high saturation flux density material such as FeAlN, FeN, FeCo, CoFeN, and FeZrN. Alternatively, the first layer 10a may be formed by plating, using NiFe (80 weight % Ni and 20 weight % Fe), or NiFe (45 weight % Ni and 55 weight % Fe) that is a high saturation flux density material. In this embodiment the first layer 10a is formed by sputtering through the use of CoFeN whose saturation flux density is 2.4 T by way of example.

Next, an insulating film 11 made of alumina, for example, and having a thickness of 0.2 μm, for example, is formed on the first layer 10a. The insulating film 11 is then selectively etched to form openings in the insulating film 11 in regions in which the second layer 10b and the third layer 10c are to be formed.

Next, although not shown, an electrode film of a conductive material having a thickness of 50 to 80 nm is formed by sputtering, for example, so as to cover the first layer 10a and the insulating film 11. This electrode film functions as an electrode and a seed layer for plating.

Next, although not shown, a frame is formed on the electrode film by photolithography. The frame will be used for forming a plurality of inner conductor portions of the thin-film coil by frame plating. As will be described later in detail, the thin-film coil of this embodiment includes a plurality of inner conductor portions, a plurality of outer conductor portions, and a plurality of connecting portions that connect the inner conductor portions to the outer conductor portions. The inner conductor portions are disposed side by side between the bottom pole layer 10 and a top pole layer described later, and extend in the direction intersecting the direction orthogonal to the air bearing surface. The outer conductor portions are disposed on a side opposite to the inner conductor portions, the top pole layer being disposed in between, and extend in the direction intersecting the direction orthogonal to the air bearing surface. The inner conductor portions and the outer conductor portions are connected to each other by the connecting portions so as to form the thin-film coil. The thin-film coil is wound around the top pole layer in a helical manner and insulated from the top and bottom pole layers. The inner conductor portions include first inner conductor portions and second inner conductor portions that are alternately disposed side by side.

Next, as shown in FIG. 3A and FIG. 3B, electroplating is performed, using the electrode film to form two plating layers made of copper (Cu), for example. These two plating layers and the electrode film therebelow make up the first inner conductor portions 112 and 114. Each of the first inner conductor portions 112 and 114 has a thickness of 3.0 to 3.5 μm, for example. The first inner conductor portions 112 and 114 are disposed with a specific spacing in the region in which the insulating film 11 is located, and extend in the direction intersecting the direction orthogonal to the air bearing surface. In FIG. 3A numeral 114b indicates a contact portion provided near an end of the conductor portion 114. Next, the frame is removed, and portions of the electrode film except the portions below the first inner conductor portions 112 and 114 are then removed by ion beam etching, for example.

Next, although not shown, a frame is formed on the first layer 10a and the insulating film 11 by photolithography. The frame will be used for forming the second layer 10b and the third layer 10c by frame plating.

Next, as shown in FIG. 4A and FIG. 4B, electroplating is performed to form the second layer 10b and the third layer 10c, each of which is made of a magnetic material and has a thickness of 3.3 to 3.8 μm, for example, on the first layer 10a. For example, the second layer 10b and the third layer 10c may be made of a high saturation flux density material. Such a high saturation flux density material may be CoNiFe having a saturation flux density of 2.1 T, or FeCo$_x$ having a saturation flux density of 2.3 T. In the present embodiment, when the second layer 10b and the third layer 10c are formed by plating, no specific electrode film is provided, but the unpatterned first layer 10a is used as an electrode and a seed layer for plating.

The second layer 10b is disposed near the region in which the air bearing surface described later is to be formed. The third layer 10c is disposed at a distance from the air bearing surface.

Next, as shown in FIG. 5A and FIG. 5B, a photoresist layer 12 is formed to cover the conductor portions 112 and 114, the second layer 10b and the third layer 10c. Using the photoresist layer 12 as a mask, the first layer 10a is selectively etched by ion beam etching, for example, to pattern the first layer 10a.

Next, the photoresist layer 12 is removed and, as shown in FIG. 6A and FIG. 6B, an insulating layer 13 made of photoresist, for example, is then formed in a region in which the second inner conductor portions described later are to be formed. The insulating layer 13 is formed so that at least the space between the second layer 10b and the conductor portion 112, the space between the conductor portions 112 and 114, and the space between the conductor portions 114 and the third layer 10c are filled with the insulating layer 13. Next, an insulating layer 14 made of alumina, for example, and having a thickness of 4 to 6 μm is formed so as to cover the entire top surface of the layered structure. Next, the insulating layer 14 is polished through CMP, for example, so that the insulating layer 13 is exposed.

Next, as shown in FIG. 7A and FIG. 7B, the insulating layer 13 is removed, and an insulating film 15 made of alumina, for example, is then formed so as to cover the entire top surface of the layered structure. As a result, grooves covered with the insulating film 15 are formed in the space between the second layer 10b and the conductor portion 112, the space between the conductor portions 112 and 114, and the space between the conductor portion 114 and the third layer 10c. The thickness of the insulating film 15 is smaller than or equal to that of the insulating film 11. The thickness of the insulating film 15 is preferably 0.2 μm or smaller, and more preferably falls within the range between 0.08 and 0.15 μm inclusive. The insulating film 15 may be formed by CVD, for example, in which $H_2O$, $N_2$, $N_2O$, or $H_2O_2$ as a material used for making thin films and $Al(CH_3)_3$ or $AlCl_3$ as a material used for making thin films are alternately ejected in an intermittent manner under a reduced pressure at a temperature of 100° C. or higher. Through this method, a plurality of thin alumina films are stacked so that the insulating film 15 having a desired thickness is formed.

The order in which the insulating layers 13 and 14 and the insulating film 15 are formed may be altered as follows. That is, after the first layer 10a is patterned and the photoresist layer 12 is removed, the insulating film 15 may be formed to cover the entire top surface of the layered structure. In this case, the insulating layers 13 and 14 are formed thereafter, and the insulating layer 14 is polished until the insulating layer 13 is exposed, and the insulating layer 13 is removed. In this case, the conductor portions 112 and 114 are reinforced by the insulating film 15 so as to prevent the conductor portions 112 and 114 from being damaged or broken when the insulating layer 14 is polished.

Next, as shown in FIG. 8A and FIG. 8B, a first conductive film made of Cu, for example, and having a thickness of 30 to 50 nm, for example, is formed by sputtering, for example, so as to cover the entire top surface of the layered structure. On the first conductive film, a second conductive film made of Cu, for example, and having a thickness of 50 to 80 nm, for example, is formed by CVD. The second conductive film is not intended to be used for filling the groove between the second layer 10b and the conductor portion 112, the groove between the conductor portions 112 and 114, and the groove between the conductor portion 114 and the third layer 10c, but is intended to cover the grooves, taking advantage of good step coverage of CVD. The first and second conductive films in combination are called an electrode film 16. The electrode film 16 functions as an electrode and a seed layer for plating. Next, on the electrode film 16, a conductive layer 17 made of Cu, for example, and having a thickness of 4 to 5 µm, for example, is formed by plating. The electrode film 16 and the conductive layer 17 are used for making the second inner conductor portions. The conductive layer 17 of Cu is formed through plating on the second conductive film of Cu formed by CVD, so that the second conductor portions are properly formed in the space between the second layer 10b and the conductor portion 112, the space between the conductor portions 112 and 114, and the space between the conductor portion 114 and the third layer 10c.

Next, as shown in FIG. 9A and FIG. 9B, the conductive layer 17 is polished by CMP, for example, so that the second layer 10b, the third layer 10c, and the first inner conductor portions 112 and 114 are exposed. Consequently, the second inner conductor portions 111, 113 and 115 are made up of the conductive layer 17 and the electrode film 16 remaining in the space between the second layer 10b and the conductor portion 112, the space between the conductor portions 112 and 114, and the space between the conductor portion 114 and the third layer 10c. As thus described, the second inner conductor portions are disposed adjacent to the first inner conductor portions. The second inner conductor portions are formed such that only the insulating film 15 is provided between adjacent ones of the first inner conductor portions and the second inner conductor portions.

FIG. 18 is a plan view that shows the inner conductor portions 111 to 115. FIG. 9A is a cross section taken along line 9A—9A of FIG. 18. Connecting portions 131 to 140 and the top pole layer 25 that will be formed later are shown in FIG. 18, too. As shown in FIG. 18, the inner conductor portions 111 to 115 are disposed side by side and extend in the direction intersecting the direction orthogonal to the air bearing surface (that is, the horizontal direction of FIG. 18). The inner conductor portions 111 to 115 have contact portions 111a to 115a provided near ends of the respective inner conductor portions 111 to 115, and contact portions 111b to 115b provided near the other ends of the respective inner conductor portions 111 to 115. The contact portions 111a to 115a are in contact with connecting portions 131, 133, 135, 137 and 139, respectively. The contact portions 111b to 115b are in contact with connecting portions 132, 134, 136, 138 and 140, respectively.

As shown in FIG. 10A and FIG. 10B, an insulating film 19 made of alumina, for example, and having a thickness of 0.2 µm, for example, is formed to cover the entire top surface of the layered structure. Etching is selectively performed on the insulating film 19 in the portions corresponding to the second layer 10b, the third layer 10c, and the contact portions of the inner conductor portions 111 to 115.

Next, frame plating, for example, is performed to form a fourth layer 10d on the second layer 10b, a fifth layer 10e on the third layer 10c, and first connecting portion layers on the respective inner conductor portions 111 to 115. FIG. 10A shows a connecting portion layer 18a that is one of the first connecting portion layers formed on the contact portion 114b of the conductor portion 114. The fourth layer 10d, the fifth layer 10e and the first connecting portion layers may be made of a high saturation flux density material such as CoNiFe having a saturation flux density of 2.1 T, or FeCo$_x$ having a saturation flux density of 2.3 T.

Next, an insulating layer 20 made of alumina, for example, and having a thickness of 2 to 3 µm, for example, is formed to cover the entire top surface of the layered structure. The insulating layer 20 is then polished by CMP, for example, so that the fourth layer 10d, the fifth layer 10e and the first connecting portion layers are exposed.

Next, as shown in FIG. 11A and FIG. 11B, a magnetic layer 21 made of a magnetic material and having a thickness of 0.7 to 1.0 µm is formed by sputtering, so as to cover the entire top surface of the layered structure. The magnetic layer 21 may be made of a high saturation flux density material such as CoFeN having a saturation flux density of 2.4 T.

Next, on the magnetic layer 21, an etching mask 22a is formed in the portion corresponding to the fourth layer 10d, an etching mask 22b is formed in the portion corresponding to the fifth layer 10e, and etching masks are formed in the portions corresponding to the first connecting portion layers. FIG. 11A shows an etching mask 22c, one of the etching masks corresponding to the first connecting portion layers, that corresponds to the connecting portion layer 18a. The etching masks may be made of metal. In this case, the etching masks may be formed by plating, or frame plating, in particular. The etching masks may also be made of a magnetic material different from the material of which the magnetic layer 21 is made. The magnetic material of the etching masks may be NiFe or CoNiFe. The thickness of the masks may be 1 to 2 µm.

Figures 12A, 12B:
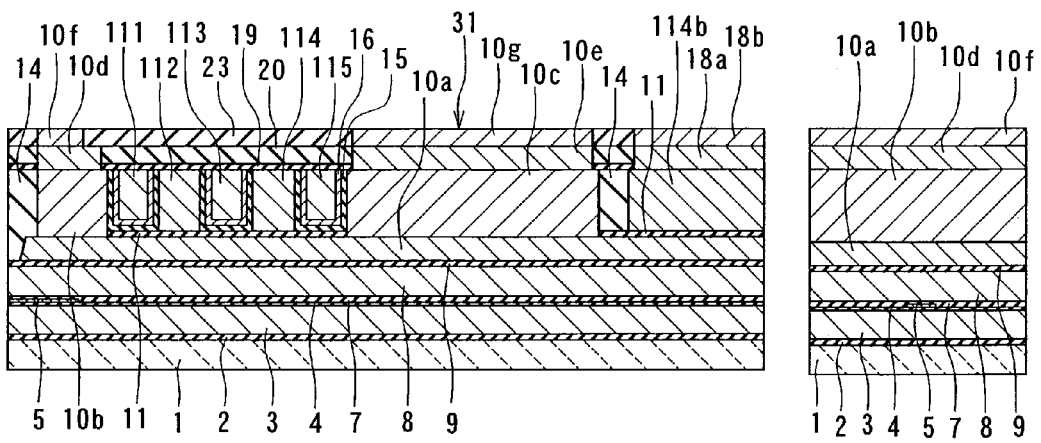
FIG. 12A and FIG. 12B are cross-sectional views for illustrating a step that follows FIG. 11A and FIG. 11B.

Next, the magnetic layer 21 is etched by ion beam etching or reactive ion etching (hereinafter referred to as RIE) utilizing a halogen gas such as Cl$_2$ through the use of the above-mentioned etching masks. As shown in FIG. 12A and FIG. 12B, a sixth layer 10f, a seventh layer 10g and a plurality of second connecting portion layers are made up of portions of the magnetic layer 21 remaining under the etching masks after the etching. The second connecting portion layers are disposed on the first connecting portion layers. FIG. 12A shows a second connecting portion layer 18b, one of the second connecting portion layers, that is disposed on the first connecting portion layer 18a.

Next, an insulating layer 23 made of alumina, for example, and having a thickness of 2 to 3 µm is formed so as to cover the entire top surface of the layered structure. The insulating layer 23 is then polished by CMP, for example. This polishing is performed so as to remove the etching masks and to flatten the top surfaces of the sixth layer 10f, the seventh layer 10g, the second connecting portion layers, and the insulating layer 23. This polishing is performed to make the sixth layer 10f 0.5 to 0.7 µm thick.

An end of the sixth layer 10f located farther from the air bearing surface defines the throat height of the write head. The throat height is the length (height) of the magnetic pole portions, that is, the portions of the two pole layers opposed to each other with the recording gap layer in between, as taken from the air-bearing-surface-side end to the other end.

The third layer 10c, the fifth layer 10e and the seventh layer 10g constitute a coupling portion 31 for establishing magnetic coupling between the bottom pole layer 10 and the top pole layer.

Figures 13A, 13B:
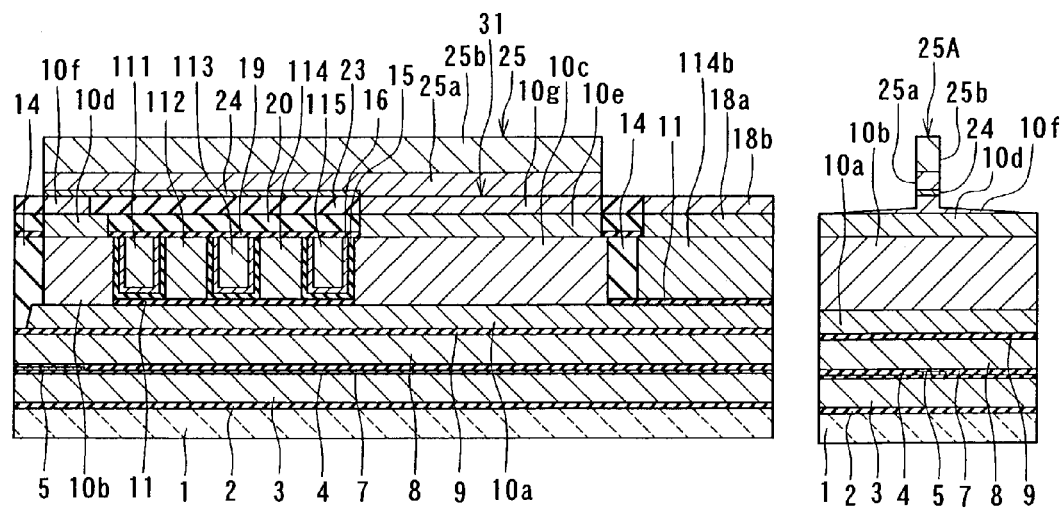
FIG. 13A and FIG. 13B are cross-sectional views for illustrating a step that follows FIG. 12A and FIG. 12B.

Next, as shown in FIG. 13A and FIG. 13B, the recording gap layer 24 having a thickness of 0.06 to 0.09 μm is formed to cover the entire top surface of the layered structure. The recording gap layer 24 may be made of an insulating material such as alumina or a nonmagnetic metal material such as Ru, NiCu, Mo, W or Ta. In the embodiment the recording gap layer 24 is made of Ru, for example. Next, portions of the recording gap layer 24 corresponding to the seventh layer 10g and the second connecting portion layers are selectively etched.

Next, a magnetic layer made of a magnetic material and having a thickness of 0.3 to 0.7 μm is formed by sputtering, for example, so as to cover the entire top surface of the layered structure. The magnetic layer may be made of a high saturation flux density material such as CoFeN having a saturation flux density of 2.4 T, or $FeCo_x$ having a saturation flux density of 2.3 T.

Next, a second layer 25b of the top pole layer 25 described later having a thickness of 3.0 to 3.8 μm, for example, is formed by frame plating, for example, on the magnetic layer. The second layer 25b may be made of a high saturation flux density material such as $FeCo_x$ having a saturation flux density of 2.3 T, or CoNiFe having a saturation flux density of 2.1 T. The second layer 25b is disposed to extend from a region corresponding to the sixth layer 10f of the bottom pole layer 10 to a region corresponding to the seventh layer 10g.

Next, the above-mentioned magnetic layer is etched by ion beam etching or RIE utilizing a halogen gas such as $Cl_2$ at a temperature of 200 to 250° C. through the use of the second layer 25b as an etching mask. A first layer 25a of the top pole layer is thereby made up of the magnetic layer remaining after the etching. The first layer 25a is located below the second layer 25b.

The top pole layer 25 incorporates the first layer 25a that touches the recording gap layer 24, and the second layer 25b that is located on the first layer 25a. As shown in FIG. 1, the top pole layer 25 includes: a track width defining portion 25A having an end located in the air bearing surface and the other end located away from the air bearing surface; and a yoke portion 25B coupled to the other end of the track width defining portion 25A. The yoke portion 25B is equal in width to the track width defining portion 25A at the interface with the track width defining portion 25A. The yoke portion 25B gradually increases in width from this interface as the distance from the track width defining portion 25A increases, and maintains a specific width to the end. The track width defining portion 25A is the pole portion of the top pole layer 25, and defines the write track width.

Next, although not shown, a photoresist mask having an opening around the track width defining portion 25A is formed. A portion of the recording gap layer 24 around the track width defining portion 25A and a portion of the sixth layer 10f are etched by ion beam etching or RIE, for example, using the above-mentioned photoresist mask and the top pole layer 25 as masks. A trim structure as shown in FIG. 13B is thereby formed. The trim structure suppresses an increase in the effective recording track width due to expansion of a magnetic flux generated during writing in a narrow track. A portion of the sixth layer 10f that is opposed to the track width defining portion 25A of the top pole layer 25 with the recording gap layer 24 in between is the pole portion of the bottom pole layer 10.

Next, as shown in FIG. 14A and FIG. 14B, an insulating film 26 made of alumina, for example, and having a thickness of 0.2 to 0.5 μm is formed to cover the entire top surface of the layered structure. Portions of the insulating film 26 located on the second connecting portion layers are selectively etched. On the second connecting portion layers, third connecting portion layers having a thickness of 1 to 2.5 μm, for example, are formed by frame plating, for example. The third connecting portion layers may be made of Cu. FIG. 14A shows a third connecting portion layer 18c, one of the third connecting portion layers, located on the second connecting portion layer 18b.

Next, as shown in FIG. 15A and FIG. 15B, an insulating layer 27 made of alumina, for example, and having a thickness of 2 to 3 μm is formed to cover the entire top surface of the layered structure. The insulating layer 27 is then polished by CMP, for example, so that the third connecting portion layers are exposed. The first to third connecting portion layers make up connecting portions that connect the inner conductor portions to the outer conductor portions. FIG. 15A shows a connecting portion 138 that connects the conductor portion 114 to an outer conductor portion that will be formed later.

Next, as shown in FIG. 16A and FIG. 16B, outer conductor portions 121 to 125 made of Cu, for example, are formed by frame plating, for example, on the insulating layer 27. FIG. 19 is a plan view showing the outer conductor portions 121 to 125. FIG. 16A is a cross section taken along line 16A—16A of FIG. 19. As shown in FIG. 19, the outer conductor portions 121 to 125 are disposed side by side on a side opposite to the inner conductor portions 111 to 115, the top pole layer 25 being disposed in between, and extend in the direction intersecting the direction orthogonal to the air bearing surface.

The outer conductor portion 121 has an end connected to a pad for an electrode described later. The outer conductor portion 121 has the other end in the neighborhood of which a contact portion 121b is provided. The outer conductor portions 122 to 125 have contact portions 122a to 125a each of which is provided near an end of each of the conductor portions 122 to 125, and contact portions 122b to 125b each of which is provided near the other end of each of the conductor portions 122 to 125. The contact portions 121b to 125b are in contact with the connecting portions 131, 133, 135, 137 and 139, respectively. The contact portions 122a to 125a are in contact with the connecting portions 132, 134, 136 and 138, respectively.

When the outer conductor portions 121 to 125 are formed, a lead layer 126 shown in FIG. 19 is formed at the same time, using a material and a method the same as those of the outer conductor portions 121 to 125. The lead layer 126 has an end connected to the contact portion 115b of the second inner conductor portion 115 through the connecting portion 140. The lead layer 126 has the other end to be connected to a pad for an electrode described later.

The inner conductor portions 111 to 115, the outer conductor portions 121 to 125, and the connecting portions 131 to 140 make up the thin-film coil 110. The thin-film coil 110 is insulated from the bottom pole layer 10 and the top pole layer 25 and wound around the top pole layer 25 in a helical manner.

Figure 17A:
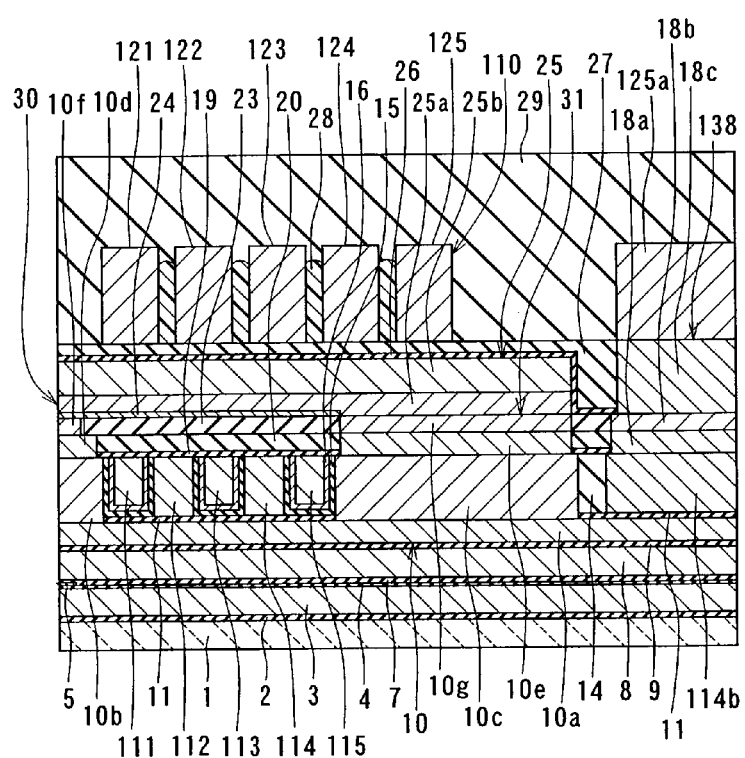
FIG. 17A and FIG. 17B are cross-sectional views for illustrating a step that follows FIG. 16A and FIG. 16B.
Figure 17B:
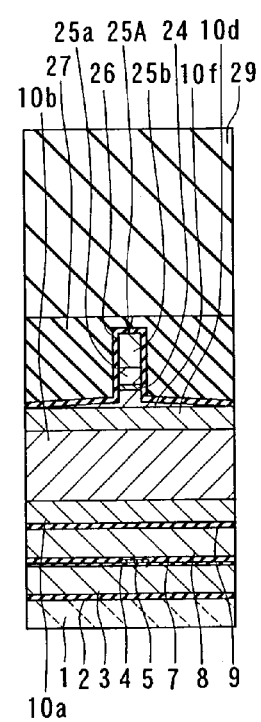

Next, as shown in FIG. 17A and FIG. 17B, an overcoat layer 29 made of alumina, for example, and having a thickness of 20 to 40 μm is formed so as to cover the entire top surface of the layered structure. The surface of the overcoat layer 29 is flattened, and electrode pads (not shown) are formed thereon. Finally, the slider including the foregoing layers is lapped to form the air bearing surface 30. The thin-film magnetic head including the read and write heads is thus completed.

If the space between adjacent ones of the outer conductor portions is too narrow, it is possible that the overcoat layer 29 will not be completely embedded in the space. In such a case, as shown in FIG. 17A, an insulating layer 28 made of an organic film may be formed in the space between adjacent ones of the outer conductor portions, which is followed by formation of the overcoat layer 29. For example, the insulating layer 28 may be formed by filling the space between adjacent ones of the outer conductor portions with a photoresist in a fluid state, and then hardening the photoresist. It is thereby possible to insulate adjacent ones of the outer conductor portions from each other with reliability.

The thin-film magnetic head of the present embodiment comprises: the substrate 1; the read head and the write head (the induction-type electromagnetic transducer) that are stacked on the substrate 1; and the air bearing surface 30 serving as a medium facing surface that faces toward a recording medium.

The read head includes: the MR element 5 located near the air bearing surface 30; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8. The portions of the bottom shield layer 3 and the top shield layer 8 located on a side of the air bearing surface 30 are opposed to each other with the MR element 5 in between.

The write head comprises the bottom pole layer 10 and the top pole layer 25 that are magnetically coupled to each other and include the pole portions opposed to each other and located in the regions of the pole layers on the side of the air bearing surface 30. The write head further comprises: the recording gap layer 24 disposed between the pole portion of the bottom pole layer 10 and the pole portion of the top pole layer 25; and the thin-film coil 110. The thin-film coil 110 is wound around the top pole layer 25 in a helical manner, and insulated from the bottom pole layer 10 and the top pole layer 25. The bottom pole layer 10 and the top pole layer 25 of the present embodiment correspond to the first pole layer and the second pole layer of the invention, respectively.

The bottom pole layer 10 includes the first layer 10*a*, the second layer 10*b*, and the third layer 10*c*. The first layer 10*a* is disposed to be opposed to the inner conductor portions 111 to 115 of the thin-film coil 110. The second layer 10*b* is disposed near the air bearing surface 30 and connected to the first layer 10*a* in such a manner that the second layer 10*b* protrudes closer toward the top pole layer 25 than the first layer 10*a*. The third layer 10*c* is disposed away from the air bearing surface 30 and connected to the first layer 10*a* in such a manner that the third layer 10*c* protrudes closer toward the top pole layer 25 than the first layer 10*a*. The first layer 10*a*, the second layer 10*b*, and the third layer 10*c* correspond to the first portion, the second portion, and the third portion of the invention, respectively. Part of the inner conductor portions 111 to 115 of the thin-film coil 110 is disposed between the second layer 10*b* and the third layer 10*c*. The top pole layer 25 has the first layer 25*a* and the second layer 25*b* that are both flat.

The thin-film coil 110 includes the inner conductor portions 111 to 115, the outer conductor portions 121 to 125, and the connecting portions 131 to 140. Reference is now made to FIG. 1, FIG. 18 and FIG. 19 to give detailed descriptions of the relationship of connection among the inner conductor portions 111 to 115, the outer conductor portions 121 to 125, and the connecting portions 131 to 140. The contact portion 121*b* of the outer conductor portion 121 is connected to the contact portion 111*a* of the inner conductor portion 111 through the connecting portion 131. The contact portion 111*b* of the inner conductor portion 111 is connected to the contact portion 122*a* of the outer conductor portion 122 through the connecting portion 132. The contact portion 122*b* of the outer conductor portion 122 is connected to the contact portion 112*a* of the inner conductor portion 112 through the connecting portion 133. The contact portion 112*b* of the inner conductor portion 112 is connected to the contact portion 123*a* of the outer conductor portion 123 through the connecting portion 134. The contact portion 123*b* of the outer conductor portion 123 is connected to the contact portion 113*a* of the inner conductor portion 113 through the connecting portion 135. The contact portion 113*b* of the inner conductor portion 113 is connected to the contact portion 124*a* of the outer conductor portion 124 through the connecting portion 136. The contact portion 124*b* of the outer conductor portion 124 is connected to the contact portion 114*a* of the inner conductor portion 114 through the connecting portion 137. The contact portion 114*b* of the inner conductor portion 114 is connected to the contact portion 125*a* of the outer conductor portion 125 through the connecting portion 138. The contact portion 125*b* of the outer conductor portion 125 is connected to the contact portion 115*a* of the inner conductor portion 115 through the connecting portion 139. The contact portion 115*b* of the inner conductor portion 115 is connected to the lead layer 126 through the connecting portion 140. The five-turn thin-film coil 110 wound around the top pole layer 25 in a helical manner is thus formed.

As described above, the thin-film coil 110 is wound around the top pole layer 25 in a helical manner. As a result, the thin-film magnetic head of the embodiment allows the magnetic flux generated by the coil 110 to be utilized for writing with efficiency. Therefore, according to the embodiment, it is possible to make the number of turns of the thin-film coil smaller than that of a flat whorl-shaped thin-film coil, and to thereby reduce the yoke length.

According to the embodiment, the insulating film 15 is provided between adjacent ones of the inner conductor portions. The space between adjacent ones of the inner conductor portions is equal to the thickness of the insulating film 15. That is, only the insulating film 15 exists between adjacent ones of the inner conductor portions. The space between adjacent ones of the inner conductor portions, that is, the thickness of the insulating film 15 is equal to or smaller than the minimum distance between the bottom pole layer 10 and the bottom of the inner conductor portions. In the embodiment the minimum distance between the bottom pole layer 10 and the bottom of the inner conductor portions is equal to the thickness of the insulating film 11 disposed between the first layer 10*a* and the bottoms of the conductor portions 112 and 114.

According to the embodiment, only the insulating film 15 exists between the second layer 10*b* and the inner conductor portion 111 that is closest to the second layer 10*b*, and between the third layer 10*c* and the inner conductor portion 115 that is closest to the third layer 10*c*, respectively. Therefore, the space between the second layer 10*b* and the inner conductor portion 111 and the space between the third layer 10*c* and the inner conductor portion 115 are each equal to the thickness of the insulating film 15.

As thus described, according to the embodiment, it is possible to greatly reduce the space between the inner conductor portion 111 and the second layer 10*b*, the space between neighboring ones of the inner conductor portions, and the space between the inner conductor portion 115 and the third layer 10c. The third layer 10c is a part of the coupling portion 31. The distance between the third layer 10c and the air bearing surface 30 is the yoke length. Therefore, according to the embodiment, it is possible to increase the thickness of the inner conductor portions 111 to 115 and to reduce the yoke length at the same time. A reduction in the resistance of the thin-film coil 110 is thereby achieved while the yoke length, that is, the magnetic path length is reduced.

According to the embodiment, part of the outer conductor portions is disposed to face the top surfaces of the third layer 10c and the coupling portion 31. As a result, it is possible to increase the outer conductor portions in width so as to further reduce the resistance of the thin-film coil 110.

As thus described, according to the embodiment of the invention, it is possible to achieve the thin-film magnetic head having a reduced magnetic path length and thus having excellent writing characteristics in the high frequency band, and having the thin-film coil 110 with a low resistance.

According to the embodiment, the insulating film 15 is made up of layers of a plurality of thin alumina films formed by CVD. The insulating film 15 is therefore closely packed. As a result, it is possible to properly insulate the inner conductor portion 111 from the second layer 10b, adjacent ones of the inner conductor portions from each other, and the inner conductor portion 115 from the third layer 10c, while it is possible to greatly reduce the space between the inner conductor portion 111 and the second layer 10b, the space between adjacent ones of the inner conductor portions, and the space between the inner conductor portion 115 and the third layer 10c.

According to the embodiment, the space between adjacent ones of the outer conductor portions is greater than the space between adjacent ones of the inner conductor portions. It is therefore possible to easily form the outer conductor portions 121 to 125.

According to the embodiment, the minimum width of the outer conductor portions 121 to 125 is greater than the minimum width of the inner conductor portions 111 to 115. It is therefore possible to further reduce the resistance of the thin-film coil 110.

According to the embodiment, as shown in FIG. 17A and FIG. 17B, part of the outer conductor portions is disposed to face the top surfaces of the third layer 10c and the coupling portion 31. It is thereby possible to increase the outer conductor portions in width so as to further reduce the resistance of the thin-film coil 110.

According to the embodiment, as shown in FIG. 1 and FIG. 18, the third layer 10c has an end face 32 that faces toward the air bearing surface 30. The end face 32 includes a curved surface that protrudes toward the air bearing surface 30. The end face 32 may be shaped like part of the surface of a cylinder, for example. In the embodiment the top surface of the third layer 10c is shaped like a combination of a semicircle and a rectangle such that the chord of the semicircle and one of the longer sides of the rectangle are shared.

As shown in FIG. 1, the inner conductor portions 111 to 115 each have the minimum width on an imaginary line 50 drawn between the end face 32 of the third layer 10c and the air bearing surface 30 at the shortest distance. Each of the inner conductor portions 111 to 115 includes a changing width portion in which the width increases as the distance from the imaginary line 50 increases. It is thereby possible to reduce the length of the portion having the minimum width of each of the inner conductor portions 111 to 115. As a result, according to the embodiment, a reduction in resistance of the thin-film coil 110 is achieved while the yoke length, that is, the magnetic path length is reduced.

In the example shown in FIG. 18, a side of the inner conductor portion 111 that is close to the third layer 10c has a circular-arc-shaped portion. A side of the inner conductor portion 111 that is close to the air bearing surface 30 is made up of a plurality of straight lines. Both sides of each of the inner conductor portions 112 to 115 are made up of a plurality of straight lines, too.

According to the embodiment, if the second layer 10b, the fourth layer 10d, the sixth layer 10f, and the top pole layer 25 are made of a high saturation flux density material, it is possible to prevent flux saturation halfway through the magnetic path. As a result, it is possible to utilize a magnetomotive force generated by the thin-film coil 110 for writing with efficiency.

According to the embodiment, the thin-film coil 110 is wound around the top pole layer 25 in a helical manner. As a result, it is possible to make the region in which the coil 110 is disposed smaller, compared to the case in which the thin-film coil is flat whorl-shaped. It is therefore possible to reduce the thin-film magnetic head in size.

For example, a thin-film magnetic head is disclosed in U.S. Pat. No. 6,043,959 in which the top pole layer includes a pole portion layer of a small width and a yoke portion layer of a great width that is connected to the top surface of the pole portion layer. In such a thin-film magnetic head, the following problems arise when the write track width is small, in particular. In the head the cross-sectional area of the magnetic path abruptly decreases in the portion connecting the pole portion layer to the yoke portion layer. As a result, a magnetic flux may be saturated in this portion, which can hamper sufficient transmission of the magnetic flux from the yoke portion layer to the pole portion layer. Hence, the overwrite property of the thin-film magnetic head may be deteriorated.

In the foregoing thin-film magnetic head in which the top pole layer includes the pole portion layer and the yoke portion layer, a magnetic flux leaks from the yoke portion layer toward the recording medium. As a result, 'side write' may be caused by the yoke portion layer that is great in width. That is, data may be written in a region of the recording medium where data is not supposed to be written. 'Side erase' may also result, that is, data in a region in which data is not supposed to be erased may be erased. In this case, the effective track width may be greater than a desired track width. In addition, since the positional relationship between the pole portion layer and the yoke portion layer is determined by alignment in photolithography, it is possible that the actual positional relationship between the two layers may be off a desired relationship. This may cause side write and side erase more frequently.

In contrast, according to the embodiment of the invention, the top pole layer 25 that defines the track width is flat. As a result, no magnetic flux saturation occurs in the portion connecting the pole portion layer to the yoke portion layer. Consequently, according to the embodiment, there will occur none of such problems as mentioned above, that is, deterioration in overwrite property, and side write and side erase attributed to the yoke portion layer.

In the embodiment the flat top pole layer 25 is formed on the flat base. It is thereby possible to form the track width defining portion of the top pole layer 25 that is small in size with precision. As a result, it is possible to achieve a track width of 0.2 μm or smaller, for example, which has been heretofore difficult in mass-produced thin-film magnetic heads.

First to fifth modification examples of the first embodiment of the invention will now be described.

FIRST MODIFICATION EXAMPLE

Figure 20:
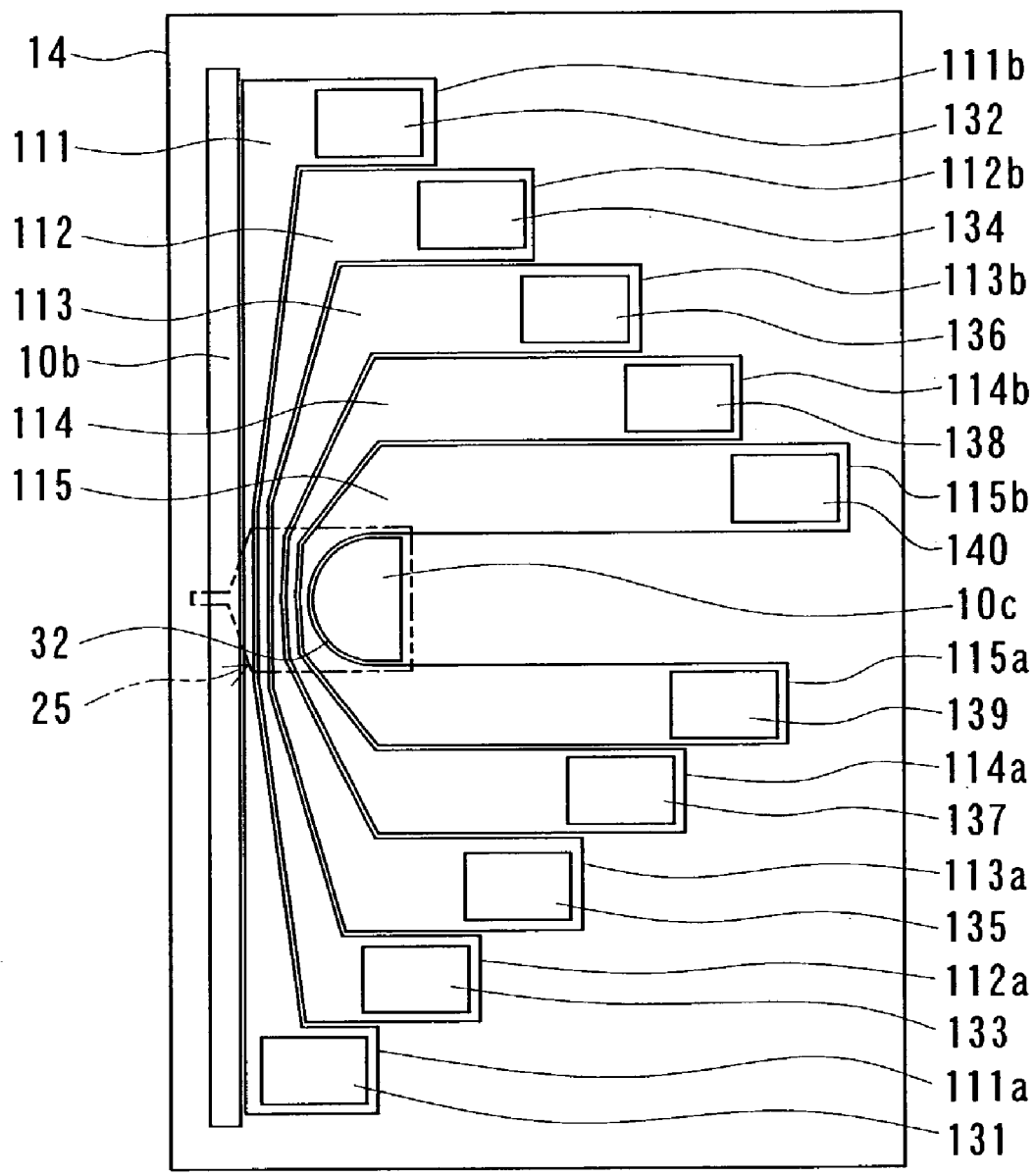
FIG. 20 is a plan view showing inner conductor portions and connecting portions of the thin-film coil of a first modification example of the first embodiment.
Figure 21:
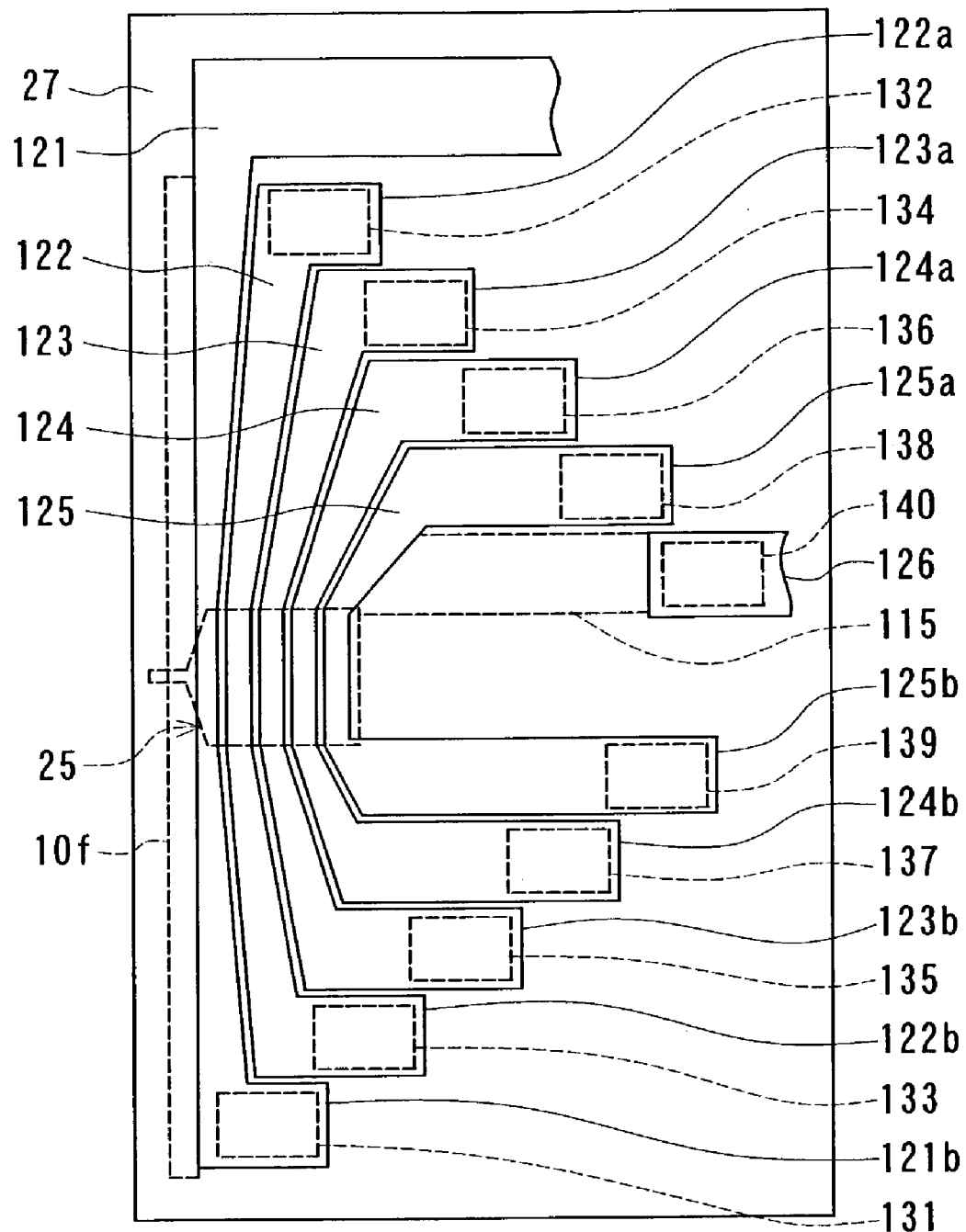
FIG. 21 is a plan view showing outer conductor portions of the thin-film coil of the first modification example of the first embodiment.

Reference is now made to FIG. 20 and FIG. 21 to describe the first modification example. FIG. 20 is a plan view showing the inner conductor portions and the connecting portions of the thin-film coil of the first modification example. FIG. 21 is a plan view showing the outer conductor portions of the thin-film coil of the first modification example. In the first modification example the connecting portions 131 to 140 are disposed such that adjacent ones of the connecting portions are shifted from each other in the direction orthogonal to the air bearing surface 30 (the horizontal direction of FIG. 20 and FIG. 21) and in the direction parallel to the air bearing surface 30 (the vertical direction of FIG. 20 and FIG. 21). The remainder of configurations of the first modification example is similar to the configurations shown in FIG. 1, FIG. 2A to FIG. 17A, FIG. 2B to FIG. 17B, FIG. 18 and FIG. 19).

As shown in FIG. 1, FIG. 17A and FIG. 17B, the connecting portions 131 to 140 are insulated from one another by the insulating layers 20, 23 and 27 that surround the connecting portions 131 to 140. If the space between neighboring ones of the connecting portions 131 to 140 is small, there is a possibility that each of the insulating layers 20, 23 and 27 may be prevented from fully entering the space between neighboring ones of the connecting portions 131 to 140 and a gap may be made. In such a case, a plating liquid and the like used for making the outer conductor portions 121 to 125 may enter the gap and thereby greatly reduce the reliability of the thin-film magnetic head and the manufacturing process thereof. In the first modification example the connecting portions are disposed such that adjacent ones of the connecting portions are shifted from each other in the direction orthogonal to the air bearing surface 30 and in the direction parallel to the air bearing surface 30. The space between adjacent ones of the connecting portions is thereby enlarged, so that creation of a gap between adjacent ones of the connecting portions is prevented.

SECOND MODIFICATION EXAMPLE

Figure 22:
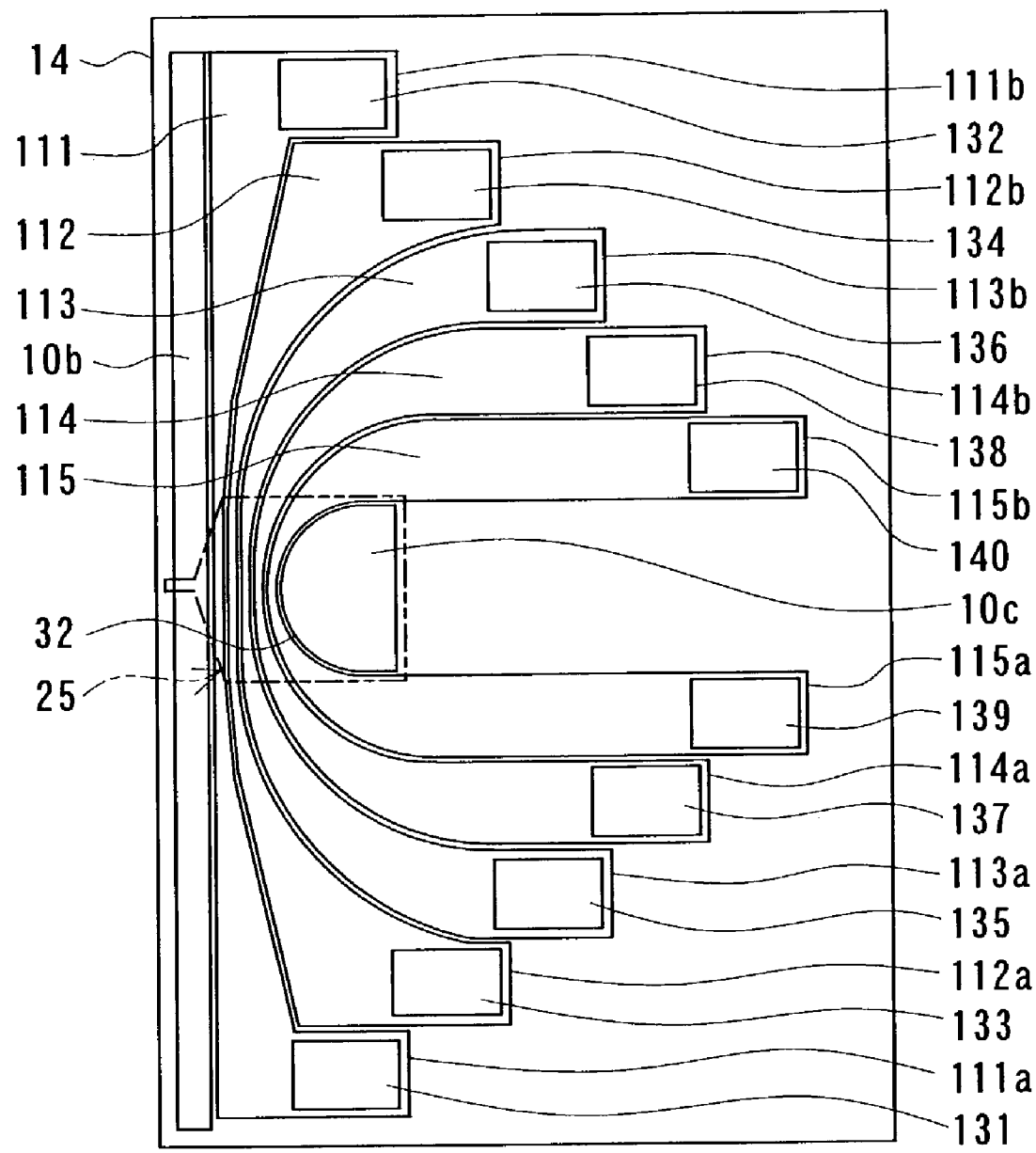
FIG. 22 is a plan view showing inner conductor portions and connecting portions of the thin-film coil of a second modification example of the first embodiment.
Figure 23:
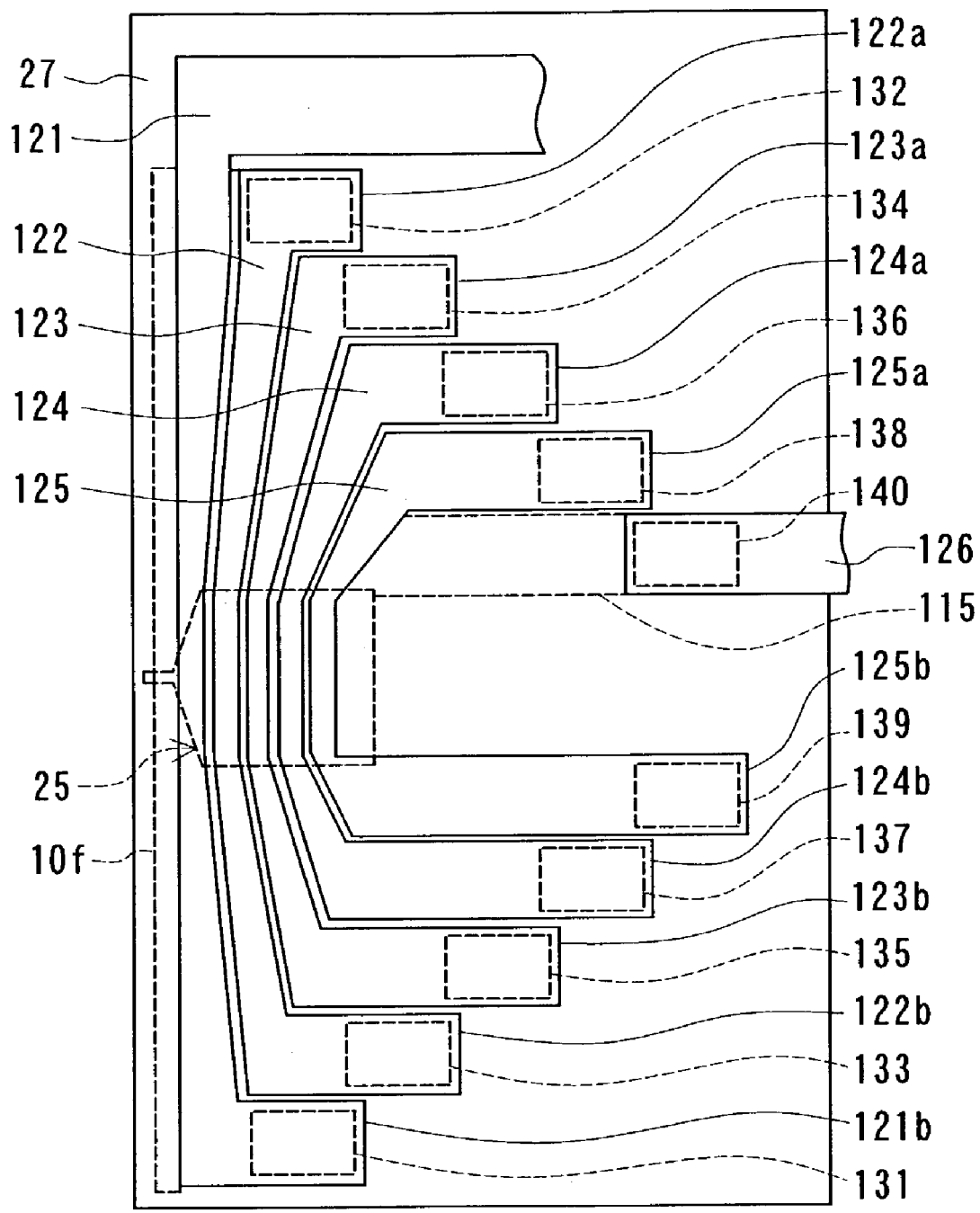
FIG. 23 is a plan view showing outer conductor portions of the thin-film coil of the second modification example of the first embodiment.

Reference is now made to FIG. 22 and FIG. 23 to describe the second modification example. FIG. 22 is a plan view showing the inner conductor portions and the connecting portions of the thin-film coil of the second modification example. FIG. 23 is a plan view showing the outer conductor portions of the thin-film coil of the second modification example. In the second modification example a side of the inner conductor portion 112 that is close to the third layer 10c has an arc-shaped portion. Each side of each of the inner conductor portions 113 to 115 has an arc-shaped portion, too. The remainder of configurations of the second modification example are similar to those of the first modification example. According to the second modification example, the inner conductor portions 112 to 115 having the above-described shapes allow photolithography for forming the inner conductor portions 111 to 115 to be more easily performed, compared to the first modification example, and allow the inner conductor portions 111 to 115 to be smaller in size. It is further possible to reduce the resistance of each of the inner conductor portions 111 to 115.

THIRD MODIFICATION EXAMPLE

Figure 24:
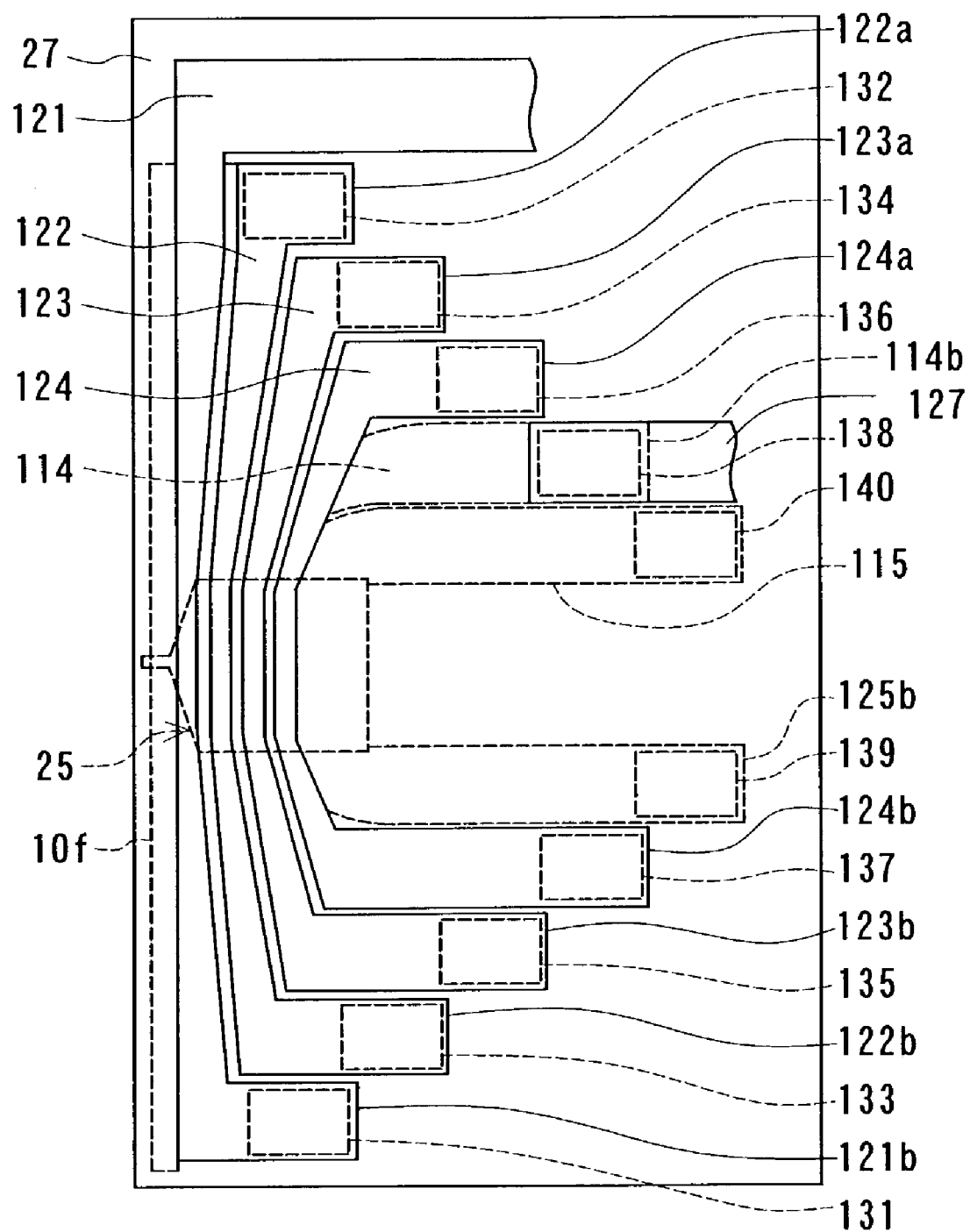
FIG. 24 is a plan view showing outer conductor portions and a lead layer of a third modification example of the first embodiment wherein a four-turn thin-film coil is formed.
Figure 25:
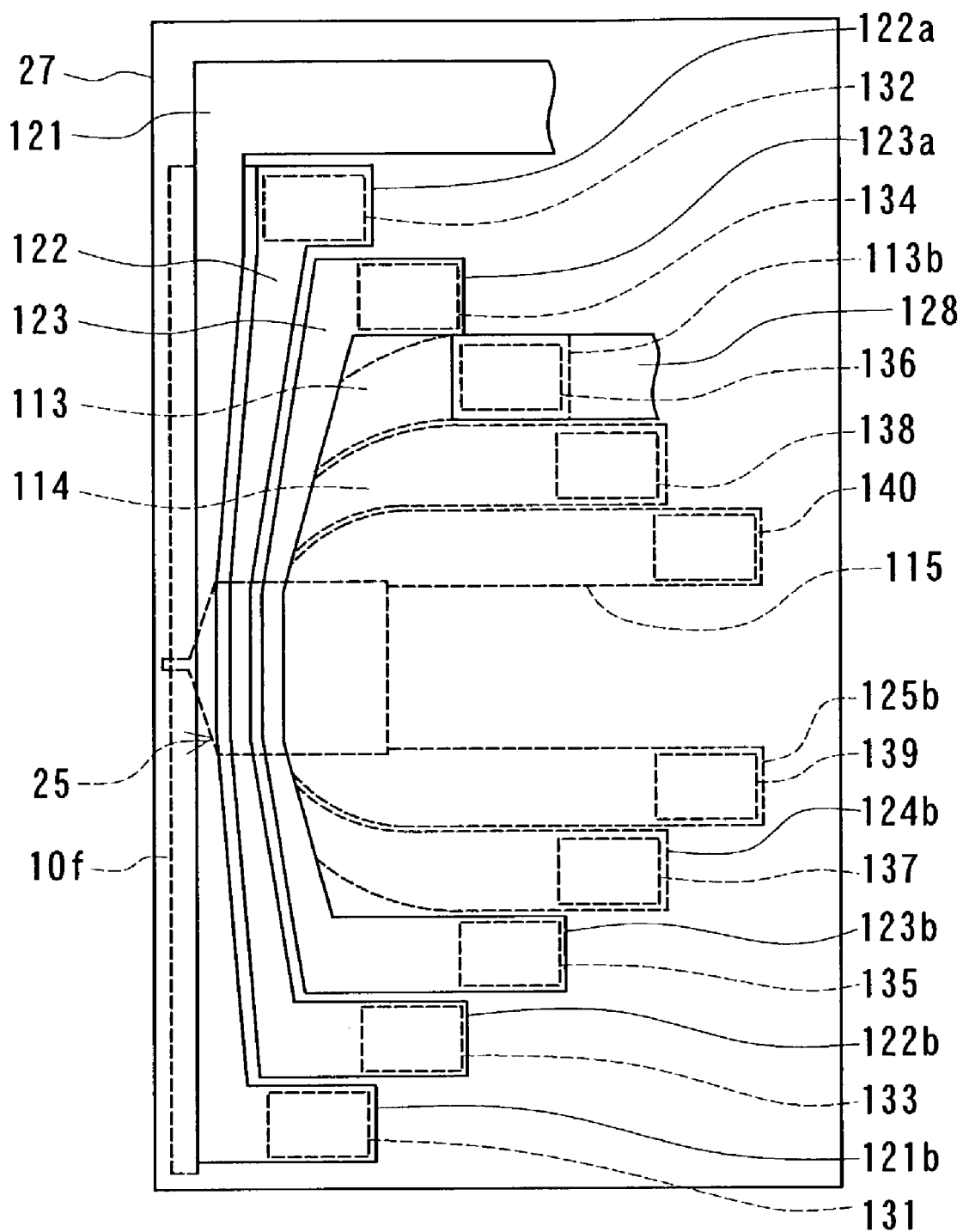
FIG. 25 is a plan view showing outer conductor portions and a lead layer of the third modification example of the first embodiment wherein a three-turn thin-film coil is formed.

Reference is now made to FIG. 24 and FIG. 25 to describe the third modification example. The third modification example is an example in which the number of the outer conductor portions is chosen so that the number of the turns of the thin-film coil is chosen. The configurations of the third modification example except the outer conductor portions and the lead layer are similar to those of the second modification example. The following are descriptions of an example in which a four-turn thin-film coil is formed and an example in which a three-turn thin-film coil is formed.

FIG. 24 is a plan view showing the outer conductor portions and the lead layer when the four-turn thin-film coil is formed. In this case, as shown in FIG. 24, the outer conductor portions 121 to 124 are provided while the outer conductor portion 125 is omitted. The connecting portions 131 to 140 are all provided. In addition, a lead layer 127 is provided in place of the lead layer 126. The lead layer 127 has an end connected to the contact portion 114b of the first inner conductor portion 114 via the connecting portion 138. The lead layer 127 has the other end connected to a pad for an electrode.

FIG. 25 is a plan view showing the outer conductor portions and the lead layer when the three-turn thin-film coil is formed. In this case, as shown in FIG. 25, the outer conductor portions 121 to 123 are provided while the outer conductor portions 124 and 125 are omitted. The connecting portions 131 to 140 are all provided. In addition, a lead layer 128 is provided in place of the lead layer 126. The lead layer 128 has an end connected to the contact portion 113b of the second inner conductor portion 113 via the connecting portion 136. The lead layer 128 has the other end connected to a pad for an electrode.

In such a manner, the third modification example allows the number of turns of the thin-film coil to be easily chosen simply by changing the number of the outer conductor portions and the location of the lead layer. It is thereby possible to adjust the amount of lines of magnetic flux generated by the thin-film coil. For applications in which it is important to prevent side write and side erase and to prevent the pole portions from protruding due to the heat generated by the coil, for example, it is effective to reduce the number of turns of the coil so as to reduce the amount of line of flux generated by the coil, and to reduce the resistance of the coil. For applications in which it is important to improve writing characteristics such as the overwrite property, it is effective to increase the number of turns of the coil so as to enhance the amount of line of flux generated by the coil.

According to the third modification example, it is possible that a partially-fabricated product including the components at least from the substrate 1 to the connecting portions 131 to 140 is stocked, and the required number of the outer conductor portions are added to the partially-fabricated product so as to meet the application, and the thin-film magnetic head is thus completed. It is thereby possible to fabricate the thin-film magnetic head having desired characteristics in a short period of time.

As described above, the partially-fabricated product including the components at least up to the connecting portions 131 to 140 is a first mode of a thin-film magnetic head substructure of the present embodiment of the invention. The thin-film magnetic head substructure comprises the substrate 1 and the read head. The substructure further comprises: the bottom pole layer 10; the inner conductor portions 111 to 115 and the connecting portions 131 to 140 of the thin-film coil; the insulating film 15; the recording gap layer 24; and the top pole layer 25. To be specific, the layered structure shown in FIG. 15A and FIG. 15B is the thin-film magnetic head substructure of this example.

FOURTH MODIFICATION EXAMPLE

Figure 26:
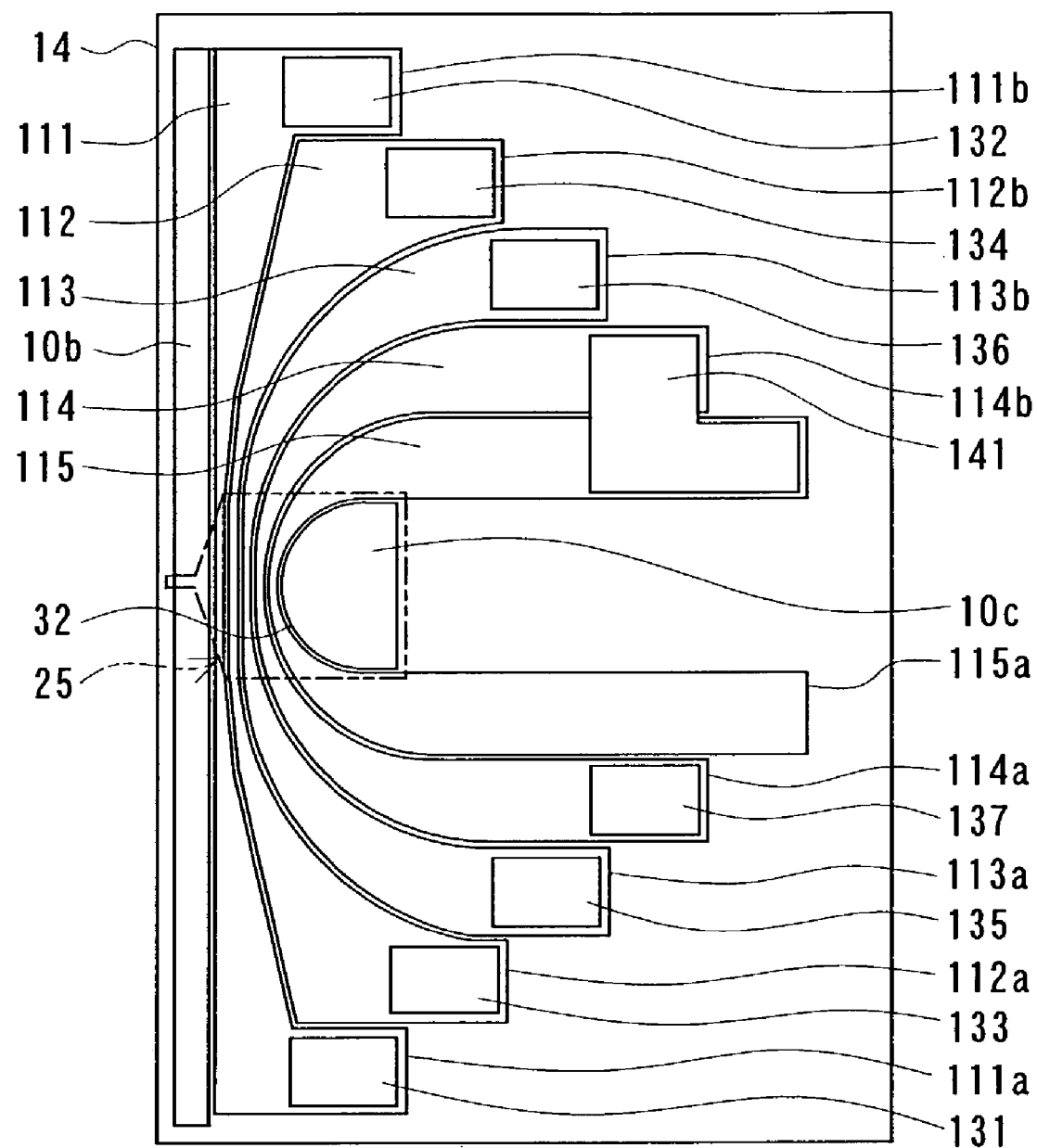
FIG. 26 is a plan view showing inner conductor portions and connecting portions of a fourth modification example of the first embodiment wherein a four-turn thin-film coil is formed.
Figure 27:
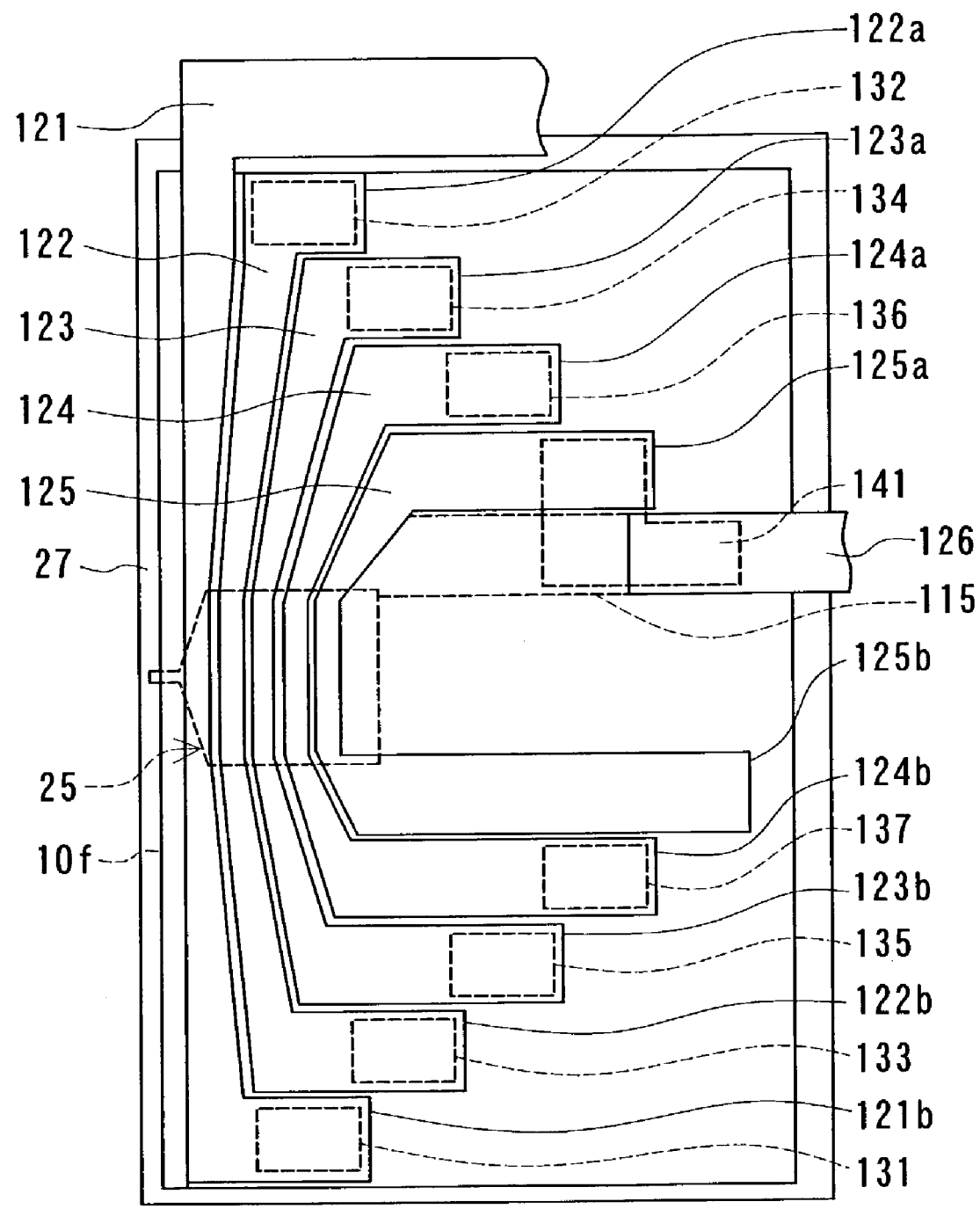
FIG. 27 is a plan view showing outer conductor portions and a lead layer of the fourth modification example of the first embodiment wherein the four-turn thin-film coil is formed.

Reference is now made to FIG. 26 and FIG. 27 to describe the fourth modification example. The fourth modification example is an example in which the shapes of the connecting portions are altered so that the number of turns of the thin-film coil is chosen. The configurations of the fourth modification example except the connecting portions are the same as those of the second modification example. The following is a description of an example in which a four-turn thin-film coil is formed.

FIG. 26 is a plan view showing the inner conductor portions and the connecting portions when the four-turn thin-film coil is formed. FIG. 27 is a plan view showing the outer conductor portions and the lead layer when the four-turn thin-film coil is formed. In this case, the connecting portion 139 of FIG. 22 is omitted, and a connecting portion 141 is provided in place of the connecting portions 138 and 140 of FIG. 22. The connecting portion 141 has such a shape that the connecting portions 138 and 140 of FIG. 22 in combination are included. The lead layer 126 is connected to the connecting portion 141.

In the example shown in FIG. 26 and FIG. 27, the four-turn thin-film coil is formed between an end of the outer conductor portion 121 and the contact portion 114b of the inner conductor portion 114.

To form a three-turn coil by altering the shapes of the connecting portions, the connecting portion 137 is omitted from the structure shown in FIG. 26 and FIG. 27, and a connecting portion having such a shape that the connecting portions 136 and 141 in combination are included, is provided in place of the connecting portions 136 and 141.

In such a manner, the fourth modification example allows the number of turns of the thin-film coil to be easily chosen simply by altering the shapes of the connecting portions.

According to the fourth modification example, it is possible that a partially-fabricated product including the components at least from the substrate 1 to the inner conductor portions 111 to 115 is stocked, and a plurality of connecting portions, whose shapes are chosen for the application, and the outer conductor portions 121 to 125 are added to the partially-fabricated product, and the thin-film magnetic head is thus completed. It is thereby possible to fabricate the thin-film magnetic head having desired characteristics in a short period of time.

As described above, the partially-fabricated product including the components at least up to the inner conductor portions 111 to 115 is a second mode of the thin-film magnetic head substructure of the present embodiment of the invention. The thin-film magnetic head substructure comprises the substrate 1 and the read head. The substructure further comprises: the first to third layers 10a to 10c of the bottom pole layer 10; the inner conductor portions 111 to 115 of the thin-film coil; and the insulating film 15. To be specific, the layered structure shown in FIG. 9A and FIG. 9B is the thin-film magnetic head substructure of this example. The fourth modification example has effects similar to those of the third modification example.

FIFTH MODIFICATION EXAMPLE

Figure 28:
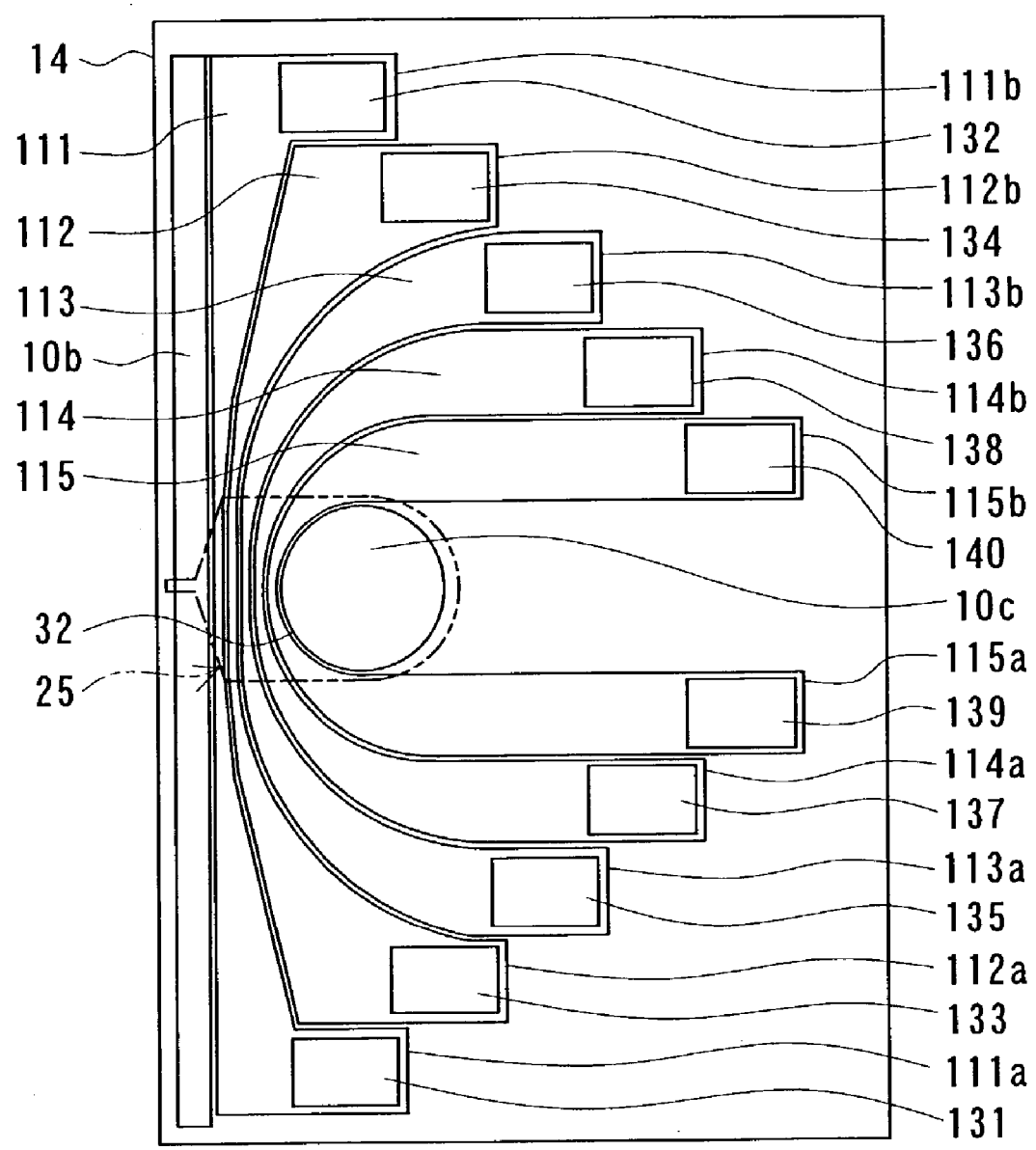
FIG. 28 is a plan view showing inner conductor portions and connecting portions of the thin-film coil of a fifth modification example of the first embodiment.

Reference is now made to FIG. 28 to describe a fifth modification example. FIG. 28 is a plan view showing the inner conductor portions and the connecting portions of the thin-film coil of the fifth modification example. In this example the third layer 10c has a circle-shaped top surface. The remainder of configurations of the fifth modification example are similar to those of the second modification example.

The shape of the top surface of the third layer 10c is not limited to the one shown in FIG. 18 in which a semicircle is joined to a rectangle and to the circle shown in FIG. 28, but may be altered to still other shapes.

[Second Embodiment]

Reference is now made to FIG. 29A to FIG. 37A and FIG. 29B to FIG. 37B to describe a second embodiment of the invention. FIG. 29A to FIG. 37A are cross sections taken along a line the same as that of each of FIG. 2A to FIG. 17A. FIG. 29B to FIG. 37B are cross sections of magnetic pole portions each of which is parallel to the air bearing surface.

As shown in FIG. 5A and FIG. 5B, a method of manufacturing a thin-film magnetic head of the second embodiment includes the steps the same as those of the first embodiment that are performed until the first layer 10a is selectively etched through the use of the photoresist layer 12 as a mask to pattern the first layer 10a.

In the second embodiment, the photoresist layer 12 is removed, and an insulating film 61 made of alumina, for example, is then formed by CVD, for example, so as to cover the entire top surface of the layered structure as shown in FIG. 29A and FIG. 29B. As a result, grooves covered with the insulating film 61 are formed in the space between the second layer 10b and the conductor portion 112, the space between the conductor portions 112 and 114, and the space between the conductor portion 114 and the third layer 10c. The thickness of the insulating film 61 is equal to or smaller than that of the insulating film 11. The thickness of the insulating film 61 is preferably 0.2 μm or smaller, and more preferably falls within the range between 0.08 and 0.15 μm inclusive. The insulating film 61 may be formed through the same method as the method of forming the insulating film 15 of the first embodiment.

Next, a first conductive film made of Cu, for example, and having a thickness of 30 to 50 nm, for example, is formed by sputtering, for example, so as to cover the entire top surface of the layered structure. On the first conductive film, a second conductive film made of Cu, for example, and having a thickness of 50 to 80 nm, for example, is formed by CVD. The second conductive film is not intended to be used for filling entirely the groove between the second layer 10b and the conductor portion 112, the groove between the conductor portions 112 and 114, and the groove between the conductor portion 114 and the third layer 10c, but is intended to cover the grooves, taking advantage of good step coverage of CVD. The first and second conductive films in combination are called an electrode film 62. The electrode film 62 functions as an electrode and a seed layer for plating. Next, on the electrode film 62, a conductive layer 63 made of Cu, for example, and having a thickness of 4 to 5 μm, for example, is formed by frame plating. The conductive layer 63 is formed at least in a region in which the second inner conductor portions 111, 113 and 115 are to be disposed.

Next, as shown in FIG. 30A and FIG. 30B, the electrode film 62 except a portion below the conductive layer 63 is removed through the use of the conductive layer 63 as a mask. The electrode film 62 may be removed by ion beam etching wherein, for example, the direction in which ion beams move forms an angle within a range between 45 and 75 degrees inclusive with respect to the direction orthogonal to the top surface of the first layer 10a. Alternatively, the electrode film 62 may be removed by wet etching through the use of dilute hydrochloric acid, dilute sulfuric acid or dilute nitric acid, or removed by electrolytic etching through the use of cupric sulfate, so as to completely remove the electrode film 62 formed on the stepped surface.

Next, an insulating layer 64 made of alumina, for example, and having a thickness of 4 to 6 µm is formed to cover the entire top surface of the layered structure.

Next, as shown in FIG. 31A and FIG. 31B, the insulating layer 64 is polished by CMP, for example, so that the second layer 10b, the third layer 10c, and the first inner conductor portions 112 and 114 are exposed. Consequently, the second inner conductor portions 111, 113 and 115 are made up of the conductive layer 63 and the electrode film 62 remaining in the space between the second layer 10b and the conductor portion 112, the space between the conductor portions 112 and 114, and the space between the conductor portion 114 and the third layer 10c. As thus described, the second inner conductor portions are disposed adjacent to the first inner conductor portions. The second inner conductor portions are formed such that only the insulating film 61 is provided between neighboring ones of the first inner conductor portions and the second inner conductor portions.

Next, as shown in FIG. 32A and FIG. 32B, an insulating film 19 made of alumina, for example, and having a thickness of 0.2 µm, for example, is formed to cover the entire top surface of the layered structure. Etching is selectively performed on the insulating film 19 in the portions corresponding to the second layer 10b, the third layer 10c, and the contact portions of the conductor portions 111 to 115.

Next, frame plating, for example, is performed to form the fourth layer 10d on the second layer 10b, form the fifth layer 10e on the third layer 10c, and form the first connecting portion layers on the respective contact portions of the conductor portions 111 to 115. FIG. 32A shows the connecting portion layer 18a that is one of the first connecting portion layers formed on the contact portion 114b of the conductor portion 114. The fourth layer 10d, the fifth layer 10e and the first connecting portion layers may be made of a material the same as that of the first embodiment.

Next, the insulating layer 20 made of alumina, for example, and having a thickness of 2 to 3 µm, for example, is formed to cover the entire top surface of the layered structure. The insulating layer 20 is then polished by CMP, for example, so that the fourth layer 10d, the fifth layer 10e, and the first connecting portion layers are exposed.

Next, as shown in FIG. 33A and FIG. 33B, the magnetic layer 21 made of a magnetic material and having a thickness of 0.7 to 1.0 µm is formed by sputtering, so as to cover the entire top surface of the layered structure. The magnetic layer 21 may be made of a material the same as that of the first embodiment.

Next, on the magnetic layer 21, the etching mask 22a is formed in the portion corresponding to the fourth layer 10d. The etching mask 22b is formed in the portion corresponding to the fifth layer 10e. Etching masks are formed in the portions corresponding to the first connecting portion layers. FIG. 33A shows the etching mask 22c, one of the etching masks corresponding to the first connecting portion layers, that corresponds to the connecting portion layer 18a. The etching masks may be made of a material the same as that of the first embodiment, and may have a thickness the same as that of the first embodiment.

Next, the magnetic layer 21 is etched by ion beam etching or RIE utilizing a halogen gas such as $Cl_2$ through the use of the above-mentioned etching masks. As shown in FIG. 34A and FIG. 34B, the sixth layer 10f, the seventh layer 10g and a plurality of second connecting portion layers are made up of portions of the magnetic layer 21 remaining under the etching masks after the etching. The second connecting portion layers are disposed on the first connecting portion layers. FIG. 34A shows the second connecting portion layer 18b, one of the second connecting portion layers, that is disposed on the first connecting portion layer 18a.

Next, the insulating layer 23 made of alumina, for example, and having a thickness of 2 to 3 µm is formed so as to cover the entire top surface of the layered structure. The insulating layer 23 is then polished by CMP, for example. This polishing is performed so as to remove the etching masks and to flatten the top surfaces of the sixth layer 10f, the seventh layer 10g, the second connecting portion layers, and the insulating layer 23. This polishing is performed to make the sixth layer 10f 0.5 to 0.7 µm thick.

The third layer 10c, the fifth layer 10e and the seventh layer 10g constitute the coupling portion 31 for establishing magnetic coupling between the bottom pole layer 10 and the top pole layer.

Next, as shown in FIG. 35A and FIG. 35B, the recording gap layer 24 having a thickness of 0.06 to 0.09 µm is formed to cover the entire top surface of the layered structure. The recording gap layer 24 may be made of a material the same as that of the first embodiment. Next, portions of the recording gap layer 24 corresponding to the seventh layer 10g and the second connecting portion layers are selectively etched.

Next, a magnetic layer made of a magnetic material and having a thickness of 0.3 to 0.7 µm is formed by sputtering, for example, so as to cover the entire top surface of the layered structure. The magnetic layer may be made of a high saturation flux density material such as CoFeN having a saturation flux density of 2.4 T, or $FeCo_x$ having a saturation flux density of 2.3 T.

Next, the second layer 25b of the top pole layer 25 and a plurality of fourth connecting portion layers are formed on the magnetic layer by frame plating, for example. The second layer 25b and the fourth connecting portion layers each have a thickness of 3.0 to 3.8 µm, for example. The fourth connecting portion layers are disposed in the regions corresponding to the second connecting portion layers. FIG. 35A shows a fourth connecting portion layer 18e, one of the fourth connecting portion layers, that is disposed in the region corresponding to the second connecting portion layer 18b. The second layer 25b and the fourth connecting portion layers may be made of a material the same as that of the second layer 25b of the first embodiment.

Next, the above-mentioned magnetic layer is etched by ion beam etching or RIE utilizing a halogen gas such as $Cl_2$ at a temperature of 200 to 250° C. through the use of the second layer 25b and the fourth connecting portion layers as etching masks. The first layer 25a of the top pole layer 25 and a plurality of third connecting portion layers are thereby made up of the magnetic layer remaining after the etching. The first layer 25a is located below the second layer 25b. The third connecting portion layers are located below the fourth connecting portion layers. FIG. 35A shows a third connecting portion layer 18d, one of the third connecting portion layers, that is disposed below the fourth connecting portion layer 18e.

As in the first embodiment, the top pole layer 25 incorporates the first layer 25a and the second layer 25b. The top pole layer 25 includes the track width defining portion 25A and the yoke portion 25B.

Next, although not shown, a photoresist mask having an opening around the track width defining portion 25A is formed. A portion of the recording gap layer 24 and a portion of the sixth layer 10f around the track width defining portion 25A are etched by ion beam etching or RIE, for example, using the above-mentioned photoresist mask and the top pole layer 25 as masks. A trim structure as shown in FIG. 35B is thereby formed. A portion of the sixth layer 10f that is opposed to the track width defining portion 25A of the top pole layer 25 with the recording gap layer 24 in between is the pole portion of the bottom pole layer 10.

Next, as shown in FIG. 36A and FIG. 36B, an insulating layer 65 made of alumina, for example, and having a thickness of 2 to 3 μm is formed to cover the entire top surface of the layered structure. The insulating layer 65 is then polished by CMP, for example, so that the second layer 25b and the fourth connecting portion layers are exposed. The first to fourth connecting portion layers make up connecting portions 131 to 140 that connect the inner conductor portions to the outer conductor portions. FIG. 36A shows the connecting portion 138 that connects the inner conductor portion 114 to an outer conductor portion that will be formed later. Next, an insulating film 66 made of alumina, for example, and having a thickness of 0.2 to 0.5 μm is formed to cover the entire top surface of the layered structure. Portions of the insulating film 66 located on the fourth connecting portion layers are selectively etched.

Figure 37A:
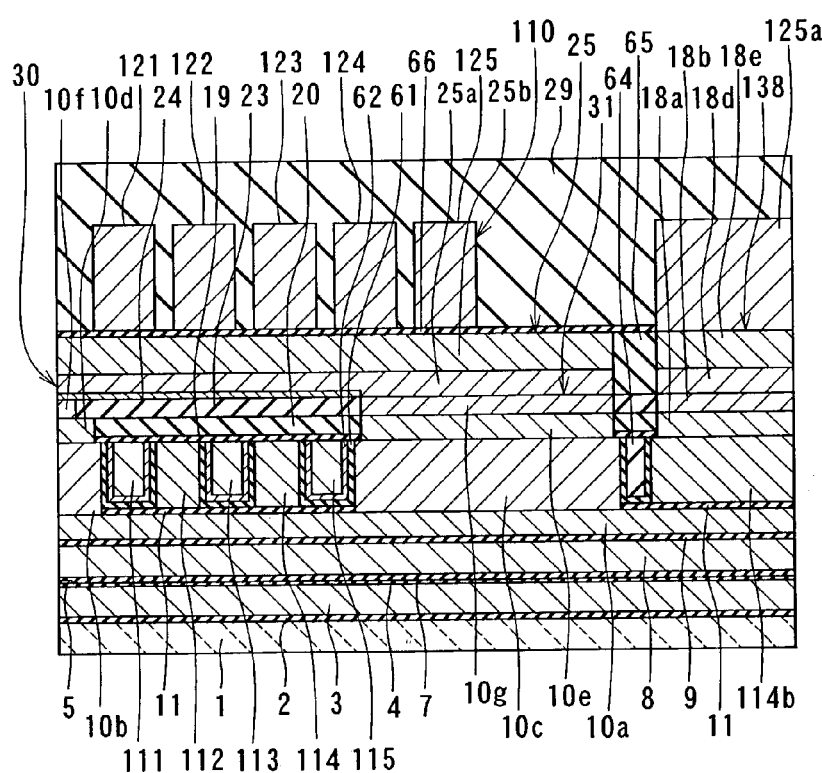
FIG. 37A and FIG. 37B are cross-sectional views for illustrating a step that follows FIG. 36A and FIG. 36B.
Figure 37B:
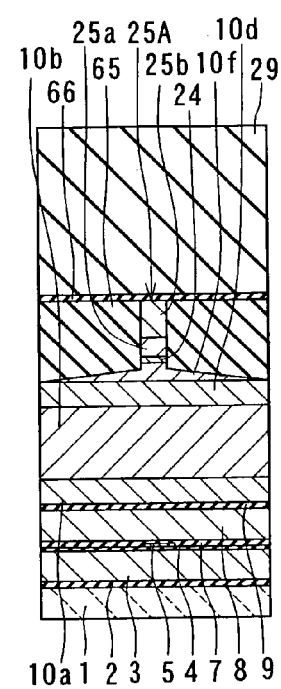

Next, as shown in FIG. 37A and FIG. 37B, the outer conductor portions 121 to 125 made of Cu, for example, are formed by frame plating, for example, on the insulating film 66. As in the first embodiment, when the outer conductor portions 121 to 125 are formed, the lead layer 126 shown in FIG. 19 is formed at the same time, using a material and a method the same as those of the outer conductor portions 121 to 125.

The inner conductor portions 111 to 115, the outer conductor portions 121 to 125, and the connecting portions 131 to 140 make up the thin-film coil 110. The thin-film coil 110 is insulated from the bottom pole layer 10 and the top pole layer 25 and wound around the top pole layer 25 in a helical manner.

Next, the overcoat layer 29 made of alumina, for example, and having a thickness of 20 to 40 μm is formed so as to cover the entire top surface of the layered structure. The surface of the overcoat layer 29 is flattened, and electrode pads (not shown) are formed thereon. Finally, the slider including the foregoing layers is lapped to form the air bearing surface 30. The thin-film magnetic head including the read and write heads is thus completed.

According to the second embodiment, the second inner conductor portions are disposed adjacent to the first inner conductor portions, as in the first embodiment. The insulating film 61 is provided between adjacent ones of the inner conductor portions. The space between adjacent ones of the inner conductor portions is equal to the thickness of the insulating film 61. That is, only the insulating film 61 exists between adjacent ones of the inner conductor portions. The space between adjacent ones of the inner conductor portions, that is, the thickness of the insulating film 61 is equal to or smaller than the minimum distance between the bottom pole layer 10 and the bottoms of the inner conductor portions. Only the insulating film 61 exists between the second layer 10b and the inner conductor portion 111 that is closest to the second layer 10b, and between the third layer 10c and the inner conductor portion 115 that is closest to the third layer 10c, respectively. Therefore, the space between the second layer 10b and the inner conductor portion 111 and the space between the third layer 10c and the inner conductor portion 115 are each equal to the thickness of the insulating film 61.

The remainder of configuration, function and effects of the second embodiment are similar to those of the first embodiment.

[Third Embodiment]

Figure 38:
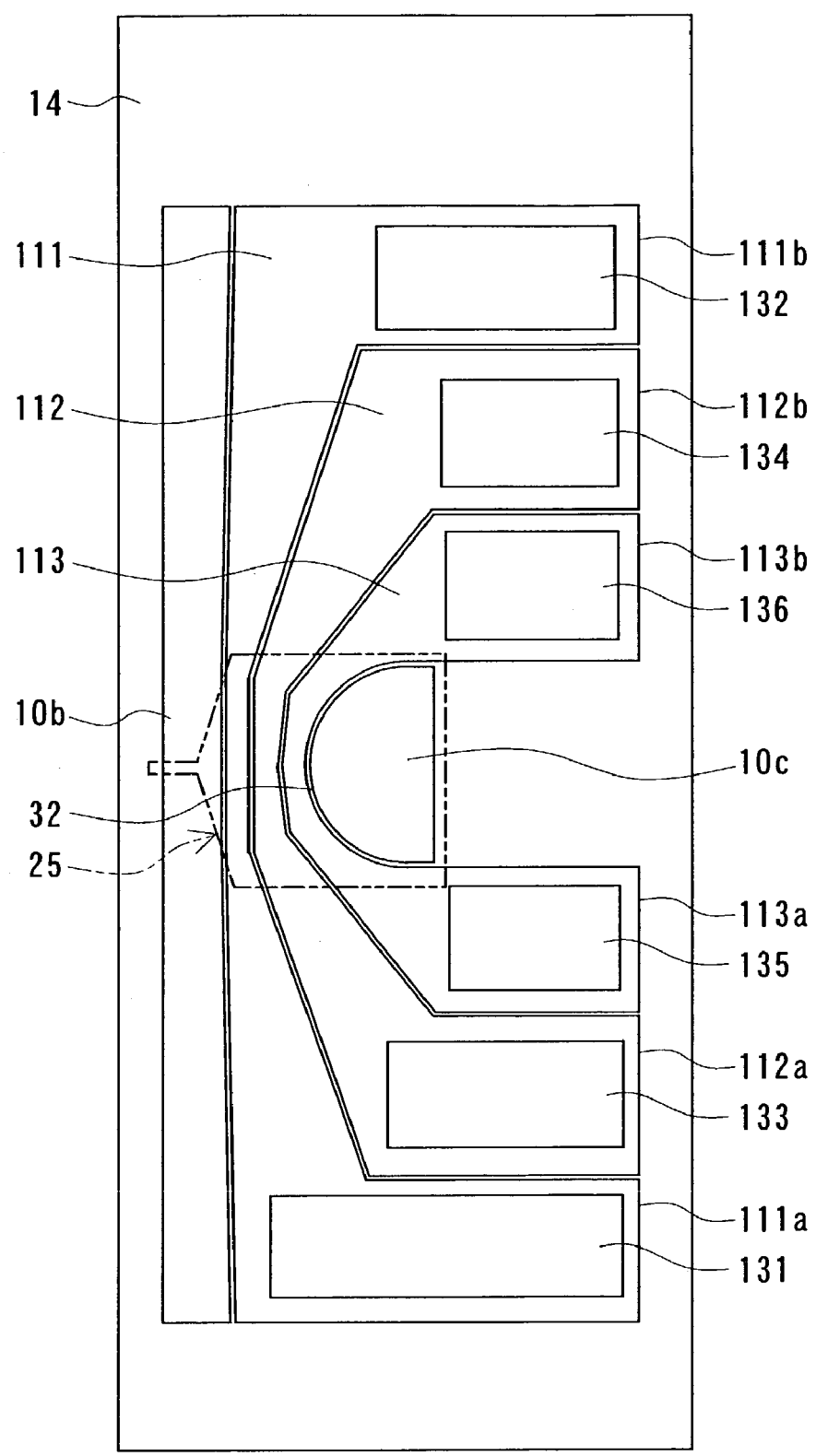
FIG. 38 is a plan view showing inner conductor portions and connecting portions of a thin-film coil of a third embodiment of the invention.
Figure 39:
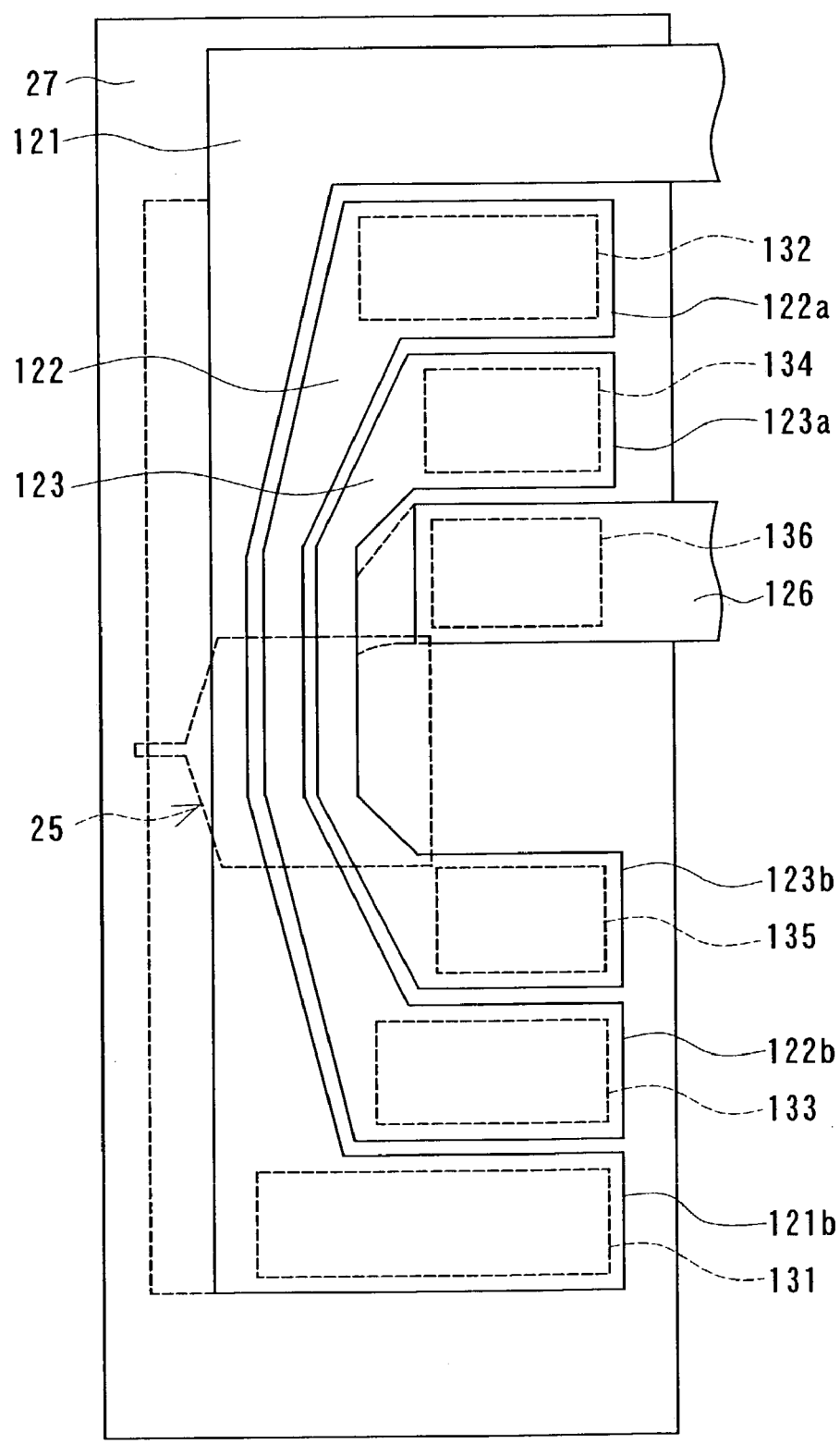
FIG. 39 is a plan view showing outer conductor portions of the thin-film coil of the third embodiment.

Reference is now made to FIG. 38 and FIG. 39 to describe a third embodiment of the invention. FIG. 38 is a plan view showing the inner conductor portions and the connecting portions of the thin-film coil of the third embodiment. FIG. 39 is a plan view showing the outer conductor portions of the thin-film coil of the embodiment.

The thin-film magnetic head of the embodiment comprises the three-turn thin-film coil in place of the five-turn coil 110 of the first embodiment. The coil of the third embodiment has the inner conductor portions 111 to 113, the outer conductor portions 121 to 123, and the connecting portions 131 to 136.

The inner conductor portions 111 to 113 are disposed side by side and extend in the direction intersecting the direction orthogonal to the air bearing surface (that is, the horizontal direction of FIG. 38). The inner conductor portions 111 to 113 have contact portions 111a to 113a provided near ends of the respective inner conductor portions 111 to 113, and contact portions 111b to 113b provided near the other ends of the respective inner conductor portions 111 to 113. The contact portions 111a to 113a are in contact with the connecting portions 131, 133 and 135, respectively. The contact portions 111b to 113b are in contact with the connecting portions 132, 134 and 136, respectively.

The outer conductor portions 121 to 123 are disposed side by side on a side opposite to the inner conductor portions 111 to 113, the top pole layer 25 being disposed in between, and extend in the direction intersecting the direction orthogonal to the air bearing surface (that is, the horizontal direction of FIG. 39). The outer conductor portion 121 has an end connected to a pad for an electrode. The outer conductor portion 121 has the other end in the neighborhood of which the contact portion 121b is provided. The outer conductor portions 122 and 123 have the contact portions 122a and 123a each of which is provided near an end of each of the conductor portions 122 and 123, and the contact portions 122b and 123b each of which is provided near the other end of each of the conductor portions 122 and 123. The contact portions 121b to 123b are in contact with the connecting portions 131, 133, and 135, respectively. The contact portions 122a and 123a are in contact with the connecting portions 132 and 134, respectively.

The lead layer 126 has an end connected to the contact portion 113b of the second inner conductor portion 113 through the connecting portion 136. The lead layer 126 has the other end to be connected to a pad for an electrode.

The contact portion 121b of the outer conductor portion 121 is connected to the contact portion 111a of the inner conductor portion 111 through the connecting portion 131. The contact portion 111b of the inner conductor portion 111 is connected to the contact portion 122a of the outer conductor portion 122 through the connecting portion 132. The contact portion 122b of the outer conductor portion 122 is connected to the contact portion 112a of the inner conductor portion 112 through the connecting portion 133. The contact portion 112b of the inner conductor portion 112 is connected to the contact portion 123a of the outer conductor portion 123 through the connecting portion 134. The contact portion 123b of the outer conductor portion 123 is connected to the contact portion 113a of the inner conductor portion 113 through the connecting portion 135. The contact portion 113b of the inner conductor portion 113 is connected to the lead layer 126 through the connecting portion 136. The three-turn thin-film coil wound around the top pole layer 25 in a helical manner is thus formed.

According to the third embodiment, the insulating film 15 is provided between adjacent ones of the inner conductor portions, as in the first embodiment. The space between adjacent ones of the inner conductor portions is equal to the thickness of the insulating film 15. That is, only the insulating film 15 exists between adjacent ones of the inner conductor portions. The space between adjacent ones of the inner conductor portions, that is, the thickness of the insulating film 15 is equal to or smaller than the minimum distance between the bottom pole layer 10 and the bottom of the inner conductor portions. According to the embodiment, only the insulating film 15 exists between the second layer 10b and the inner conductor portion 111 that is closest to the second layer 10b, and between the third layer 10c and the inner conductor portion 113 that is closest to the third layer 10c, respectively. Therefore, the space between the second layer 10b and the inner conductor portion 111 and the space between the third layer 10c and the inner conductor portion 113 are each equal to the thickness of the insulating film 15.

A method of manufacturing the thin-film magnetic head of the third embodiment is almost similar to the method of the first embodiment. Features of the third embodiment different from the method of the first embodiment are as follows. In the third embodiment, only the first inner conductor portion 112 is formed instead of forming the first inner conductor portions 112 and 114 in the step shown in FIG. 3A and FIG. 3B. Only the second inner conductor portions 111 and 113 are formed instead of forming the second inner conductor portions 111, 113 and 115 in the step shown in FIG. 9A and FIG. 9B. In the third embodiment, in addition, only the outer conductor portions 121 to 123 are formed instead of forming the outer conductor portions 121 to 125 in the step shown in FIG. 16A and FIG. 16B. Alternatively, the thin-film magnetic head of the third embodiment may be fabricated through a method almost similar to the method of manufacturing the thin-film magnetic head of the second embodiment.

Figure 40:
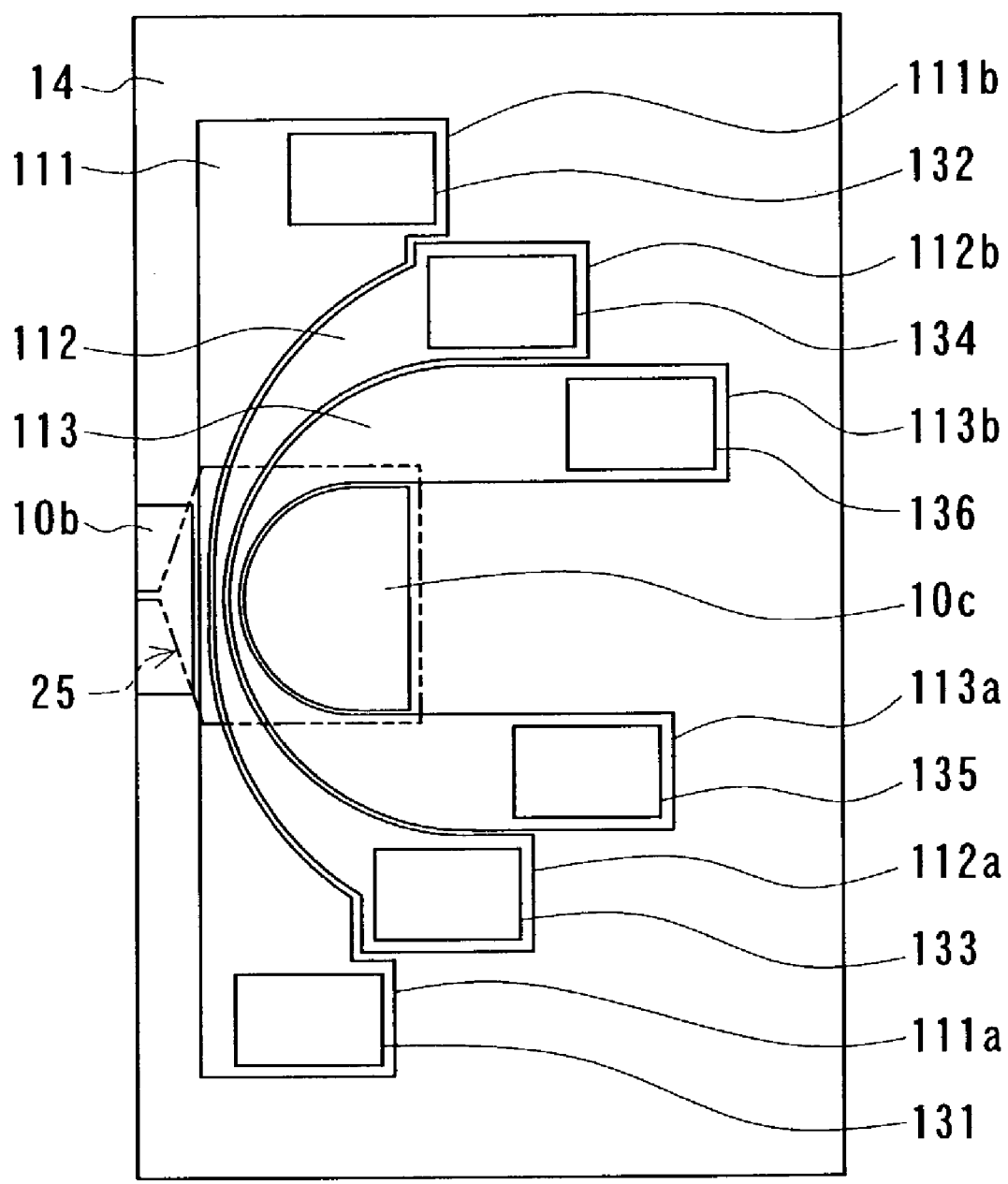
FIG. 40 is a plan view showing inner conductor portions and connecting portions of the thin-film coil of a modification example of the third embodiment.
Figure 41:
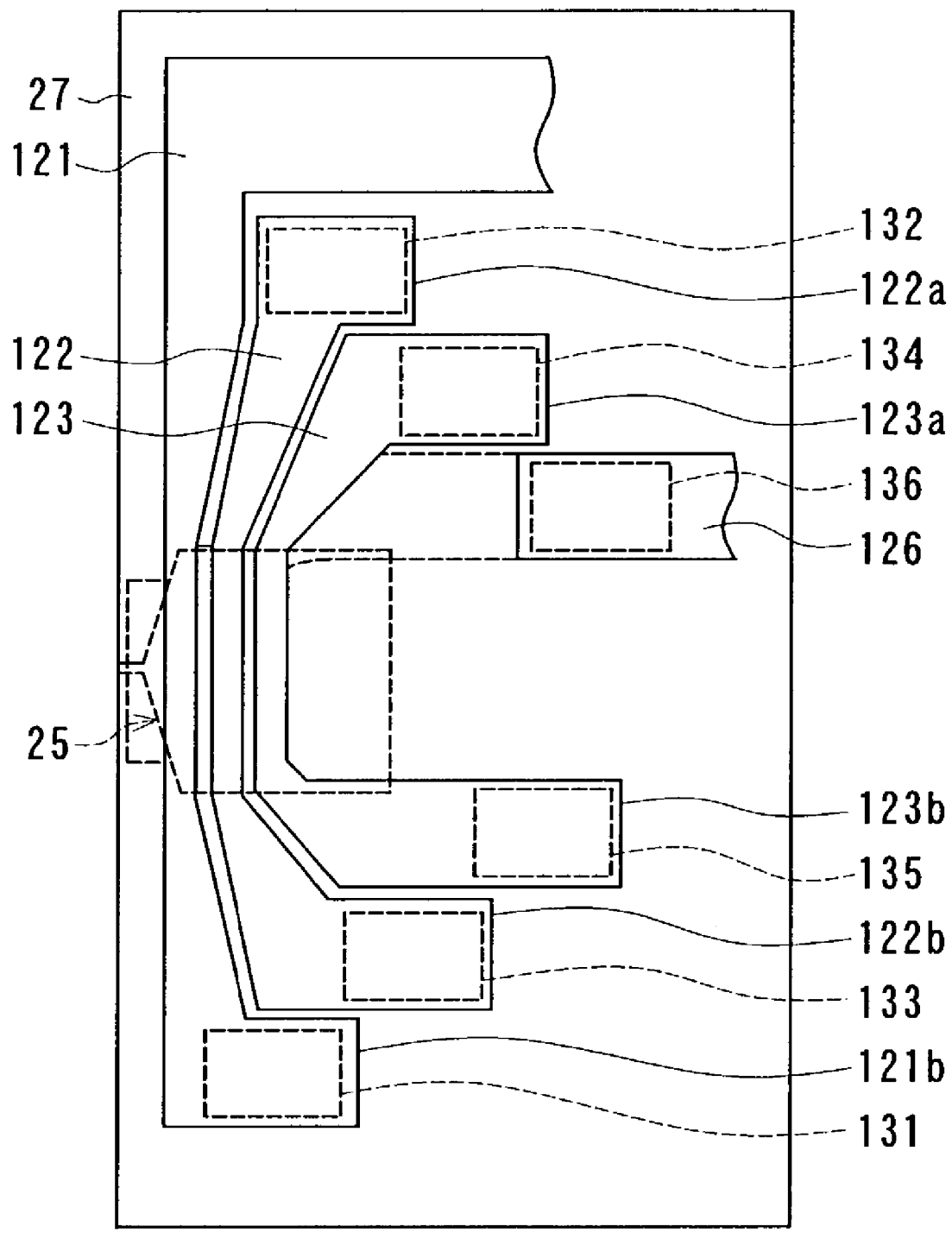
FIG. 41 is a plan view showing outer conductor portions of the thin-film coil of the modification example of the third embodiment.

Reference is now made to FIG. 40 and FIG. 41 to describe a modification example of the third embodiment. FIG. 40 is a plan view showing the inner conductor portions and the connecting portions of the thin-film coil of the modification example. FIG. 41 is a plan view showing the outer conductor portions of the thin-film coil of the example. In the modification example the connecting portions 131 to 136 are disposed such that adjacent ones of the connecting portions are shifted from each other in the direction orthogonal to the air bearing surface 30 (the horizontal direction of FIG. 40 and FIG. 41) and in the direction parallel to the air bearing surface 30 (the vertical direction of FIG. 40 and FIG. 41). In the modification example a side of the inner conductor portion 111 that is close to the third layer 10c has an arc-shaped portion. Each side of each of the inner conductor portions 112 and 113 has an arc-shaped portion, too. The remainder of configurations of the modification example is similar to the configurations shown in FIG. 38 and FIG. 39. The effects of this modification example are similar to those of the first and second modification examples of the first embodiment.

The remainder of configuration, function and effects of the third embodiment are similar to those of the first embodiment.

[Fourth Embodiment]

Figure 43:
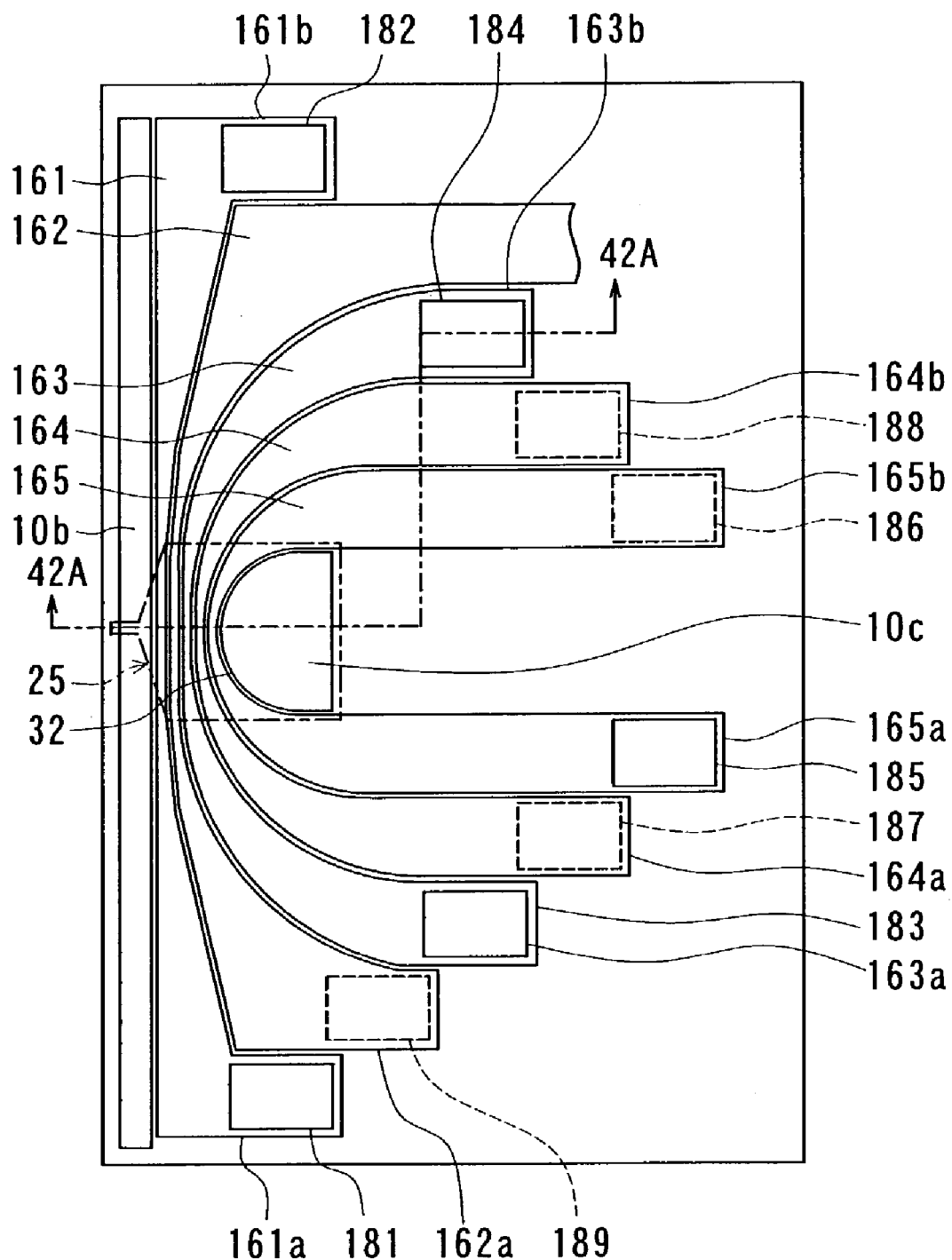
FIG. 43 is a plan view showing inner conductor portions and connecting portions of a thin-film coil of the fourth embodiment.
Figure 44:
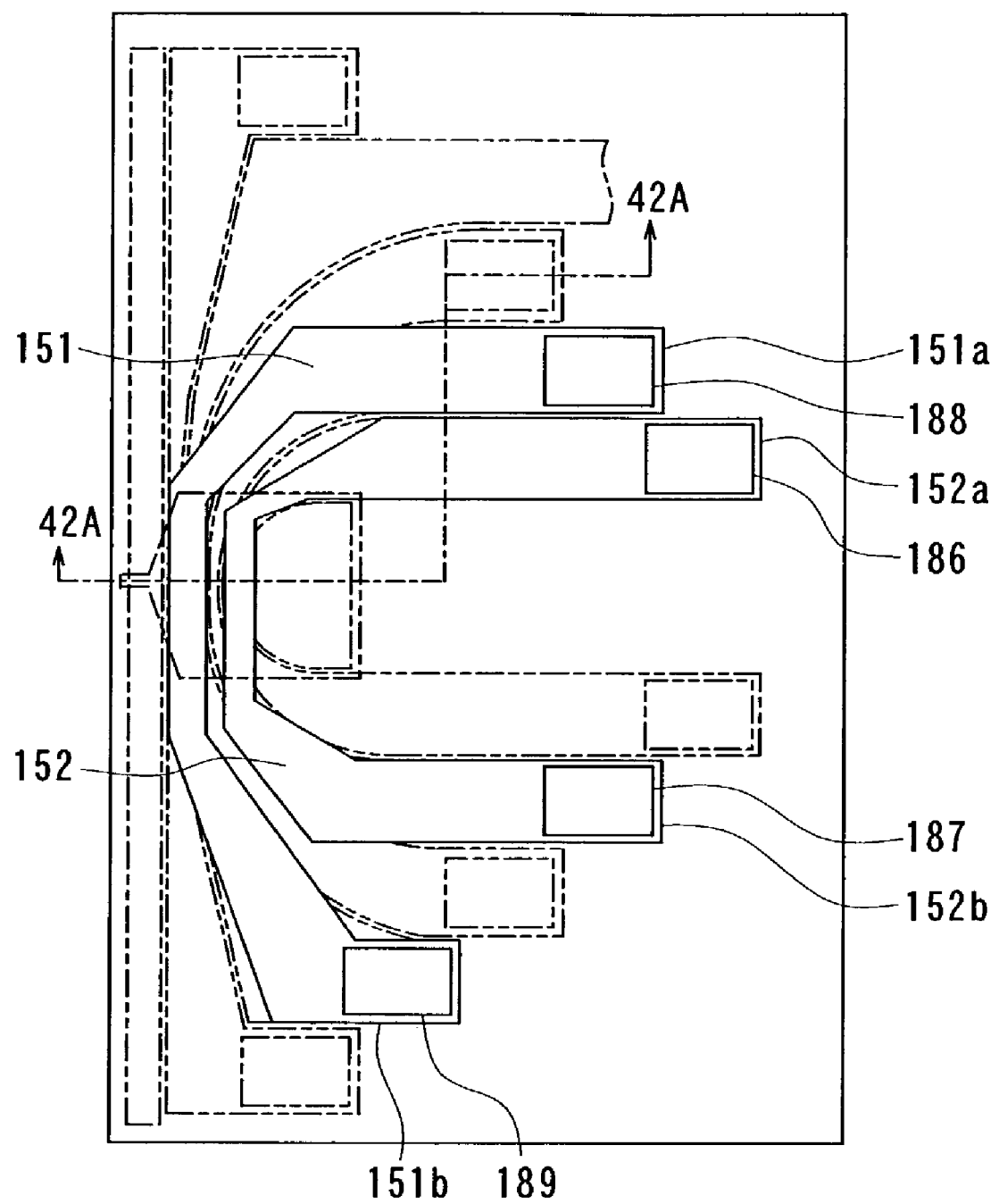
FIG. 44 is a plan view showing first outer conductor portions of the thin-film coil of the fourth embodiment.
Figure 45:
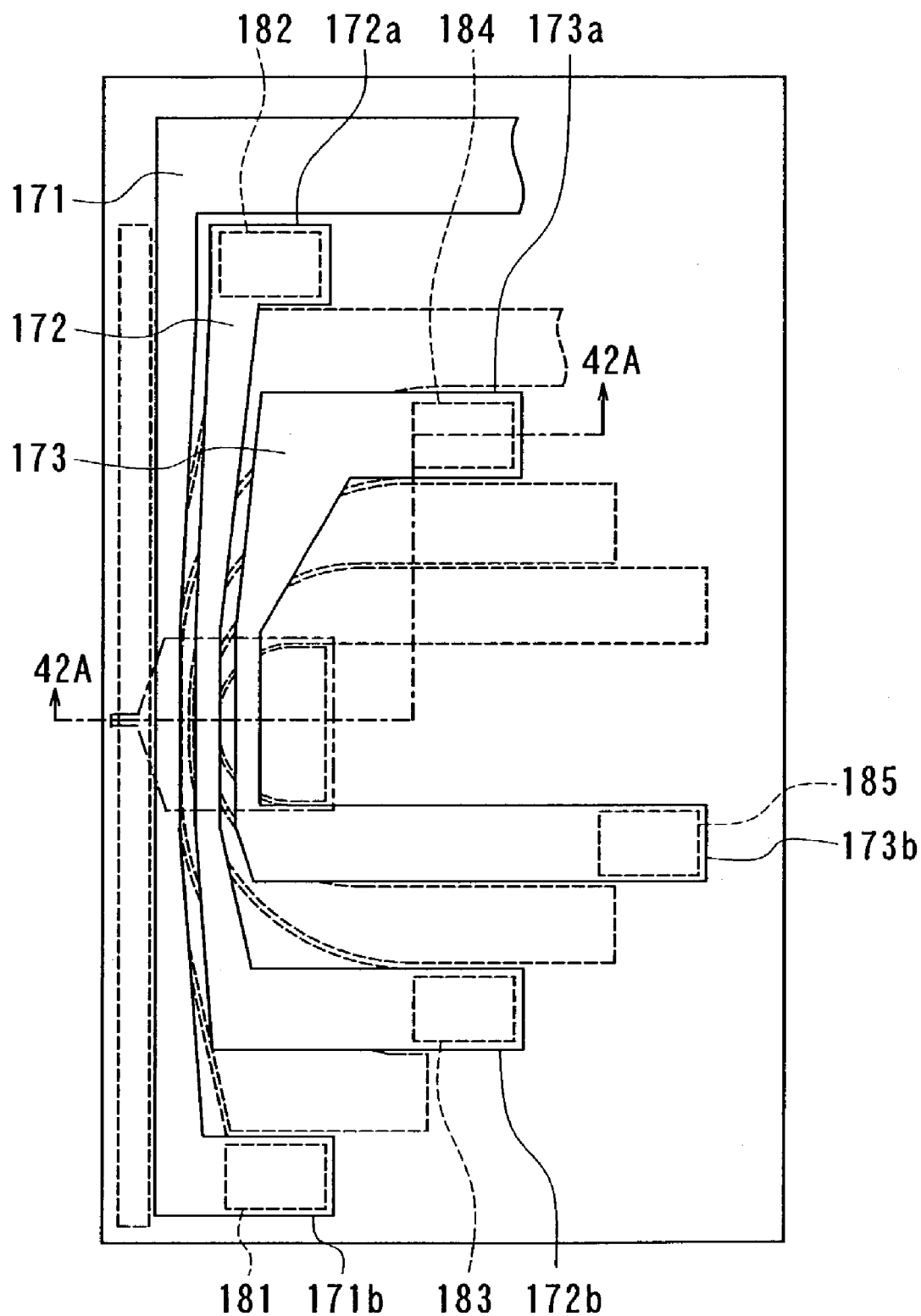
FIG. 45 is a plan view showing second outer conductor portions of the thin-film coil of the fourth embodiment.

Reference is now made to FIG. 42A, FIG. 42B, and FIG. 43 to FIG. 45 to describe a fourth embodiment of the invention. FIG. 42A and FIG. 42B are cross sectional views of a thin-film magnetic head of the fourth embodiment. FIG. 42A is a cross section corresponding to the cross section taken along line 42A—42A of FIG. 43 to FIG. 45. FIG. 42B is a cross section of a pole portion parallel to the air bearing surface. FIG. 43 is a plan view showing the inner conductor portions and the connecting portions of the thin-film coil of the embodiment. FIG. 44 is a plan view showing the first outer conductor portions of the thin-film coil. FIG. 45 is a plan view showing the second outer conductor portions of the thin-film coil.

As shown in FIG. 42A and FIG. 42B, the thin-film magnetic head of the embodiment comprises a thin-film coil 150 in place of the thin-film coil 110. The thin-film coil 150 is insulated from the bottom pole layer 10 and the top pole layer 25 and wound around the bottom pole layer 10 and the top pole layer 25 in a helical manner.

The thin-film coil 150 has first inner conductor portions 162 and 164, second inner conductor portions 161, 163 and 165, first outer conductor portions 151 and 152, second outer conductor portions 171, 172 and 173, and connecting portions 181 to 189.

The shapes and arrangement of the inner conductor portions 161 to 165 are almost similar to those of the inner conductor portions 111 to 115 of FIG. 22. The inner conductor portion 162 has an end to be connected to a pad for an electrode. The inner conductor portion 162 has the other end in the neighborhood of which a contact portion 162a is provided. The inner conductor portions 161 and 163 to 165 have contact portions 161a and 163a to 165a each of which is provided near an end of each of the conductor portions 161 and 163 to 165, and contact portions 161b and 163b to 165b each of which is provided near the other end of each of the conductor portions 161 and 163 to 165.

The second inner conductor portions are disposed adjacent to the first inner conductor portions. The insulating film 61 is provided between adjacent ones of the inner conductor portions. The space between adjacent ones of the inner conductor portions is equal to the thickness of the insulating film 61. That is, only the insulating film 61 exists between adjacent ones of the inner conductor portions. The space between adjacent ones of the inner conductor portions, that is, the thickness of the insulating film 61 is equal to or smaller than the minimum distance between the bottom pole layer 10 and the bottoms of the inner conductor portions. Only the insulating film 61 exists between the second layer 10b and the inner conductor portion 161 that is closest to the second layer 10b, and between the third layer 10c and the inner conductor portion 165 that is closest to the third layer 10c, respectively. Therefore, the space between the second layer 10b and the inner conductor portion 161 and the space between the third layer 10c and the inner conductor portion 165 are each equal to the thickness of the insulating film 61.

The first outer conductor portions 151 and 152 are located between the top shield layer 8 and the first layer 10a of the bottom pole layer 10, and insulated from the top shield layer 8 and the first layer 10a. An insulating layer 71 is provided between the first outer conductor portions 151 and 152 and the top shield layer 8. An insulating layer 72 is provided around the first outer conductor portions 151 and 152. An insulating layer 73 is provided between the first outer conductor portions 151 and 152 and the first layer 10a. As shown in FIG. 42A, FIG. 42B and FIG. 44, the outer conductor portions 151 and 152 are disposed side by side on a side opposite to the inner conductor portions 161 to 165, the first layer 10a being disposed in between, and extend in the direction intersecting the direction orthogonal to the air bearing surface (that is, the horizontal direction of FIG. 44). The outer conductor portions 151 and 152 have contact portions 151a and 152a each of which is provided near an end of each of the conductor portions 151 and 152, and contact portions 151b and 152b each of which is provided near the other end of each of the conductor portions 151 and 152. Part of the outer conductor portion 152 is disposed to face the bottom surface of the third layer 10c and the bottom surface of the coupling portion 31.

The second outer conductor portions 171 to 173 are disposed side by side on a side opposite to the inner conductor portions 161 to 165, the top pole layer 25 being disposed in between, and extend in the direction intersecting the direction orthogonal to the air bearing surface (that is, the horizontal direction of FIG. 45). The second outer conductor portion 171 has an end to be connected to a pad for an electrode. The second outer conductor portion 171 has the other end in the neighborhood of which a contact portion 171b is provided. The second outer conductor portions 172 and 173 have contact portions 172a and 173a each of which is provided near an end of each of the conductor portions 172 and 173, and contact portions 172b and 173b each of which is provided near the other end of each of the conductor portions 172 and 173. Part of the outer conductor portion 173 is disposed to face the top surface of the third layer 10c and the top surface of the coupling portion 31.

The connecting portions 181 to 185 are located above the inner conductor portions 161 to 165. The connecting portions 186 to 189 are located below the inner conductor portions 161 to 165.

The following is a detailed description of the relationship of connection among the inner conductor portions 161 to 165, the outer conductor portions 151, 152 and 171 to 173, and the connecting portions 181 to 189. The contact portion 171b of the outer conductor portion 171 is connected to the contact portion 161a of the inner conductor portion 161 through the connecting portion 181. The contact portion 161b of the inner conductor portion 161 is connected to the contact portion 172a of the outer conductor portion 172 through the connecting portion 182. The contact portion 172b of the outer conductor portion 172 is connected to the contact portion 163a of the inner conductor portion 163 through the connecting portion 183. The contact portion 163b of the inner conductor portion 163 is connected to the contact portion 173a of the outer conductor portion 173 through the connecting portion 184. The contact portion 173b of the outer conductor portion 173 is connected to the contact portion 165a of the inner conductor portion 165 through the connecting portion 185. The contact portion 165b of the inner conductor portion 165 is connected to the contact portion 152a of the outer conductor portion 152 through the connecting portion 186. The contact portion 152b of the outer conductor portion 152 is connected to the contact portion 164a of the inner conductor portion 164 through the connecting portion 187. The contact portion 164b of the inner conductor portion 164 is connected to the contact portion 151a of the outer conductor portion 151 through the connecting portion 188. The contact portion 151b of the outer conductor portion 151 is connected to the contact portion 162a of the inner conductor portion 162 through the connecting portion 189. The five-turn thin-film coil 150 wound in a helical manner around the bottom pole layer 10 and the top pole layer 25 is thus formed.

In the method of manufacturing the thin-film magnetic head of the fourth embodiment, the outer conductor portions 151 and 152 may be fabricated as follows. The insulating layer 71 made of alumina, for example, and having a thickness of 0.2 to 0.5 $\mu$m, for example, is formed on the top shield layer 8. Next, the outer conductor portions 151 and 152 made of Cu, for example, and having a thickness of 0.3 to 0.8 $\mu$m, for example, is formed by frame plating, for example, on the insulating layer 71. The insulating layer 72 made of alumina, for example, and having a thickness of 1.0 to 1.5 $\mu$m is formed so as to cover the entire top surface of the layered structure. The insulating layer 72 is then polished by CMP, for example, so that the outer conductor portions 151 and 152 are exposed. Next, the insulating layer 73 made of alumina, for example, and having a thickness of 0.2 to 0.5 $\mu$m is formed so as to cover the entire top surface of the layered structure. The first layer 10a of the bottom pole layer 10 is formed on the insulating layer 73.

Openings are formed by etching in the regions of the insulating layer 73 in which the connecting portions 186 to 189 are to be disposed. The connecting portions 186 to 189 may be made of a material the same as the first layer 10a and formed at the same time as the first layer 10a.

The inner conductor portions 161 to 165 are formed through the steps similar to those of the inner conductor portions 111 to 115 of the second embodiment. The outer conductor portions 171 to 173 are formed through the steps similar to those of the outer conductor portions 121 to 125 of the second embodiment. The connecting portions 181 to 185 are formed through the steps similar to those of the connecting portions 131 to 140 of the second embodiment.

According to the fourth embodiment, a plurality of outer conductor portions are divided and some of them are disposed below the bottom pole layer 10 while the others are disposed above the top pole layer 25. As a result, it is possible that the outer conductor portions are increased in width and located closer to the air bearing surface 30, compared to the case in which all the outer conductor portions are disposed below the bottom pole layer 10 or above the top pole layer 25. It is therefore possible to reduce the resistance of the thin-film coil and to utilize the magnetic flux generated by the coil for writing with efficiency.

According to the embodiment, a part of the first outer conductor portion 152 is disposed to face the bottom surface of the third layer 10c and the bottom surface of the coupling portion 31. Part of the second outer conductor portion 173 is disposed to face the top surface of the third layer 10c and the top surface of the coupling portion 31. As a result, the outer conductor portions 151, 152, and 171 to 173 are increased in width, and the resistance of the thin-film coil 110 is reduced.

The remainder of configuration, function and effects of the fourth embodiment are similar to those of the second embodiment.

The present invention is not limited to the foregoing embodiments but may be practiced in still other ways. For example, the outer conductor portions may be disposed only below the bottom pole layer 10. The coupling portion may include part of the top pole layer.

The thin-film magnetic head substructure, that is, the partially-fabricated product including at least the components up to the inner conductor portions, may be used to manufacture a thin-film magnetic head incorporating a thin-film coil having a desired number of turns. In this case, it is possible to alter both the shapes of the connecting portions and the number of the outer conductor portions, so as to choose the number of turns of the thin-film coil.

The invention is also applicable to a thin-film magnetic head dedicated to writing that has an induction-type electromagnetic transducer only, or a thin-film magnetic head that performs writing and reading with an induction-type electromagnetic transducer.

According to the first thin-film magnetic head of the invention, as thus described, the thin-film coil is wound in a helical manner around at least one of the first and second pole layers. In the thin-film coil the insulating film is disposed between adjacent ones of the inner conductor portions. The space between adjacent ones of the inner conductor portions is equal to the thickness of the insulating film, and equal to or smaller than the minimum distance between first pole layer and the bottom of the inner conductor portions. As a result, the invention achieves the thin-film magnetic head having a reduced magnetic path length that results in excellent writing characteristics in a high frequency band, and having the thin-film coil with a low resistance.

In the first thin-film magnetic head of the invention, the space between adjacent ones of the outer conductor portions may be greater than the space between adjacent ones of the inner conductor portions. In this case, it is easy to form the outer conductor portions.

In the first thin-film magnetic head of the invention, the minimum width of the outer conductor portions may be greater than the minimum width of the inner conductor portions. In this case, it is possible to further reduce the resistance of the thin-film coil.

In the first thin-film magnetic head of the invention, the first pole layer may include: the first portion disposed in the region facing the inner conductor portions; the second portion that is located near the medium facing surface and connected to the first portion in such a manner that the second portion protrudes toward the second pole layer, the second portion being closer to the second pole layer than the first portion; and the third portion that is located away from the medium facing surface and connected to the first portion in such a manner that the third portion protrudes toward the second pole layer, the third portion being closer to the second pole layer than the first portion. Part of the inner conductor portions may be disposed between the second portion and the third portion. Furthermore, at least one of the space between the second portion and one of the inner conductor portions closest to the second portion and the space between the third portion and one of the inner conductor portions closest to the third portion may be equal to the thickness of the insulating film disposed between adjacent ones of the inner conductor portions. In this case, the magnetic path length of the thin-film magnetic head is further reduced.

In the first thin-film magnetic head of the invention, part of the outer conductor portions may be disposed to face the top surface or the bottom surface of the third portion. In this case, it is possible to increase the width of the outer conductor portions so as to further reduce the resistance of the thin-film coil.

In the first thin-film magnetic head of the invention, the third portion may include the end face that faces toward the medium facing surface, and the end face may include the curved surface that protrudes toward the medium facing surface. The inner conductor portions may have the minimum width on the imaginary line drawn between the end face of the third portion and the medium facing surface at the shortest distance. In addition, each of the inner conductor portions may include the changing width portion in which the width increases as the distance from the imaginary line increases. In this case, it is possible to reduce the length of the portion having the minimum width of each of the inner conductor portions. As a result, a reduction in resistance of the thin-film coil is achieved while the magnetic path length is reduced.

In the first thin-film magnetic head of the invention, the connecting portions may be disposed such that adjacent ones of the connecting portions are shifted from each other both in the direction orthogonal to the medium facing surface and in the direction parallel to the medium facing surface. In this case, creation of a gap between adjacent ones of the connecting portions is prevented. It is thereby possible to prevent a reduction in reliability of the thin-film magnetic head and the manufacturing steps thereof.

The first thin-film magnetic head of the invention may comprise the insulating layer made of an organic film and disposed between adjacent ones of the outer conductor portions. In this case, it is possible to insulate adjacent ones of the outer conductor portions from each other with reliability.

According to the first method of manufacturing the thin-film magnetic head of the invention, the thin-film coil is made to incorporate a plurality of inner conductor portions, a plurality of outer conductor portions and a plurality of connecting portions, and the thin-film coil is wound in a helical manner around at least one of the first and second pole layers. The inner conductor portions are made to include the first conductor portions and the second conductor portions that are disposed adjacent to each other. The insulating film formed on the sidewall of each of the first conductor portions is only disposed between adjacent ones of the first and second conductor portions. As a result, the invention achieves the thin-film magnetic head having a reduced magnetic path length that results in excellent writing characteristics in a high frequency band, and having the thin-film coil with a low resistance.

In the first method of manufacturing the thin-film magnetic head of the invention, the space between adjacent ones of the outer conductor portions may be greater than the space between adjacent ones of the inner conductor portions. In this case, it is easy to form the outer conductor portions.

In the first method of manufacturing the thin-film magnetic head of the invention, the minimum width of the outer conductor portions may be greater than the minimum width of the inner conductor portions. In this case, it is possible to further reduce the resistance of the thin-film coil.

In the first method of manufacturing the thin-film magnetic head of the invention, the first pole layer may be made to include: the first portion disposed in the region facing the inner conductor portions; the second portion that is located near the medium facing surface and connected to the first portion in such a manner that the second portion protrudes toward the second pole layer, the second portion being closer to the second pole layer than the first portion; and the third portion that is located away from the medium facing surface and connected to the first portion in such a manner that the third portion protrudes toward the second pole layer, the third portion being closer to the second pole layer than the first portion. In addition, part of the inner conductor portions may be disposed between the second and third portions. Furthermore, it is possible that the groove covered with the insulating film is formed in at least one of the space between the second portion and the first conductor portions and the space between the third portion and the first conductor portions, and the second conductor portions are formed in this groove. In this case, the magnetic path length of the thin-film magnetic head is further reduced.

In the first method of manufacturing the thin-film magnetic head of the invention, part of the outer conductor portions may be disposed to face the top surface or the bottom surface of the third portion. In this case, it is possible to increase the width of the outer conductor portions so as to further reduce the resistance of the thin-film coil.

In the first method of manufacturing the thin-film magnetic head of the invention, the third portion may be made to include the end face that faces toward the medium facing surface, and the end face may be made to include the curved surface that protrudes toward the medium facing surface. The inner conductor portions may have the minimum width on the imaginary line drawn between the end face of the third portion and the medium facing surface at the shortest distance. In addition, each of the inner conductor portions may be made to include the changing width portion in which the width increases as the distance from the imaginary line increases. In this case, it is possible to reduce the length of the portion having the minimum width of each of the inner conductor portions. As a result, a reduction in resistance of the thin-film coil is achieved while the magnetic path length is reduced.

In the first method of manufacturing the thin-film magnetic head of the invention, the connecting portions may be disposed such that adjacent ones of the connecting portions are shifted from each other both in the direction orthogonal to the medium facing surface and in the direction parallel to the medium facing surface. In this case, creation of a gap between adjacent ones of the connecting portions is prevented. It is thereby possible to prevent a reduction in reliability of the thin-film magnetic head and the manufacturing steps thereof.

In the first method of manufacturing the thin-film magnetic head of the invention, the insulating layer made of an organic film may be disposed between adjacent ones of the outer conductor portions. In this case, it is possible to insulate adjacent ones of the outer conductor portions with reliability.

In the first method of manufacturing the thin-film magnetic head of the invention, the insulating film may be formed by stacking a plurality of alumina films made through chemical vapor deposition. In this case, it is possible to insulate the first conductor portions from the second conductor portions with reliability while the space between the first and second conductor portions is greatly reduced.

In the first method of manufacturing the thin-film magnetic head of the invention, the step of forming the second conductor portions may include the step of forming the conductive film made of copper by chemical vapor deposition and the step of forming the conductive layer made of copper by plating on the conductive film. In this case, it is possible to form the second conductor portions between the first conductor portions with reliability.

According to the first method of manufacturing the thin-film magnetic head of the invention, it is possible to easily choose the number of turns of the thin-film coil by choosing the number of the outer conductor portions.

According to the first method of manufacturing the thin-film magnetic head of the invention, it is possible to easily choose the number of turns of the thin-film coil by altering the shapes of the connecting portions.

According to the thin-film magnetic head substructure of the invention, it is possible to implement the thin-film magnetic head having a reduced magnetic path length that results in excellent writing characteristics in a high frequency band, and having the thin-film coil with a low resistance. In addition, it is possible to manufacture the thin-film magnetic head having desired characteristics in a short period of time.

According to the second thin-film magnetic head of the invention, the thin-film coil is wound in a helical manner around at least one of the first and second pole layers. Part of the outer conductor portions of the thin-film coil is disposed to face the top surface or bottom surface of the coupling portion. As a result, the invention achieves the thin-film magnetic head having a reduced magnetic path length that results in excellent writing characteristics in a high frequency band, and having the thin-film coil with a low resistance.

The second thin-film magnetic head of the invention may comprise the insulating film disposed between adjacent ones of the inner conductor portions, and the space between adjacent ones of the inner conductor portions may be equal to the thickness of the insulating film and smaller than or equal to the minimum distance between the first pole layer and the bottoms of the inner conductor portions. In this case, it is possible to further reduce the magnetic path length of the thin-film magnetic head.

In the second thin-film magnetic head of the invention, the space between adjacent ones of the outer conductor portions may be greater than the space between adjacent ones of the inner conductor portions. In this case, it is easy to form the outer conductor portions.

In the second thin-film magnetic head of the invention, the minimum width of the outer conductor portions may be greater than the minimum width of the inner conductor portions. In this case, it is possible to further reduce the resistance of the thin-film coil.

In the second thin-film magnetic head of the invention, the first pole layer may include: the first portion disposed in the region facing the inner conductor portions; the second portion that is located near the medium facing surface and connected to the first portion in such a manner that the second portion protrudes toward the second pole layer, the second portion being closer to the second pole layer than the first portion; and the third portion that is located away from the medium facing surface and connected to the first portion in such a manner that the third portion protrudes toward the second pole layer, the third portion being closer to the second pole layer than the first portion. The third portion makes up at least part of the coupling portion. Part of the inner conductor portions may be disposed between the second and third portions. The third portion may include the end face that faces toward the medium facing surface, and the end face may include the curved surface that protrudes toward the medium facing surface. The inner conductor portions may have the minimum width on the imaginary line drawn between the end face of the third portion and the medium facing surface at the shortest distance. In addition, each of the inner conductor portions may include the changing width portion in which the width increases as the distance from the imaginary line increases. In this case, it is possible to reduce the length of the portion having the minimum width of each of the inner conductor portions. As a result, a reduction in resistance of the thin-film coil is achieved while the magnetic path length is reduced.

In the second thin-film magnetic head of the invention, the connecting portions may be disposed such that adjacent ones of the connecting portions are shifted from each other both in the direction orthogonal to the medium facing surface and in the direction parallel to the medium facing surface. In this case, creation of a gap between adjacent ones of the connecting portions is prevented. It is thereby possible to prevent a reduction in reliability of the thin-film magnetic head and the manufacturing steps thereof.

The second thin-film magnetic head of the invention may comprise the insulating layer made of an organic film and disposed between adjacent ones of the outer conductor portions. In this case, it is possible to insulate adjacent ones of the outer conductor portions with reliability.

According to the second method of manufacturing the thin-film magnetic head of the invention, the thin-film coil is wound in a helical manner around at least one of the first and second pole layers. Part of the outer conductor portions of the thin-film coil is disposed to face the top surface or the bottom surface of the coupling portion. As a result, the invention achieves the thin-film magnetic head having a reduced magnetic path length that results in excellent writing characteristics in a high frequency band, and having the thin-film coil with a low resistance.

In the second method of manufacturing the thin-film magnetic head of the invention, the inner conductor portions may include the first conductor portions and the second conductor portions that are disposed adjacent to each other. The insulating film formed on the sidewall of each of the first conductor portions may be only disposed between adjacent ones of the first and second conductor portions. In this case, it is possible to further reduce the magnetic path length of the thin-film magnetic head.

In the second method of manufacturing the thin-film magnetic head of the invention, the space between adjacent ones of the outer conductor portions may be greater than the space between adjacent ones of the inner conductor portions. In this case, it is easy to form the outer conductor portions.

In the second method of manufacturing the thin-film magnetic head of the invention, the minimum width of the outer conductor portions may be greater than the minimum width of the inner conductor portions. In this case, it is possible to further reduce the resistance of the thin-film coil.

In the second method of manufacturing the thin-film magnetic head of the invention, the third portion of the first pole layer may be made to include the end face that faces toward the medium facing surface, and the end face may be made to include the curved surface that protrudes toward the medium facing surface. The inner conductor portions may have the minimum width on the imaginary line drawn between the end face of the third portion and the medium facing surface at the shortest distance. In addition, each of the inner conductor portions may be made to include the changing width portion in which the width increases as the distance from the imaginary line increases. In this case, it is possible to reduce the length of the portion having the minimum width of each of the inner conductor portions. As a result, a reduction in resistance of the thin-film coil is achieved while the magnetic path length is reduced.

In the second method of manufacturing the thin-film magnetic head of the invention, the connecting portions may be disposed such that adjacent ones of the connecting portions are shifted from each other both in the direction orthogonal to the medium facing surface and in the direction parallel to the medium facing surface. In this case, creation of a gap between adjacent ones of the connecting portions is prevented. It is thereby possible to prevent a reduction in reliability of the thin-film magnetic head and the manufacturing steps thereof.

In the second method of manufacturing the thin-film magnetic head of the invention, the insulating layer made of an organic film may be disposed between adjacent ones of the outer conductor portions. In this case, it is possible to insulate adjacent ones of the outer conductor portions from each other with reliability.

In the second method of manufacturing the thin-film magnetic head of the invention, the insulating film may be formed by stacking a plurality of alumina films made through chemical vapor deposition. In this case, it is possible to insulate the first conductor portions from the second conductor portions with reliability while the space between the first and second conductor portions is greatly reduced.

In the second method of manufacturing the thin-film magnetic head of the invention, the step of forming the second conductor portions may include the step of forming the conductive film made of copper by chemical vapor deposition and the step of forming the conductive layer made of copper by plating on the conductive film. In this case, it is possible to form the second conductor portions between the first conductor portions with reliability.

According to the second method of manufacturing the thin-film magnetic head of the invention, it is possible to easily choose the number of turns of the thin-film coil by choosing the number of the outer conductor portions.

According to the second method of manufacturing the thin-film magnetic head of the invention, it is possible to easily choose the number of turns of the thin-film coil by altering the shapes of the connecting portions.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
    a medium facing surface that faces toward a recording medium;
    a first pole layer and a second pole layer that include magnetic pole portions opposed to each other and located in regions of the pole layers on a side of the medium facing surface;
    a gap layer provided between the pole portion of the first pole layer and the pole portion of the second pole layer;
    a thin-film coil wound in a helical manner around at least one of the first and second pole layers and insulated from the first and second pole layers; and
    a substrate, wherein:
    the first and second pole layers, the gap layer and the thin-film coil are stacked on the substrate, and the first pole layer is located closer to the substrate than the second pole layer;
    the thin-film coil includes: a plurality of inner conductor portions disposed side by side between the first and second pole layers and extending in a direction intersecting a direction orthogonal to the medium facing surface; a plurality of outer conductor portions disposed on a side opposite to the inner conductor portions, the first or second pole layer being disposed between the inner conductor portions and the outer conductor portions, the outer conductor portions extending in the direction intersecting the direction orthogonal to the medium facing surface; and a plurality of connecting portions for connecting the inner conductor portions to the outer conductor portions;
    the thin-film magnetic head further comprises an insulating film disposed between adjacent ones of the inner conductor portions; and
    a space between adjacent ones of the inner conductor portions is equal to a thickness of the insulating film, and smaller than or equal to a minimum distance between the first pole layer and bottoms of the inner conductor portions.

2. The thin-film magnetic head according to claim 1, wherein a space between adjacent ones of the outer conductor portions is greater than the space between adjacent ones of the inner conductor portions.

3. The thin-film magnetic head according to claim 1, wherein the outer conductor portions have a minimum width greater than a minimum width of the inner conductor portions.

4. The thin-film magnetic head according to claim 1, wherein:
the first pole layer includes: a first portion disposed in a region facing the inner conductor portions; a second portion located near the medium facing surface and connected to the first portion in such a manner that the second portion protrudes toward the second pole layer, the second portion being closer to the second pole layer than the first portion; and a third portion located away from the medium facing surface and connected to the first portion in such a manner that the third portion protrudes toward the second pole layer, the third portion being closer to the second pole layer than the first portion; and
part of the inner conductor portions is disposed between the second portion and the third portion.

5. The thin-film magnetic head according to claim 4, wherein at least one of a space between the second portion and one of the inner conductor portions closest to the second portion and a space between the third portion and one of the inner conductor portions closest to the third portion is equal to the thickness of the insulating film.

6. The thin-film magnetic head according to claim 4, wherein part of the outer conductor portions is disposed to face a top surface or a bottom surface of the third portion.

7. The thin-film magnetic head according to claim 4, wherein:
the third portion includes an end face that faces toward the medium facing surface, and the end face includes a curved surface that protrudes toward the medium facing surface; and
the inner conductor portions have a minimum width on an imaginary line drawn between the end face of the third portion and the medium facing surface at a shortest distance, and the inner conductor portions include a changing width portion in which a width thereof increases as a distance from the imaginary line increases.

8. The thin-film magnetic head according to claim 1, wherein the connecting portions are disposed such that adjacent ones of the connecting portions are shifted from each other both in the direction orthogonal to the medium facing surface and in a direction parallel to the medium facing surface.

9. The thin-film magnetic head according to claim 1, further comprising an insulating layer made of an organic film and disposed between adjacent ones of the outer conductor portions.

10. A method of manufacturing a thin-film magnetic head, the head comprising:
a medium facing surface that faces toward a recording medium;
a first pole layer and a second pole layer that include magnetic pole portions opposed to each other and located in regions of the pole layers on a side of the medium facing surface;
a gap layer provided between the pole portion of the first pole layer and the pole portion of the second pole layer; and
a thin-film coil wound in a helical manner around at least one of the first and second pole layers and insulated from the first and second pole layers, the method comprising the steps of:
forming the first pole layer;
forming the gap layer on the pole portion of the first pole layer;
forming the second pole layer on the gap layer; and
forming the thin-film coil, wherein:
the step of forming the thin-film coil includes steps of: forming a plurality of inner conductor portions disposed side by side between the first and second pole layers and extending in a direction intersecting a direction orthogonal to the medium facing surface; forming a plurality of outer conductor portions disposed on a side opposite to the inner conductor portions, the first or second pole layer being disposed between the inner conductor portions and the outer conductor portions, the outer conductor portions extending in the direction intersecting the direction orthogonal to the medium facing surface; and forming a plurality of connecting portions for connecting the inner conductor portions to the outer conductor portions;
the inner conductor portions are formed to include a first conductor portion and a second conductor portion disposed adjacent to each other; and
the step of forming the inner conductor portions includes the steps of: forming the first conductor portion; forming an insulating film on a sidewall of the first conductor portion; and forming the second conductor portion such that the insulating film is only provided between the first and second conductor portions.

11. The method according to claim 10, wherein a space between adjacent ones of the outer conductor portions is made greater than a space between adjacent ones of the inner conductor portions in the step of forming the outer conductor portions.

12. The method according to claim 10, wherein the outer conductor portions are made to have a minimum width greater than a minimum width of the inner conductor portions in the step of forming the outer conductor portions.

13. The method according to claim 10, wherein, in the step of forming the first pole layer, the first pole layer is made to include: a first portion disposed in a region facing the inner conductor portions; a second portion located near the medium facing surface and connected to the first portion in such a manner that the second portion protrudes toward the second pole layer, the second portion being closer to the second pole layer than the first portion; and a third portion located away from the medium facing surface and connected to the first portion in such a manner that the third portion protrudes toward the second pole layer, the third portion being closer to the second pole layer than the first portion; and,
in the step of forming the inner conductor portions, part of the inner conductor portions is disposed between the second portion and the third portion.

14. The method according to claim 13, wherein, in the step of forming the inner conductor portions, a groove covered with the insulating film is formed in at least one of a space between the second portion and the first conductor portion and a space between the third portion and the first conductor portion, and the second conductor portion is formed in the groove.

15. The method according to claim 13, wherein, in the step of forming the outer conductor portions, part of the outer conductor portions is disposed to face a top surface or a bottom surface of the third portion.

16. The method according to claim 13, wherein:
the third portion is made to include an end face that faces toward the medium facing surface, and the end face is made to include a curved surface that protrudes toward the medium facing surface; and
the inner conductor portions are made to have a minimum width on an imaginary line drawn between the end face of the third portion and the medium facing surface at a shortest distance, and the inner conductor portions are made to include a changing width portion in which a width thereof increases as a distance from the imaginary line increases.

17. The method according to claim 10, wherein the connecting portions are disposed such that adjacent ones of the connecting portions are shifted from each other both in the direction orthogonal to the medium facing surface and in a direction parallel to the medium facing surface.

18. The method according to claim 10, further comprising the step of forming an insulating layer made of an organic film and disposed between adjacent ones of the outer conductor portions.

19. The method according to claim 10, wherein the insulating film is formed by stacking a plurality of alumina films made through chemical vapor deposition in the step of forming the insulating film.

20. The method according to claim 10, wherein the step of forming the second conductor portion includes the steps of forming a conductive film made of copper by chemical vapor deposition; and forming a conductive layer made of copper by plating on the conductive film.

21. The method according to claim 10, wherein the number of turns of the thin-film coil is chosen by choosing the number of the outer conductor portions in the step of forming the thin-film coil.

22. The method according to claim 10, wherein the number of turns of the thin-film coil is chosen by altering shapes of the connecting portions in the step of forming the thin-film coil.

23. A thin-film magnetic head substructure for manufacturing a thin-film magnetic head comprising:
a medium facing surface that faces toward a recording medium;
a first pole layer and a second pole layer that include magnetic pole portions opposed to each other and located in regions of the pole layers on a side of the medium facing surface;
a gap layer provided between the pole portion of the first pole layer and the pole portion of the second pole layer;
a thin-film coil wound in a helical manner around at least one of the first and second pole layers and insulated from the first and second pole layers; and
a substrate, wherein:
the first and second pole layers, the gap layer and the thin-film coil are stacked on the substrate, and the first pole layer is located closer to the substrate than the second pole layer;
the thin-film coil includes: a plurality of inner conductor portions disposed side by side between the first and second pole layers and extending in a direction intersecting a direction orthogonal to the medium facing surface; a plurality of outer conductor portions disposed on a side opposite to the inner conductor portions, the first or second pole layer being disposed between the inner conductor portions and the outer conductor portions, and the outer conductor portions extending in the direction intersecting the direction orthogonal to the medium facing surface; and a plurality of connecting portions for connecting the inner conductor portions to the outer conductor portions, the substructure comprising:
the substrate;
at least part of the first pole layer;
the inner conductor portions of the thin-film coil; and
an insulating film disposed between adjacent ones of the inner conductor portions, wherein
a space between adjacent ones of the inner conductor portions is equal to a thickness of the insulating film, and smaller than or equal to a minimum distance between the first pole layer and bottoms of the inner conductor portions.

24. The thin-film magnetic head substructure according to claim 23, further comprising the connecting portions.

25. A thin-film magnetic head comprising:
a medium facing surface that faces toward a recording medium;
a first pole layer and a second pole layer that include magnetic pole portions opposed to each other and located in regions of the pole layers on a side of the medium facing surface;
a coupling portion located away from the medium facing surface and including at least one of part of the first pole layer and part of the second pole layer, and magnetically coupling the first pole layer to the second pole layer;
a gap layer provided between the pole portion of the first pole layer and the pole portion of the second pole layer;
a thin-film coil wound in a helical manner around at least one of the first and second pole layers and insulated from the first and second pole layers; and
a substrate, wherein:
the first and second pole layers, the gap layer and the thin-film coil are stacked on the substrate, and the first pole layer is located closer to the substrate than the second pole layer;
the thin-film coil includes: a plurality of inner conductor portions disposed side by side between the first and second pole layers and extending in a direction intersecting a direction orthogonal to the medium facing surface; a plurality of outer conductor portions disposed on a side opposite to the inner conductor portions, the first or second pole layer being disposed between the inner conductor portions and the outer conductor portions, and the outer conductor portions extending in the direction intersecting the direction orthogonal to the medium facing surface; and a plurality of connecting portions for connecting the inner conductor portions to the outer conductor portions; and
part of the outer conductor portions is disposed to face a top surface or a bottom surface of the coupling portion.

26. The thin-film magnetic head according to claim 25, further comprising an insulating film disposed between adjacent ones of the inner conductor portions, wherein a space between adjacent ones of the inner conductor portions is equal to a thickness of the insulating film, and smaller than or equal to a minimum distance between the first pole layer and bottoms of the inner conductor portions.

27. The thin-film magnetic head according to claim 25, wherein a space between adjacent ones of the outer conductor portions is greater than the space between adjacent ones of the inner conductor portions.

28. The thin-film magnetic head according to claim 25, wherein the outer conductor portions have a minimum width greater than a minimum width of the inner conductor portions.

29. The thin-film magnetic head according to claim 25, wherein:
the first pole layer includes: a first portion disposed in a region facing the inner conductor portions; a second portion located near the medium facing surface and connected to the first portion in such a manner that the second portion protrudes toward the second pole layer, the second portion being closer to the second pole layer than the first portion; and a third portion located away from the medium facing surface and connected to the first portion in such a manner that the third portion protrudes toward the second pole layer, the third portion being closer to the second pole layer than the first portion, the third portion making up at least part of the coupling portion; and
part of the inner conductor portions is disposed between the second portion and the third portion.

30. The thin-film magnetic head according to claim 29, wherein:
the third portion includes an end face that faces toward the medium facing surface, and the end face includes a curved surface that protrudes toward the medium facing surface; and
the inner conductor portions have a minimum width on an imaginary line drawn between the end face of the third portion and the medium facing surface at a shortest distance, and the inner conductor portions include a changing width portion in which a width thereof increases as a distance from the imaginary line increases.

31. The thin-film magnetic head according to claim 25, wherein the connecting portions are disposed such that adjacent ones of the connecting portions are shifted from each other both in the direction orthogonal to the medium facing surface and in a direction parallel to the medium facing surface.

32. The thin-film magnetic head according to claim 25, further comprising an insulating layer made of an organic film and disposed between adjacent ones of the outer conductor portions.

33. A method of manufacturing a thin-film magnetic head, the head comprising:
a medium facing surface that faces toward a recording medium;
a first pole layer and a second pole layer that include magnetic pole portions opposed to each other and located in regions of the pole layers on a side of the medium facing surface;
a coupling portion located away from the medium facing surface and including at least one of part of the first pole layer and part of the second pole layer, and magnetically coupling the first pole layer to the second pole layer;
a gap layer provided between the pole portion of the first pole layer and the pole portion of the second pole layer; and
a thin-film coil wound in a helical manner around at least one of the first and second pole layers and insulated from the first and second pole layers, the method comprising the steps of:
forming the first pole layer;
forming the gap layer on the pole portion of the first pole layer;
forming the second pole layer on the gap layer; and
forming the thin-film coil, wherein:
the step of forming the first pole layer or the step of forming the second pole layer includes the step of forming the coupling portion;
the step of forming the thin-film coil includes the steps of forming a plurality of inner conductor portions disposed side by side between the first and second pole layers and extending in a direction intersecting a direction orthogonal to the medium facing surface; forming a plurality of outer conductor portions disposed on a side opposite to the inner conductor portions, the first or second pole layer being disposed between the inner conductor portions and the outer conductor portions, and the outer conductor portions extending in the direction intersecting the direction orthogonal to the medium facing surface; and forming a plurality of connecting portions for connecting the inner conductor portions to the outer conductor portions; and
part of the outer conductor portions is disposed to face a top surface or a bottom surface of the coupling portion in the step of forming the outer conductor portions.

34. The method according to claim 33, wherein:
the inner conductor portions are formed to include a first conductor portion and a second conductor portion disposed adjacent to each other; and
the step of forming the inner conductor portions includes the steps of: forming the first conductor portion; forming an insulating film on a sidewall of the first conductor portion; and forming the second conductor portion such that the insulating film is only provided between the first and second conductor portions.

35. The method according to claim 34, wherein the insulating film is formed by stacking a plurality of alumina films made through chemical vapor deposition in the step of forming the insulating film.

36. The method according to claim 34, wherein the step of forming the second conductor portion includes the steps of forming: a conductive film made of copper by chemical vapor deposition; and forming a conductive layer made of copper by plating on the conductive film.

37. The method according to claim 33, wherein a space between adjacent ones of the outer conductor portions is made greater than a space between adjacent ones of the inner conductor portions in the step of forming the outer conductor portions.

38. The method according to claim 33, wherein the outer conductor portions are made to have a minimum width greater than a minimum width of the inner conductor portions in the step of forming the outer conductor portions.

39. The method according to claim 33, wherein, in the step of forming the first pole layer, the first pole layer is made to include: a first portion disposed in a region facing the inner conductor portions; a second portion located near the medium facing surface and connected to the first portion in such a manner that the second portion protrudes toward the second pole layer, the second portion being closer to the second pole layer than the first portion; and a third portion located away from the medium facing surface and connected to the first portion in such a manner that the third portion protrudes toward the second pole layer, the third portion being closer to the second pole layer than the first portion, the third portion making up at least part of the coupling portion; and, in the step of forming the inner conductor portions, part of the inner conductor portions is disposed between the second portion and the third portion.

40. The method according to claim 39, wherein:

the third portion is made to include an end face that faces toward the medium facing surface, and the end face is made to include a curved surface that protrudes toward the medium facing surface; and the inner conductor portions are made to have a minimum width on an imaginary line drawn between the end face of the third portion and the medium facing surface at a shortest distance, and the inner conductor portions are made to include a changing width portion in which a width thereof increases as a distance from the imaginary line increases.

41. The method according to claim 33, wherein the connecting portions are disposed such that adjacent ones of the connecting portions are shifted from each other both in the direction orthogonal to the medium facing surface and in a direction parallel to the medium facing surface.

42. The method according to claim 33, further comprising the step of forming an insulating layer made of an organic film and disposed between adjacent ones of the outer conductor portions.

43. The method according to claim 33, wherein the number of turns of the thin-film coil is chosen by choosing the number of the outer conductor portions in the step of forming the thin-film coil.

44. The method according to claim 33, wherein the number of turns of the thin-film coil is chosen by altering shapes of the connecting portions in the step of forming the thin-film coil.

* * * * *

UNITED STATES PATENT AND TRADEMARK OFFICE
CERTIFICATE OF CORRECTION

PATENT NO. : 6,987,645 B2
APPLICATION NO. : 10/403033
DATED : January 17, 2006
INVENTOR(S) : Yoshitaka Sasaki and Takehiro Kamigama It is certified that error appears in the above-identified patent and that said Letters Patent is hereby corrected as shown below:

Title Page:

Item (73), please change "SAE Magnetics (H.K.) Ltd., Hong Kong (CN)" to --1) Headway Technologies, Inc., Milpitas, CA; 2) SAE Magnetics (H.K.) Ltd., Hong Kong (CN)--.

Signed and Sealed this

Thirteenth Day of March, 2007

JON W. DUDAS
*Director of the United States Patent and Trademark Office*